(12) United States Patent
Takasaki et al.

(10) Patent No.: US 7,175,947 B2
(45) Date of Patent: Feb. 13, 2007

(54) LIGHT REFLECTIVE STRUCTURE, METHOD FOR PRODUCING THE SAME AND DISPLAY

(75) Inventors: Ichiro Takasaki, Hiroshima (JP); Masao Ozeki, Kanagawa (JP); Haruki Mori, Hyogo (JP); Kenichi Fukuoka, Hyogo (JP); Takahiro Okuda, Hyogo (JP)

(73) Assignee: OPTREX Corporation, Tokyo (JP)

( * ) Notice: Subject to any disclaimer, the term of this patent is extended or adjusted under 35 U.S.C. 154(b) by 233 days.

(21) Appl. No.: 10/438,206

(22) Filed: May 15, 2003

(65) Prior Publication Data

US 2004/0012966 A1 Jan. 22, 2004

(30) Foreign Application Priority Data

May 17, 2002 (JP) ............................. 2002-143634
Dec. 26, 2002 (JP) ............................. 2002-376735

(51) Int. Cl.
*G03F 1/00* (2006.01)
*G03C 5/00* (2006.01)

(52) U.S. Cl. ............................. 430/7; 430/5; 430/296; 430/325; 430/330

(58) Field of Classification Search ................. 430/7, 430/296, 330, 325, 5
See application file for complete search history.

(56) References Cited

U.S. PATENT DOCUMENTS 6,187,485 B1 * 2/2001 Matsushima et al. .......... 430/7
2002/0018161 A1 * 2/2002 Yamanaka et al. .......... 349/112

* cited by examiner

*Primary Examiner*—Geraldina Visconti
(74) *Attorney, Agent, or Firm*—Oblon, Spivak, McClelland, Maier & Neustadt, P.C.

(57) ABSTRACT

In order to fabricate a light reflective structure for a liquid crystal display, a photosensitive resin layer is formed with use of a thermosetting photosensitive resin, the photosensitive resin layer is exposed through a photomask having a particular pattern by a proximity method, the exposed photosensitive resin layer is developed to form an insolubilized resin layer, and the insolubilized resin layer is subjected to a heat treatment to have surface smoothness improved and to accelerate setting of the resin layer.

7 Claims, 44 Drawing Sheets

55

LIGHT REFLECTIVE STRUCTURE, METHOD FOR PRODUCING THE SAME AND DISPLAY

BACKGROUND OF THE INVENTION

1. Field of the Invention

The present invention relates to a light reflective structure using an internal reflection system and a method for producing the same, and a reflective display and a transflective display using the same, in particular a reflective liquid crystal display and a transflective liquid crystal display using the same.

2. Discussion of Background

There have been now widely used a reflective display and a transflective display. These displays are suited to a display screen for portable instruments since, when external light can be utilized, image can be watched without backlight, therefore reducing total power consumption. As the display element for these displays, a liquid crystal display element has been mostly used to contribute to decrease power consumption.

One of the important constituent elements that dominate the function of these reflective liquid crystal display and transflective liquid crystal display is a reflection surface. In particular, it is necessary to realize a superior reflection surface in order to effectively utilize a small amount of external light for image and to obtain desired image quality.

From this viewpoint, various structures have been used as a reflection layer for forming the reflection surface. For example, there is a method, which uses a metallic reflection surface made of an aluminum sheet. It has been known that the reflection surface in a display element is provided with a property of reflecting light in a particular direction (hereinbelow, referred as to the reflectiveness in a specific direction) and directivity in the scattering state of reflection light (hereinbelow, referred as to the scattering directivity) to obtain bright image.

There have been proposed several methods, wherein a light reflective structure exhibiting the scattering directivity in a liquid crystal cell is photolithographically produced. For example, there has been proposed a method for forming a micro slant reflector, which has been disclosed by C. J. Wen et al. (ERSO/ITRI) in SID2000 (e.g., JP-A-2000-105370). In this method, a photosensitive resin is coated on a substrate, and the coated resin is obliquely exposed through a photomask, which includes a pattern having light shielding portions and transmission portions. This method creates problems in that production costs are high because of exposure from a slant direction, and that when a proximity mask aligner is used, it is difficult to fabricate many light reflective structures in the same shape on a large scale substrate since the intensity and the distribution of light vary from location to location by the presence of the collimation angle.

There has been also disclosed a method, wherein the line widths in a photomask are continuously changed to create a transitional change in exposure values (e.g., JP-A-2000-321410). In order to continuously change the line widths in a photomask so as to create a transitional change in exposure values, it is necessary for exposure light to have a wide range of diffusivity with respect to a line spacing. This method causes problems, e.g., in that the asymmetry of an exposure distribution is decreased, and that it is necessary to make the film thickness of a photosensitive resin thicker at the initial stage in order to form a desired slant shape since the rate of changes in the exposure distribution becomes small. It is extremely difficult to uniformly and thickly coat a photosensitive resin on a glass substrate. When a proximity mask aligner adaptable to a large-scale glass substrate is used, there is no practical solution because of a limitation to the film thickness of a photosensitive resin even if the exposure has wide diffusivity. This is because commercially available photomasks suited for that sort of mask aligner have a line spacing of not shorter than 1 μm.

Although there has been recently proposed a gray scale photomask with light shielding portions having different transmissions as a method for creating the transitional change in exposure values, the gray scale photomask is not suited to a photomask for exposing a large-scale glass substrate.

There has been also disclosed a technique, wherein by using two photomasks having different patterns, a photolithographic process is carried out in two steps to form an asymmetric shape, and the asymmetric shape is made gentle by a reflow step (e.g., JP-A-2000-180610). This technique causes problems, e.g., in that it is necessary to carry out the photolithographic process in two steps, and that the provision of two photomasks raises the cost.

There has been also disclosed a technique, wherein posts having different heights are formed, the heights of the posts are changed by a melting step, and a resin is coated on the melted posts to obtain an asymmetric shape (e.g., JP-A-2001-141915). This technique causes a problem that the cost is raised since it is necessary to carry out an additional coating step to provide the resin.

With regard to a shape exhibiting both of the reflectiveness in a specific direction and the scattering directivity, there has been proposed a shape with a diffused uneven portion put on slant surfaces as disclosed by C. J. Wen et al. (ERSO/ITRI) in SID2000. Although it is supposed that this method is highly effective, there are problems in that an exposure step needs to be carried out in two steps, and that the structure is thick.

There have been also disclosed techniques, which utilize, e.g., a form obtained by asymmetrically cutting spherical bodies having an elliptic cross-section (e.g. JP-A-2001-141915, JP-A-2000-180610 and JP-A-2000-105370). However, the form thus obtained causes a problem that the usability of light is low since the form has a property of scattering light in all directions, not a property of scattering light in a limited area in the vicinity in a direction, i.e., a property of having the reflectiveness in a specific direction.

In order to obtain a property of having great light intensity and bright reflection in image using the internal reflection system, what is important is that it is possible to avoid glare due to reflection on an outer surface of the screen of a display at the time of watching the screen (hereinbelow, referred as to the glare avoiding effect) by reflecting light in a specific direction on an internal surface in order to effectively utilize surrounding light (the reflectiveness in a specific direction), and that it is easy for a user to direct her or his eyes toward the specific direction at the time of watching the screen (high visibility) by providing the scattering state of internally reflected light with directivity (the scattering directivity).

SUMMARY OF THE INVENTION

It is an object of the present invention to solve the problems stated about the background of the present invention and to provide a light reflective structure, a reflective display and a transflective display, in particular a reflective liquid crystal display and a transflective liquid crystal display, which can offer bright image and good image performance. Other objects and advantages of the present invention will become apparent from the detailed description to follow.

The light reflective structure according to the present invention means a layered structure, which is one of elements for a display using an internal reflection system, and which comprises a reflection layer having a reflection surface for reflecting external light to be utilized, and a cured resin layer serving as a carrier for the reflection layer.

For example, when the display using an internal reflection system is a transflective liquid crystal display, the light reflective structure means a layered structure, which includes a transflective reflection layer, and a cured resin layer provided thereunder and serving a carrier therefor. The light reflective structure may include another layer, such as a substrate, a retardation film or a polarizer, as stated later with respect to FIG. 1.

The reflection layer is classified into a complete reflection layer and a transflective layer. Examples of the transflective one are a half mirror having a thin metal film to pass part of light therethrough, and a combination of a total reflection mirror and a slit. In some cases, it is advantageous that the transflective one is used. This is because the portions of the reflection layer corresponding to the slant surfaces having a length Y in FIG. 3b stated later can increase light transmittance to increase the usability of transmitted light coming from a backlight.

According to a first aspect of the present invention, there is provided a method for producing a light reflective structure, comprising forming a photosensitive resin layer with use of a thermosetting photosensitive resin; providing a photomask, which has at least one kind of pattern, the pattern having line-shaped light shielding portions and line-shaped transmission portions so that at least one of the width of the light shielding portions and the width of the transmission portions monotonically changes; exposing the photosensitive resin layer through the photomask by a proximity method; developing the exposed photosensitive resin layer to form an insolubilized resin layer; and subjecting the insolubilized resin layer to a heat treatment to have surface smoothness improved and to accelerate setting of the resin layer.

According to a second aspect of the present invention, the proximity method has a collimation angle from 1 to 4° in the method according to the first aspect.

According to a third aspect of the present invention, the thermosetting photosensitive resin comprises a positive photosensitive resin, and the heat treatment is carried out at 150 to 260° C. for not shorter than 1 min in the method according to the first or second aspect.

According to a fourth aspect of the present invention, the heat treatment includes thermal contact conduction in the method according to the first, second or third aspect.

According to a fifth aspect of the present invention, the width of the light shielding portions and the width of the transmission portions of the photomask are set at a value from 1 to 15 µm, and the pattern has a cycle of 20 to 60 µm in the method according to the first, second, third or fourth aspect.

According to a sixth aspect of the present invention, there is provided a light reflective structure comprising a reflection layer including reflection regions; the reflection regions including some or all of a plurality of concave stripes and/or convex stripes, each of the concave stripes and/or convex stripes having an asymmetric cross-sectional shape in a particular direction; each of the concave stripes and/or convex stripes having a width from 20 to 60 µm; and each of the concave stripes and/or convex stripes having a smooth surface.

According to a seventh aspect of the present invention, each of the convex stripes has a height from 1 to 5 µm, and/or each of the concave stripes has a depth from 1 to 5 µm in the structure according to the sixth aspect.

According to an eighth aspect of the present invention, when a plane parallel with an outer surface of a display screen is defined as a xy plane, the particular direction is a y-axis direction, and the concave stripes and/or convex stripes are provided in wavy forms, which range together with regular or irregular amplitudes and with regular or irregular cycles in an x-axis direction in the structure according to the sixth or seventh aspect.

According to a ninth aspect of the present invention, the cycles in the x-axis direction have a magnitude of 10 to 100 µm in the structure according to the eighth aspect.

According to a tenth aspect of the present invention, each of the concave stripes and/or convex stripes has a ratio of an amplitude to a cycle in the x-axis direction ranging from 0.05 to 1 in the structure according to the eighth or ninth aspect.

According to an eleventh aspect of the present invention, the reflection regions include two kinds of combinations of a cycle and an amplitude, each of the combinations having a different ratio of the amplitude to the cycle, in the structure according to the eighth, ninth or tenth aspect.

According to a twelfth aspect of the present invention, the light shielding portions and the transmission portions in the photomask are formed so that one of the width of the light shielding portions and the width of the transmission portions monotonically increases with the other width being fixed at a certain value or monotonically decreasing in the method according to any one of the first to fifth aspects.

According to a thirteenth aspect of the present invention, the light shielding portions and/or the transmission portions in the photomask are formed in a curved or linear shape in the method according to any one of the first to fifth and twelfth aspects.

According to a fourteenth aspect of the present invention, the wavy forms forming the plural stripes have the phases of the cycles in the x-axis direction out of synchronization with respect to the y-axis direction in the structure according to the eighth, ninth, tenth or eleventh aspect.

According to a fifteenth aspect of the present invention, the cycles in the x-axis direction are constant, and the phases of the cycles in the x-axis direction with respect to the y-axis direction are out of synchronization by half a cycle in the x-axis direction in the structure according to the fourteenth aspect.

According to a sixteenth aspect of the present invention, when the reflection regions are divided into a plurality of sub-regions in the x-axis direction, the phases of the sub-regions in the y-axis direction are out of synchronization with respect to the x-axis direction in the structure according to the eighth to eleventh, fourteenth and fifteenth aspects.

According to a seventeenth aspect of the present invention, the occupation rate of slant surfaces of the concave stripes and/or convex stripes, which have a normal vector component in the positive direction of the y-axis, is not lower than 55% and not higher than 90% in the method according to any one of the eighth to eleventh, fourteenth, fifteenth and sixteenth aspects.

According to an eighteenth aspect of the present invention, when the angle between the normal direction of the xy plane and the normal direction of a slant surface is defined as a slant angle, the rate of the presence of slant angles in a range of plus or minus 45° in the positive direction of the y-axis in a slant angle distribution on the xy plane has at least one extreme value in a range of slant angles from 2 to 10° in the method according to any one of the eighth to eleventh, and fourteenth to seventeenth aspects.

According to a nineteenth aspect of the present invention, the extreme value exists in the positive direction of the y-axis in the structure according to the eighteenth aspect.

According to a twentieth aspect of the present invention, each of some or all of the concave stripes and/or convex stripes has a shorter slant surface provided with a transmission region in the structure according to any one of the six to eleventh, and fourteenth to nineteenth aspects.

According to a twenty-first aspect of the present invention, each of some or all of the concave stripes has a bottom portion provided with a transmission region, and/or each of some or all of the convex stripes has a base portion provided with a transmission region in the structure according to any one of the six to eleventh, and fourteenth to twentieth aspects.

According to a twenty-second aspect of the present invention, each of some or all of the concave stripes and/or convex stripes has a color filter formed in a greater film thickness on the transmission region than on the reflection region in the structure according to the twentieth or twenty-first aspect.

According to a twenty-third aspect of the present invention, each of some or all of the concave stripes and/or convex stripes has the reflection region formed thereon without a color filter layer thereon in the structure according to any one of the six to eleventh, and fourteenth to twenty-second aspects. It is more preferable that the reflection region without a color filter layer is formed on the base portions of the convex stripes and/or the bottom portions of the concave stripes.

According to a twenty-fourth aspect of the present invention, each of some or all of the concave stripes and/or convex stripes has the reflection region comprising a total reflection mirror without a slit in the structure according to any one of the six to eleventh, and fourteenth to twenty-third aspects.

According to a twenty-fifth aspect of the present invention, there is provided a transflective or reflective display including the light reflective structure defined in any one of the sixth to eleventh and fourteenth to twenty-fourth aspects.

According to a twenty-sixth aspect of the present invention, the light reflective structure has the same pattern in each of the pixels forming a liquid crystal display screen in the display according to the twenty-fifth aspect.

According to a twenty-seventh aspect of the present invention, the light reflective structure includes a transmissive diffusion layer in the display according to the twenty-fifth or twenty-sixth aspect.

According to a twenty-eighth aspect of the present invention, the photosensitive resin is made of a material capable of undergoing an intermediate reaction according to exposure intensity in the method according to any one of the first to fifth, twelfth and thirteenth aspects.

According to a twenty-ninth aspect of the present invention, there is provided a method for producing a light reflective structure, comprising irradiating light to a thermosetting photosensitive resin layer by an area graduation method, the photosensitive resin layer capable of undergoing an intermediate reaction according to exposure intensity; developing the photosensitive resin layer to form an insolubilized resin layer; subjecting the developed photosensitive resin layer to a heat treatment to create thermal sagging so as to have surface smoothness improved and to accelerate setting of the resin; and providing an uneven form on a surface of the cured resin so as to correspond to cycles of area graduation, and providing a reflective material on the surface of the cured resin.

According to a thirtieth aspect of the present invention, there is provided a photomask comprising a plurality of pixel regions, each of the pixel regions including a plurality of block units, wherein when a photomask surface is defined as an xy plane, one of the block units in the x-axis direction has mask pattern units successively provided in the x-axis direction so that the mask pattern units have transmission portions and light shielding portions provided with arcuate boundaries extending therebetween in the x-axis direction, and wherein two block units adjoining in the y-axis direction have the arcuate boundaries shifted in the x-axis direction by a certain distance.

According to a thirty-first aspect of the present invention, there is provided a photomask comprising a plurality of pixel regions, wherein when a photomask surface is defined as an xy plane, mask pattern units, which have transmission portions and light shielding portions provided with arcuate boundaries extending therebetween in the x-axis direction, are successively provided in the x-axis direction and the y-axis direction in a pixel region, and wherein adjacent mask pattern units have the light shielding portions and the transmission portions provided with different ratios of an amplitude to a cycle in the x-axis direction.

According to a thirty-second aspect of the present invention, the photomask defined in the thirtieth or thirty-first aspect includes rectangular transmission elements and rectangular light shielding elements, wherein when the photomask surface is defined as an xy plane, comb-like gray scale regions, which have the widths of the transmission elements and the widths of the light shielding elements in the y-axis direction stepwise and monotonously changed, are successively provided in the x-axis direction, and wherein the light shielding portions as collections of the rectangular light shielding elements and the transmission portions as collections of the transmission elements have a constant cycle in the x-axis direction.

According to a thirty-third aspect of the present invention, the mask pattern units have comb-like gray scale regions successively provided by one cycle in the x-axis direction with certain shifts in the y-axis direction, wherein the transmission portions and the light shielding portions in the x-axis direction have arcuate boundaries extending therebetween by combining a couple of mask pattern units shifted with a positive distance in the y-axis direction and a couple of mask pattern units shifted with a negative distance in the y-axis direction, and wherein the mask pattern units are successively provided in the x-axis direction so as to have the transmission portions and the light shielding portions in the x-axis direction provided with arcuate boundaries extending therebetween in wavy fashion, in the photomask defined in the thirtieth, thirty-first or thirty-second aspect.

According to a thirty-fourth aspect of the present invention, each of the transmission portions and the light shielding portions has a ratio of an amplitude to a cycle in the x-axis direction ranging from 0.05 to 1 in the photomask according to the thirtieth, thirty-first or thirty-second aspect.

According to a thirty-fifth aspect of the present invention, each of the transmission portions and the light shielding portions has a ratio of an amplitude to a cycle in the x-axis direction repeatedly changed with certain regularity in the x-axis direction in the photomask according to the thirty-fourth aspect.

According to a thirty-sixth aspect of the present invention, block units that are the same as one block unit including mask pattern units in the x-axis direction are successively provided in the y-axis direction so as to be shifted with certain distances in the x-axis direction, in the photomask defined in the thirty-third, thirty-fourth or thirty-fifth aspect.

According to a thirty-seventh aspect of the present invention, respective block units comprises mask patterns units arraying in the x-axis direction, the respective block units are successively provided in the y-axis direction so as to be shifted with certain distances in the x-axis direction, the mask pattern for one pixel is selected from a combination of ones among the mask pattern units, and mask patterns, which are the same as the selected mask pattern, are successively provided in the x-axis direction and the y-axis direction, in the photomask pattern defined in any one of the thirtieth to thirty-sixth aspects.

According to a thirty-eighth aspect of the present invention, the certain distances are the same as or half the cycle of the light shielding portion and the transmission portion in the x-axis direction, in the photomask pattern defined in the thirty-sixth or thirty-seventh aspects.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
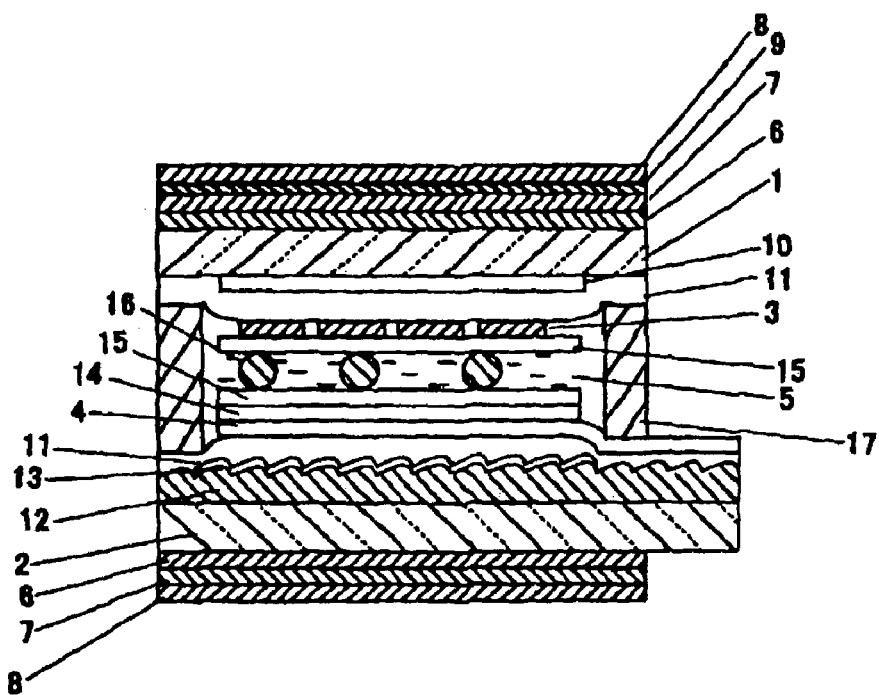
FIG. 1 is a typical example of the transflective liquid crystal display according to the present invention.

Now, embodiments of the present invention will be described, referring to examples, the accompanying drawings and the like. The examples, the accompanying drawings and the description are illustrative of the present invention but are not to be considered as limiting the present invention to the specifies thereof. It is to be understood that other embodiments are included within the scope of the present invention as long as they fall within the spirit of the present invention. In the accompanying drawings, like reference numerals designate identical or corresponding parts. The elements according to the present invention are not always shown in the same scale.

FIG. 1 schematically shows a typical example of the transflective liquid crystal display according to the present invention in section. The display utilizes both external light entering through a front side thereof located at an upper position in FIG. 1 and light coming from a backlight. The backlight, which is provided on a rear side of the display located at a lower position in FIG. 1, is not shown.

In FIG. 1, a first transparent substrate 1 and a second transparent substrate 2, which are made of glass or plastic, have transparent electrodes 3, 4 provided on an intra-cell side thereof, respectively. The transparent electrodes have a liquid crystal layer 5 sandwiched therebetween.

The first transparent substrate has two retardation films 6, 7, a diffusion layer 9 and a polarizer 8 provided on an outer side thereof in this order. A second transparent substrate 2 has two retardation films 6, 7 and a polarizer 8 provided on an outer side thereof in this order.

The first transparent substrate 1 has a color filter (CF) 10 provided on the intra-cell side thereof, and a leveling layer 11 is provided to cover the CF 10. The second transparent substrate 2 has an uneven layer 12 provided on the intra-cell side thereof, and the uneven layer 12 has a transflective reflection layer 13 provided thereon at a position corresponding to a liquid crystal display screen.

The transflective reflection layer 13 has a leveling layer 11 provided thereon. The leveling layer 11 on the transflective reflection layer 13 is primarily intended to improve the alignment characteristic of the liquid crystal. The respective leveling layers 11 have the transparent electrodes 3, 4 provided on intra-cell sides thereof, and the transparent electrodes have a single insulation layer 14 and two alignment layers 15 provided therebetween. The two alignment layers 15 has spacers 16 provided at proper positions therebetween to ensure a required thickness for the liquid crystal layer 5.

As stated earlier, the liquid crystal layer 5 is formed within a cell sandwiched by the first transparent substrate 1 and the second transparent substrate 2. The liquid crystal cell has seals 17 provided at lateral sides thereof.

The liquid crystal of the liquid crystal layer 5 has a twist angle of 0 to 300° from the first transparent substrate 1 toward the second transparent substrate 2. The retardation value $\Delta n \cdot d$ of the liquid layer 5, which is the product of the anisotropy refractive index $\Delta n$ of the liquid crystal and the thickness d of the liquid layer 5, is 0.30 to 2.00 μm.

In order to form a light reflective structure capable of minimizing an adverse effect created by glare, being bright and superior in display performance in accordance with the present invention, the following fabrication may be carried out, referring to FIGS. 1, 2, 3a and 3b for instance.

Figure 2:
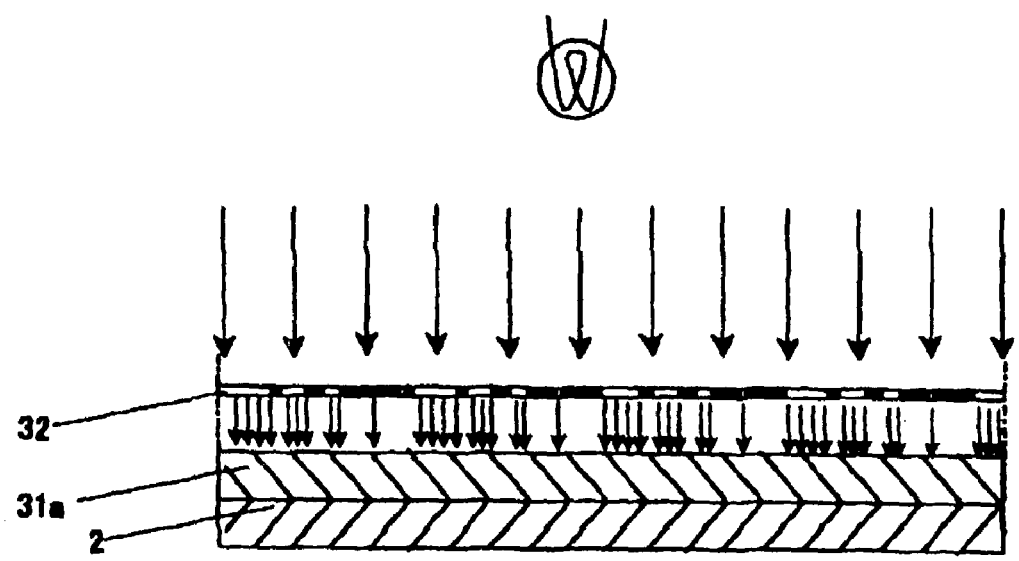
FIG. 2 is a schematic view explaining an exposure step according to the present invention.
Figure 3A:
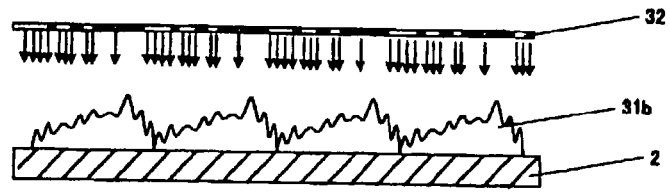
FIGS. 3(a) and 3(b) are a schematic view explaining exposure and development steps according to the present invention and a schematic view showing an uneven cross-sectional shape of the cured resin layer according to the present invention, respectively.

First, a thermosetting photosensitive resin is coated to form a photosensitive resin layer 31a in a certain thickness on one of the transparent substrates that has a smooth surface (the lower transparent substrate 2 in the typical example shown in FIG. 1) as shown in FIG. 2. The photosensitive resin layer 31a is exposed through a photomask 32 having a certain light-transmission pattern by a proximity method, and the photosensitive resin layer is developed. This treatment creates an insolubilized resin layer 31b, which has a plurality of concave stripes and/or convex stripes having slant surfaces with minute unevennesses as shown in FIG. 3a. The unevennesses are created by differences of transmitted light in terms of intensity distribution, which are caused by diffraction and interference in exposure. A high-pressure mercury lamp, a low-pressure mercury lamp or the like may be used as the light source.

Figure 3B:
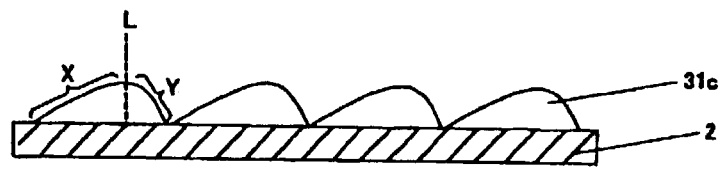

Next, the insolubilized resin layer 31b is subjected to a heat treatment at a particular temperature to be rapidly thermally cured. At the same time, the minute unevennesses are melted and lost to improve the surface smoothness, forming a cured resin layer 31c as shown in FIG. 3b. The cured resin layer 31c corresponds to the uneven layer 12, which is a layer having an asymmetric sectional shape in a particular direction and providing unevennesses for forming reflection regions as light reflection surfaces comprising a plurality of concave stripes and/or convex stripes having a smooth surface.

In the present invention, the phrase "asymmetric sectional shape" means that when a perpendicular line L is drawn from a substrate surface so as to pass through the top peak of a convex stripe as shown in FIG. 3b, lengths X and Y on both sides of the line are different. In the case of the concave stripes, the phrase "asymmetric sectional shape" means that when a perpendicular line is drawn from a substrate surface so as to pass through the bottom peak of a concave stripe, lengths X and Y on both sides of the line are different.

The phrase "smooth surface" means that the minute unevennesses are reduced in number or are lost as seen by comparing FIG. 3b with FIG. 3a.

The pattern formed in the photomask 32 may include line-shaped light shielding portions and transmission portions, wherein at least one of the width of the light shielding portions and the width of the transmission portions monotonically changes. This arrangement can create areas having different amounts of transmission to form the concave stripes and/or convex stripes, which have an asymmetric sectional shape in a particular direction. The light shielding portions may produce a gray-scale image. That sort of pattern is of such a size to be easily fabricated in a large-scale photomask suited to a proximity aligner. The concave stripes and/or convex stripes do not necessarily cover the entire reflection regions and may partly include flat portions.

Figure 4:
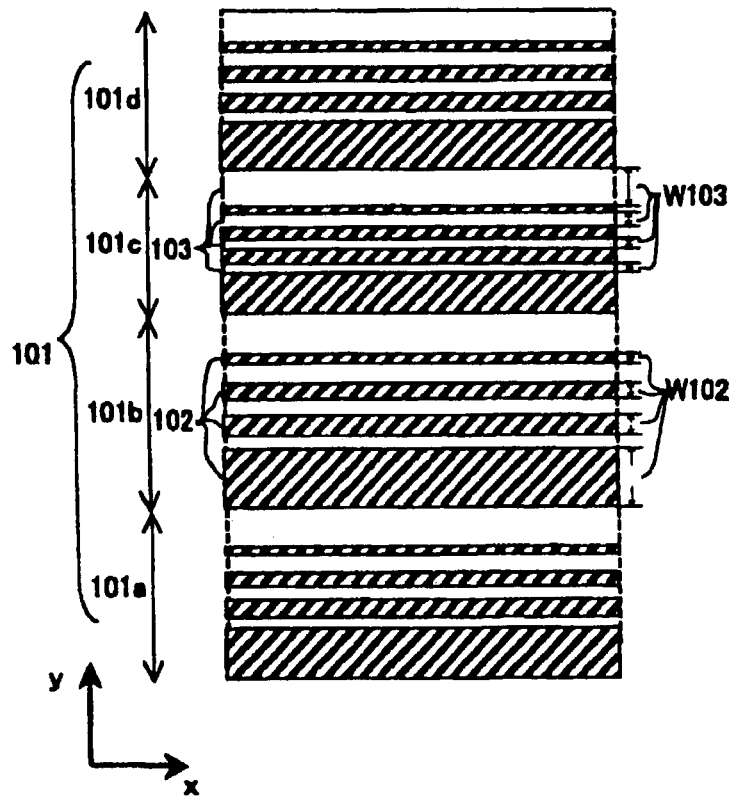
FIG. 4 is a plan view showing a pattern alignment of the photomask according to the present invention.

A typical example of the pattern is schematically shown in FIG. 4. In each of the schematic views of the patterns or the reflection regions shown in FIG. 4 and its subsequent figures, the positive direction of an x-axis is indicated as being a right direction on the drawing sheet, and the positive direction of a y-axis is indicated as being an upward direction on the drawing sheet at the bottom left position of the drawing sheet. The reason why the positive direction of the y-axis is indicated as being the upward direction on each of the drawing sheets is that, provided that each of the drawing sheets is considered as the screen of an actual display, the effect of the present invention is usually offered in the best fashion when a user watches the display screen with the upward direction of the drawing sheet directed to the positive direction of the y-axis. The positive direction of the y-axis in the seventeenth aspect or the like may be freely defined on each of the xy planes, and it does not always mean the upward direction on the drawing sheets as just stated. In many cases, it is preferable in consideration of how to use normal displays that the positive direction of the y-axis conforms to the upward direction on the drawing sheets.

In FIG. 4, the pattern 101 includes line-shaped light shielding portions 102 having widths W102 and shown as shaded portions and line-shaped transmission portions 103 having widths W103 and shown as unshaded portions between adjacent light shielding portions. The widths W102 of the light shielding portions 102 are monotonically decreasing from the bottom one toward the top one. Conversely, the widths W103 of the light shielding portions 103 are monotonically increasing from the bottom one toward the top one.

In the specification, when it is necessary to refer to discrete portions of the pattern or other elements, reference numerals 101a, 101b, 101c, 101d are used in some cases. When the pattern or other elements are collectively referred to, reference numeral 101 is used in some cases.

As to the combination wherein at least one of the width of the light shielding portions and the width of the transmission portions monotonically changes, there may be a combination of a monotonous width decrease or a monotonous width increase and a constant width in addition to a combination of a monotonous width decrease and a monotonous width increase as stated earlier. However, a combination of a monotonous width decrease and a monotonous width decrease, or a combination of a monotonous width increase and a monotonous width increase provides no good result in most cases.

Figure 5:
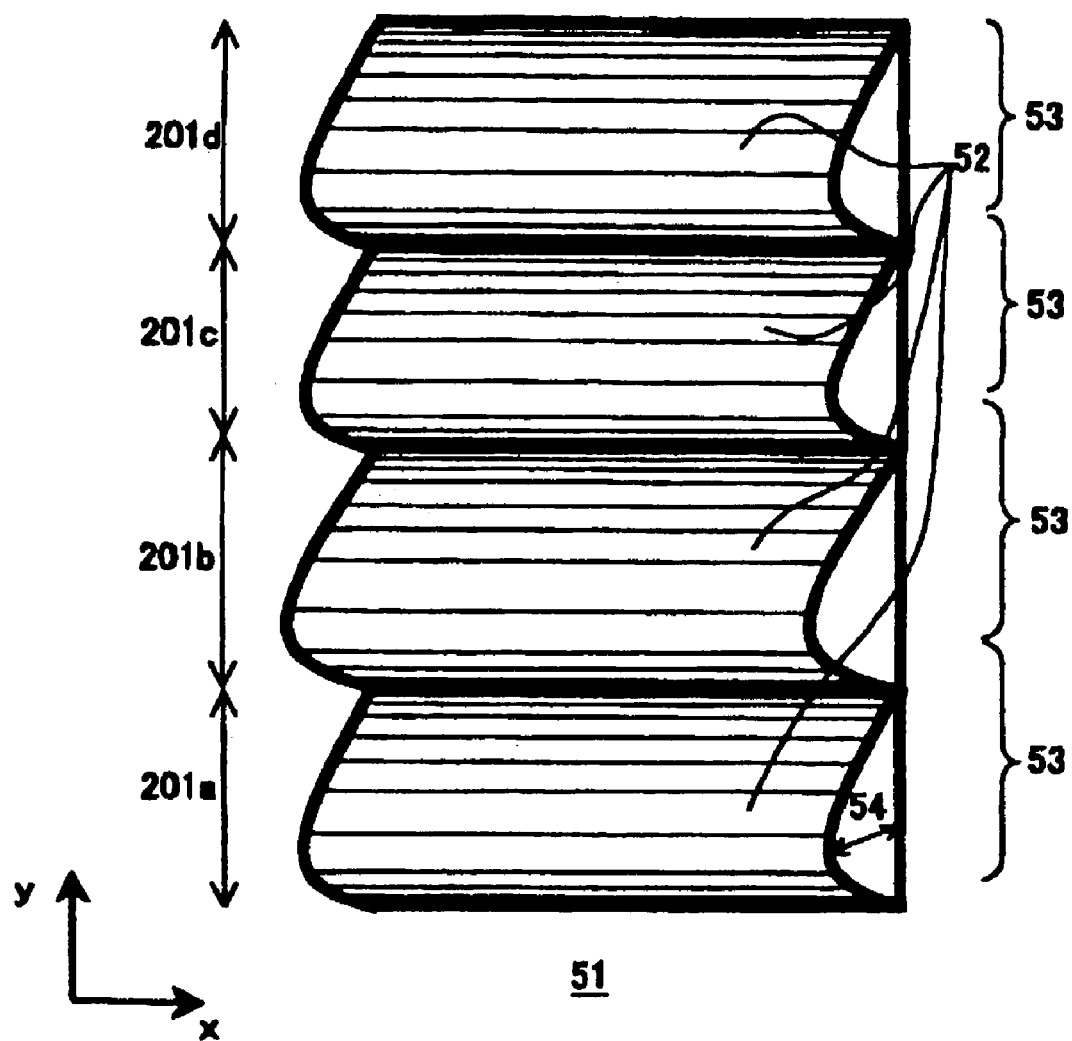
FIG. 5 is a schematic perspective view showing reflection regions of a reflection layer obtained by using the pattern shown in FIG. 4.

Reflection regions of a reflection layer obtained by using the pattern shown in FIG. 4 are schematically shown as a perspective view in FIG. 5. In FIG. 5, the reflection regions 51 are a typical example of the reflection regions, which have an asymmetric sectional shape in a particular direction and include a plurality of concave stripes and/or convex stripes having a smooth surface in accordance with the present invention. The reflection regions formed in such a shape have a light reflectiveness in a specific direction. The particular direction in FIG. 5 is the y-axis direction. The width 201 of the convex stripes corresponds to the pattern 101 shown in FIG. 4.

It has been revealed that the width of each of the light shielding portions and the width of each of the transmission portions in the photomask are preferably 1 to 15 μm, and that the cycle of pattern sections is preferably 20 to 60 μm. In the case shown in FIG. 4, this means that the widths W102 and the widths W103 are set at a value from 1 to 15 μm, that the cycle of each of the pattern sections 101a to 101d is set at a value from 20 to 60 μm and that the widths W102 or the widths W103 are set within these numerical ranges so as to be monotonically increasing or decreasing.

This arrangement can provide internally reflected light with a scattering directivity in the y-axis direction in the case shown in FIG. 4. Specifically, since the surface of the reflection layer that has been formed on the cured resin layer by using a photomask having such a pattern reflects the shape of the surface of the cured resin layer, light that is reflected on the reflection layer is reflected in a specific direction, and variations in the widths or the slants of slant surfaces in respective certain ranges scatters the reflection light.

It is preferable that at least one of the form of each of the line-shaped light shielding portions and the form of each of the line-shaped transmission portions is curved or linear. The form may be linear as shown in FIG. 4, have a combination of curves as shown in FIG. 6 or have a combination of angularly bent lines as shown in FIG. 7 or 8.

Figure 6:
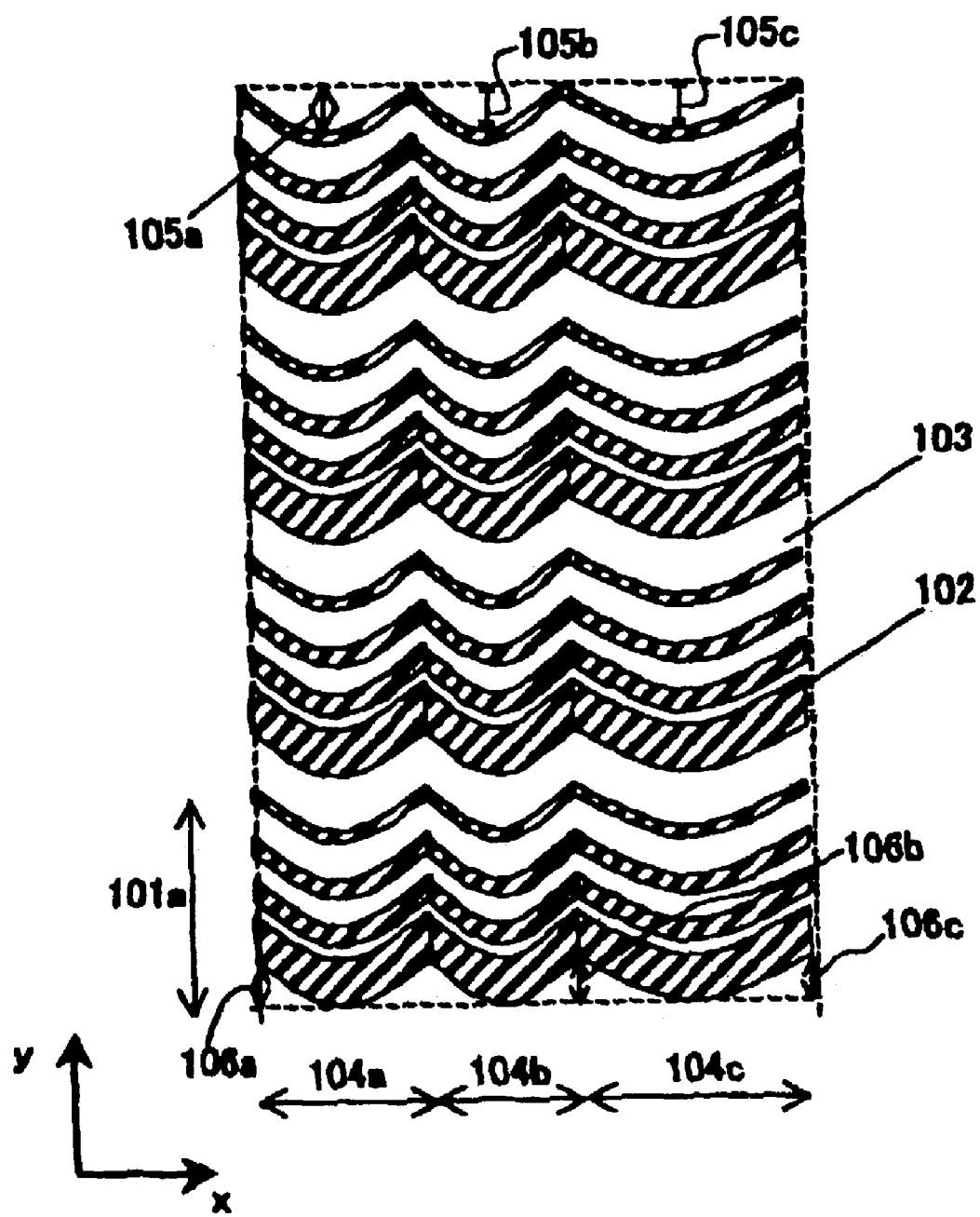
FIG. 6 is a plan view showing another pattern alignment of the photomask according to the present invention.
Figure 7:
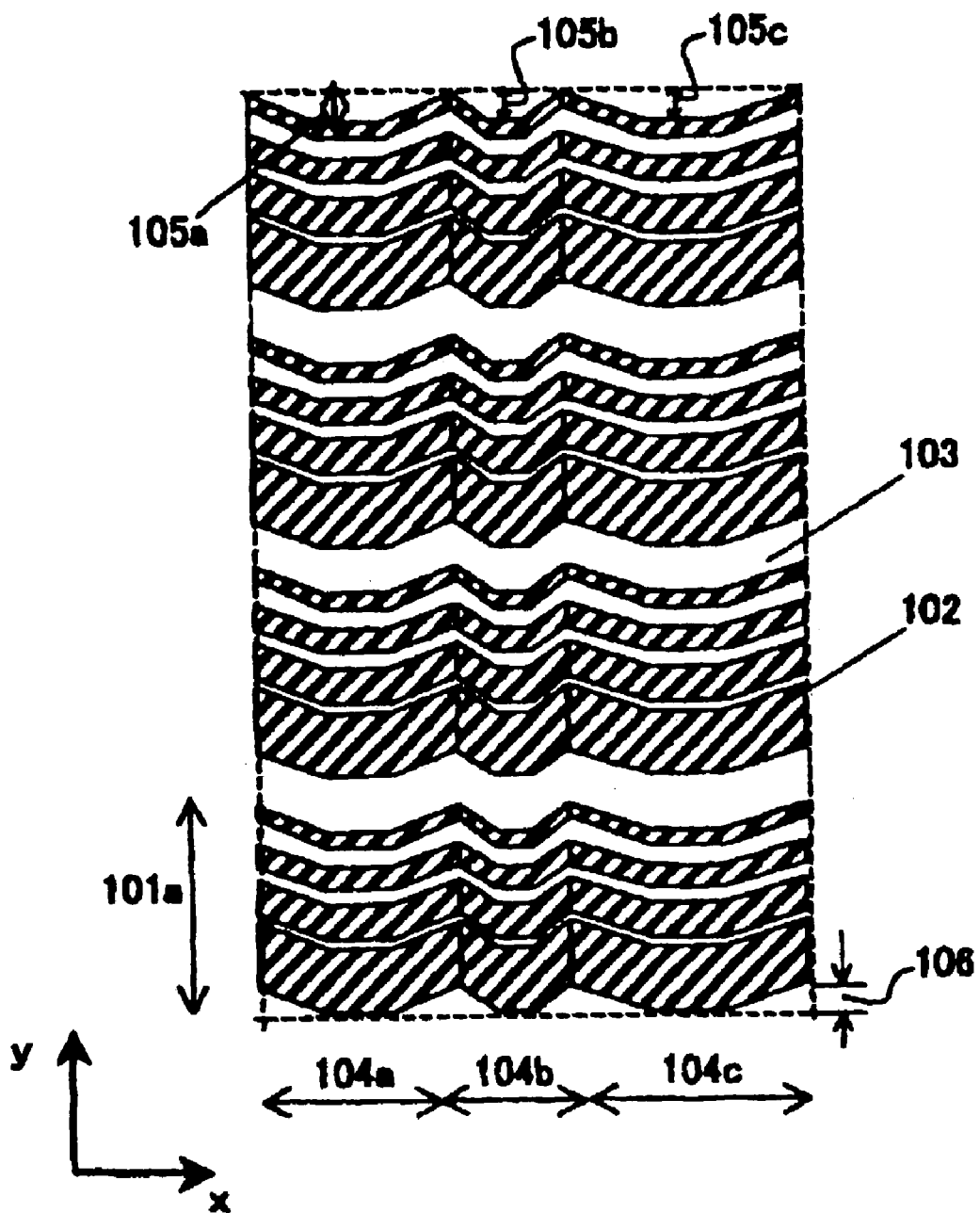
FIG. 7 is a plan view showing another pattern alignment of the photomask according to the present invention.
Figure 8:
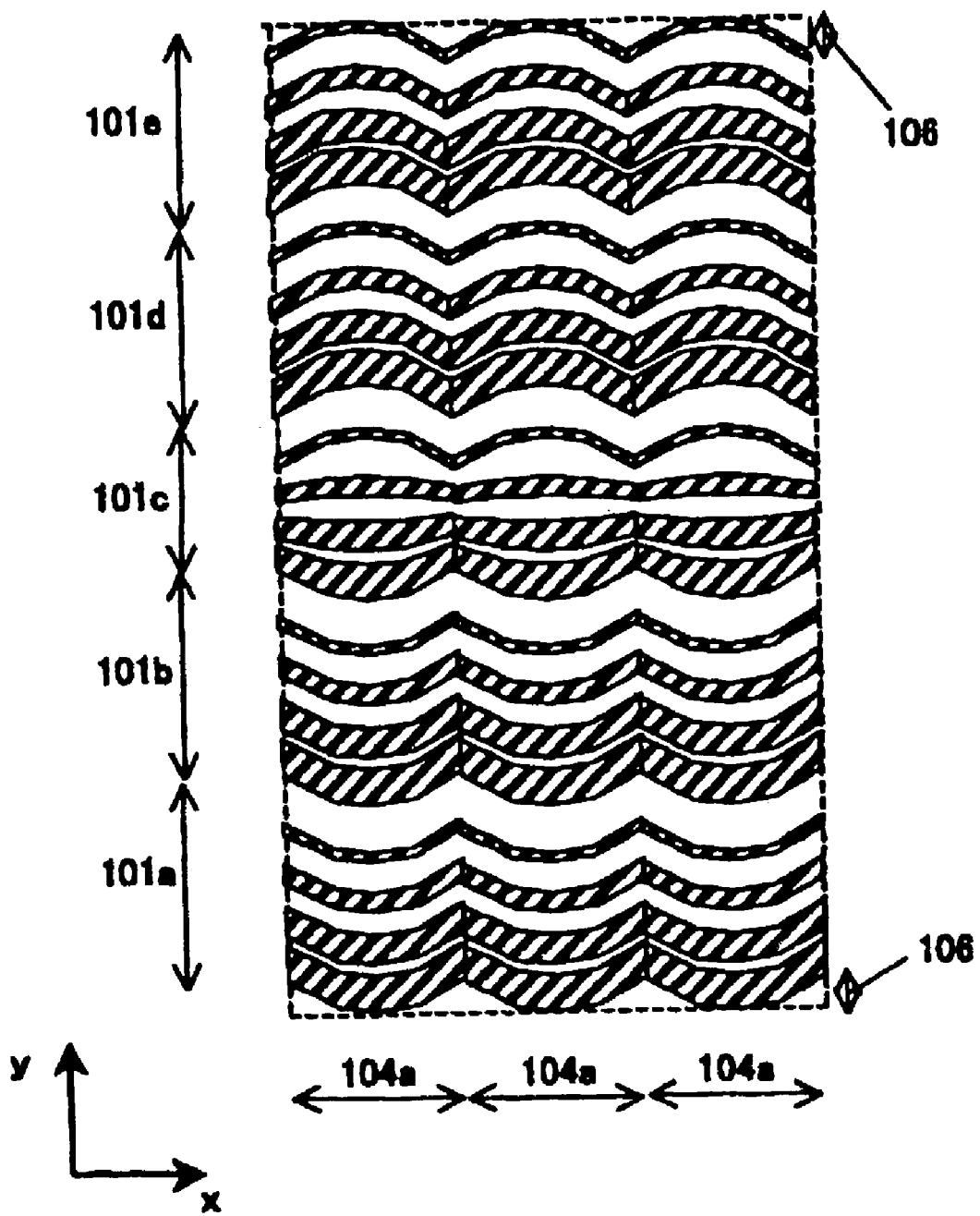
FIG. 8 is a plan view showing another pattern alignment of the photomask according to the present invention.

Each of the patterns shown in FIGS. 6 to 8 is one that is obtained by stepwise changing the widths of wavy forms in each pattern section as a typical example of curved forms to create areas having different amounts of transmission in the y-axis direction in each of the figures. It is preferable that the cycles 104 of the wavy forms in the x-axis direction are 10 to 100 μm. By the variations in the cycles and the presence of the wavy forms, the light that has been reflected on the reflection layer obtained by using each of the photomasks fabricated as shown in FIGS. 6 to 8 is provided with a scattering directivity for internally reflected light not only in the y-axis direction but also in the x-axis direction.

In FIG. 8, the directions of the wavy forms are changed at a position 101c. That sort of direction change is preferable in some cases.

It is preferable that the ratio of an amplitude 105 or 106 to a cycle 104 in the x-axis direction is 0.05 to 1. This is because it is easy to provide a scattering directivity for internally reflected light.

Figure 9:
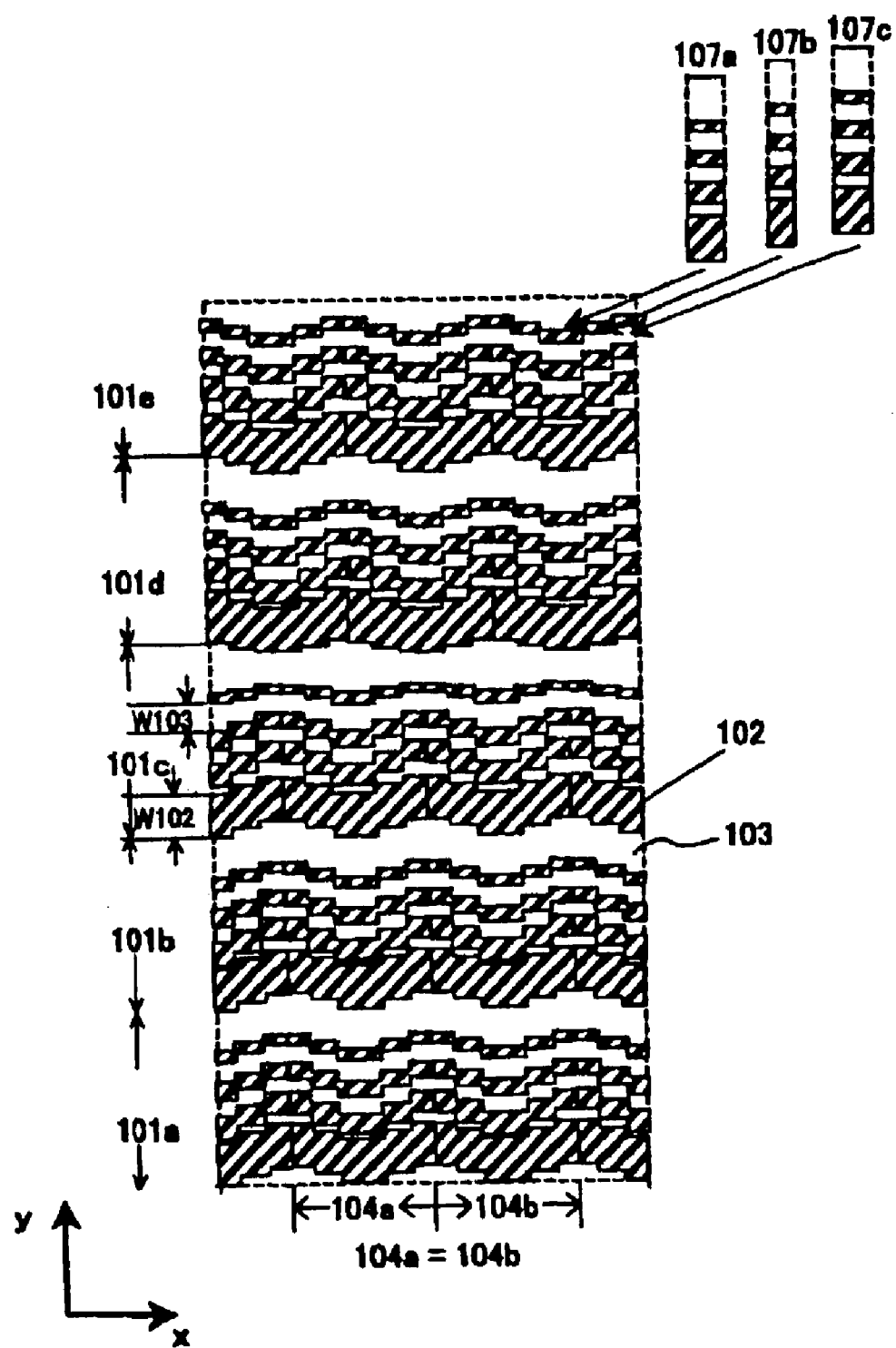
FIG. 9 is a plan view showing another pattern alignment of the photomask according to the present invention.

In the case of the pattern shown in FIG. 9, a required pattern, wherein light shielding portions 102 and transmission portions 103 as a combination of rectangular shapes have a constant cycle 104 in the x-axis direction, is obtained by stepwise and monotonically changing the widths W102 and the widths W103 in the y-axis direction to form comb-like gray scale regions 107 capable of producing areas having different amounts of transmission in terms of gray scale so as to range in the x-axis direction. This pattern is also one of the wavy forms. The phase of the cycles of the pattern sections 101d and 101e in the x-axis direction is out of synchronization with the phase of the cycles of the pattern sections 101a and 101b in the x-axis direction by ½ of the cycle 104.

Figure 10:
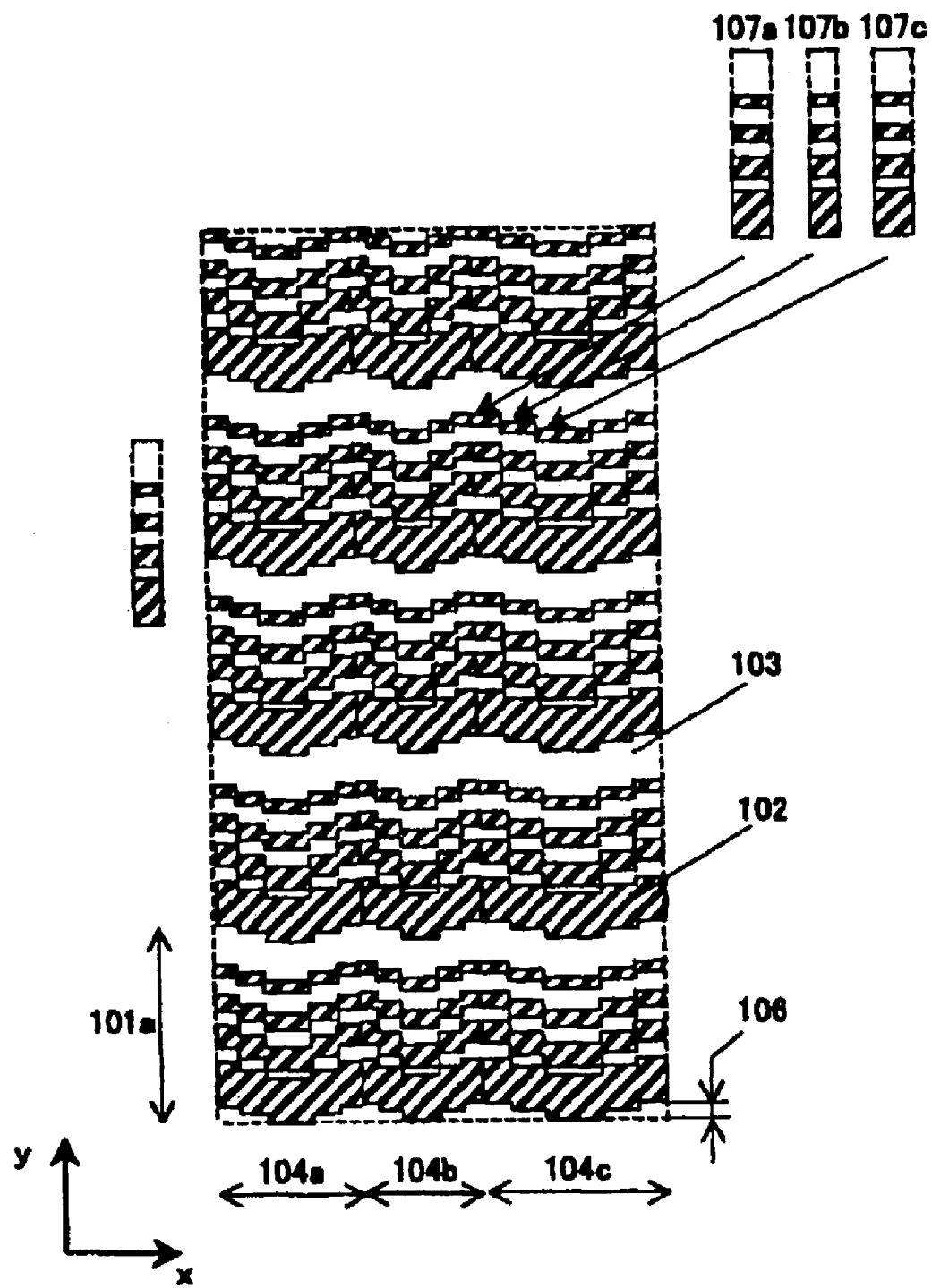
FIG. 10 is a plan view showing another pattern alignment of the photomask according to the present invention.

In the pattern shown in FIG. 10, comb-like gray scale regions 107 (e.g., pattern sections 107a to 107c) are formed so as to range in a wavy form in the x-axis direction as in the pattern shown in FIG. 9. However, the pattern is different from the pattern shown in FIG. 9 in that the cycles 104 in the x-axis direction are not constant, and that the phases of the cycles in the x-axis direction are in synchronization in the y-axis direction.

The light shielding portions 102 and the transmission portions 103 as a combination of rectangular shapes have respective widths in a range from 1 to 15 µm, and the cycles of the pattern sections are set at a constant value in a range form 20 to 60 µm. It is preferable that the cycles 104 of the wavy forms in the x-axis direction is 10 to 100 µm. It is preferable that the ratio of an amplitude 106 to a cycle 104 in the x-axis direction is 0.05 to 1.

Figure 11:
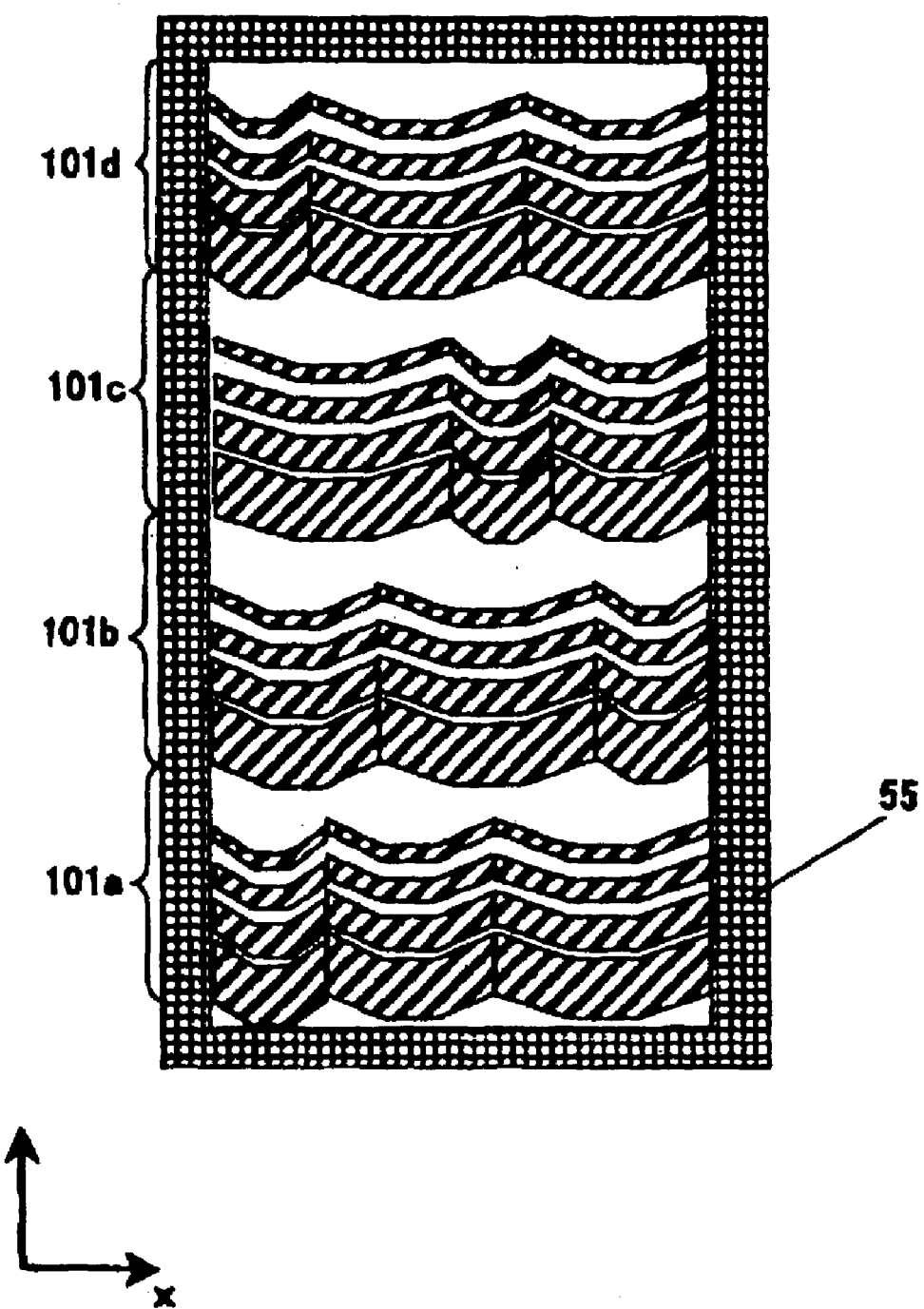
FIG. 11 is a plan view showing another pattern alignment of the photomask according to the present invention.
Figure 12:
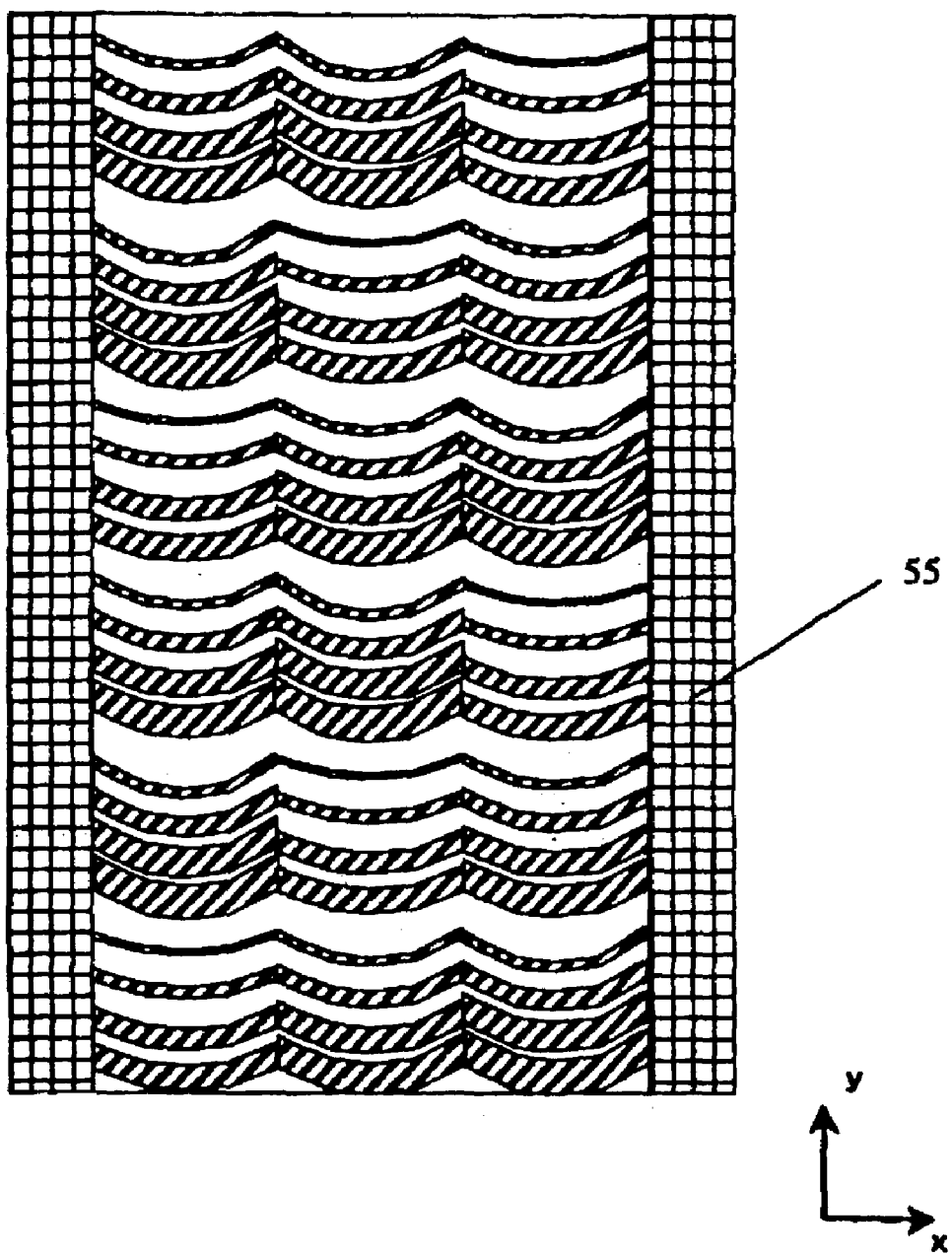
FIG. 12 is a plan view showing another pattern alignment of the photomask according to the present invention.

Although the pattern is formed so as to produce unevennesses on a portion of the reflection layer corresponding to the liquid crystal display screen, the pattern does not necessarily cover the entire "portion of the reflection layer corresponding to the liquid crystal display screen". For example, an arbitrary pattern 55 different from the pattern according to the present invention may be provided as shown in FIG. 11 or 12. The position or the shape of the arbitrary pattern 55 may be selected according to usage, as long as the effect of the present invention can be ensured.

In FIG. 11, some of the transmission portions have a significantly greater width. When some of the widths of the transmission portions are significantly great, the slants of the unevennesses become drastically gentle or partly flat in some cases.

The photomask shown in FIG. 12 is shown as having three kinds of wavy pattern sections combined together when seen in the y-axis direction or the x-axis direction, as a typical example.

The photosensitive resin layer according to the present invention is exposed through that sort of photomask in a proximity method and is developed. The proximity method is a method wherein a photomask is provided in the vicinity (proximity) of a photosensitive resin, without being contacted on the photosensitive resin. It is preferable that the distance between the surface of the photosensitive resin layer and the photomask (the proximity gap) is normally 40 to 300 µm. It is preferable that the collimation angle is set at 1 to 4°.

The reason why the collimation angle is set at 1 to 4° is that it is easy to form concave stripes or convex stripes having an asymmetric cross-sectional shape and having slant surfaces formed with minute unevennesses closely united so that a reflection surface is provided with a light reflectiveness in a specific direction and a scattering directivity with respect to internally reflected light. There is a tendency that when an effect similar to the effect obtained by a combination of a collimation angle and a proximity gap can be also realized by a combination of a greater collimation angle and a smaller proximity gap.

The particular direction means a direction in which reflection layer should be provided with the reflectiveness in the specific direction on a surface parallel with the outer surface of the display screen, and which may be determined according to the purposes. The particular direction will be described, referring to FIG. 13.

Figure 13:
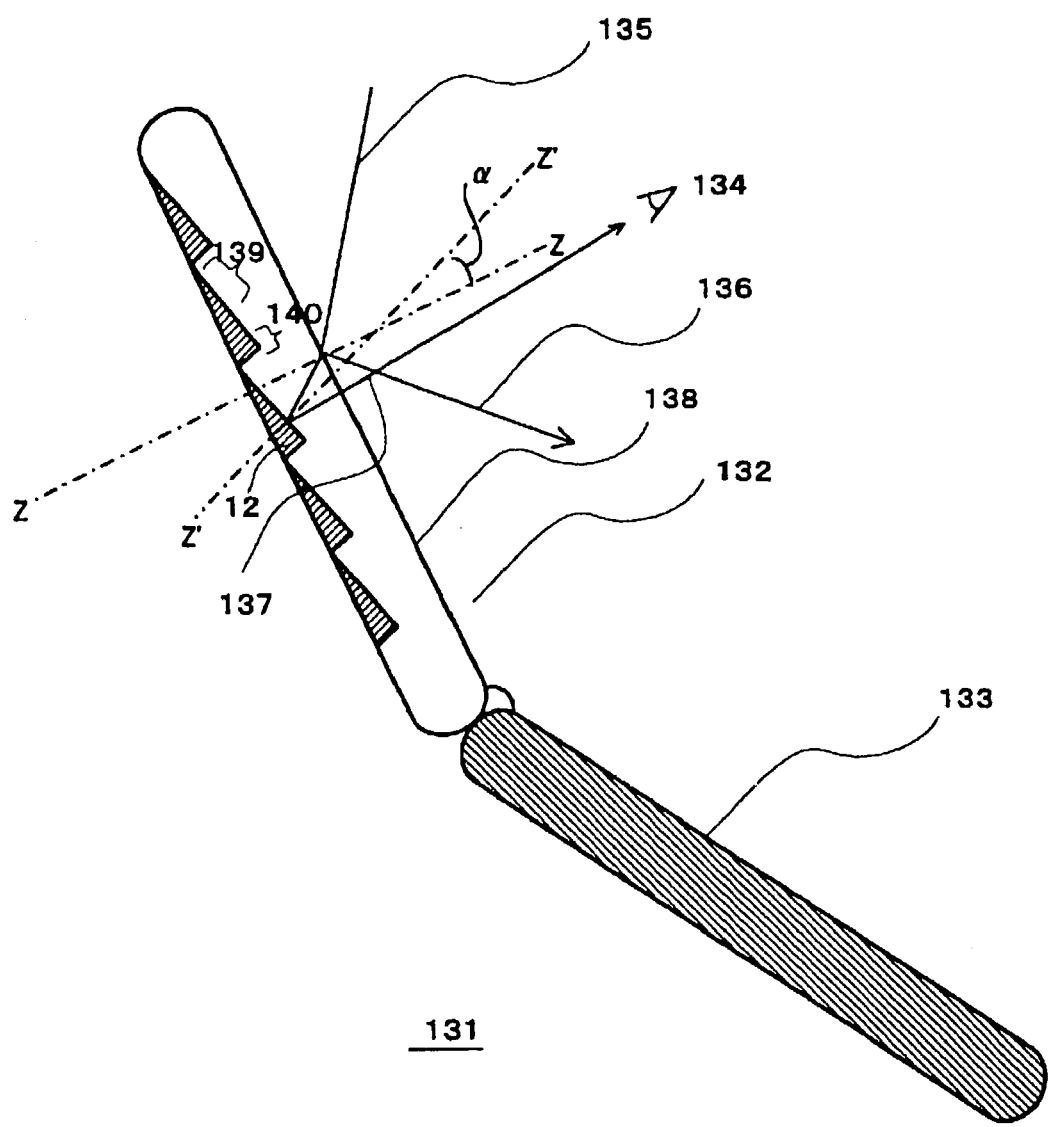
FIG. 13 is a schematic cross-sectional side view of a cellular phone.

FIG. 13 is a schematic cross-sectional view of a cellular phone 131. FIG. 13 shows a state wherein a user watches a display screen 132 on a control panel 133 with his or her eyes 134. In this case, light reflected on the outer surface 138 of the display screen 132 among incident light 135 coming along the drawing sheet is reflected as reflection light 136, which is axisymmetric with respect to a line Z—Z perpendicular to the outer surface 138 of the display screen. The light that is reflected on a reflection surface (or a reflection region) on the uneven layer (or the cured resin layer) 12, the reflection regions of which are exaggeratedly shown as having an asymmetric cross-sectional shape in the particular direction according to the present invention, is reflected as reflection light 137, which is axisymmetric with respect to a line Z'—Z' perpendicular to the slant surface in that reflection region.

By this arrangement, when the reflection light 137 is caught, a glare-avoiding effect can be offered since the reflection light 136 reflected on the outer surface 138 of the display screen is no obstacle. The reflection regions according to the present invention are regions for realizing the glare-avoiding effect. It is preferable that the reflection light 137 passes perpendicular to the outer surface 138 of the display screen 132.

The reason why the thermosetting photosensitive resin is used is that during the heat treatment stated earlier, the insolubilized resin layer set in the exposing and developing treatment as the previous treatment to some extent is not only sufficiently thermally cured but also softened to melt and lose, by thermal sag, the minute unevennesses on the concave stripes or convex stripes having an asymmetric cross-sectional shape, thereby making the unevennesses smooth. As that sort of resin, a positive photosensitive resin or a negative photosensitive resin is applicable.

The positive photosensitive resin is normally of a solvent dilutable type (solvent dissolve type). Examples of the positive photosensitive resin are PC411B, PC403 and PC409 manufactured by JSR Corporation, and OEBR-1000 manufactured by Tokyo Ohka Kogyo Co., Ltd. Examples of the negative photosensitive resin are ones in V259PR series manufactured by Nippon Steel Chemical Co., Ltd. Although the practical range of the coating thickness is 0.5 to 10 µm, the range from 1 to 5 µm is preferable, considering ease in coating and a thermal expansion difference to a glass substrate. The photosensitive resin may be coated in an equal thickness by a spinner or the like. The photosensitive resin can be formed according to an exposure intensity distribution since the photosensitive resin can undergo an intermediate reaction according to exposure intensity. For example, PC411B has the reaction ratio substantially linearly changing up to 100 mJ/cm$^2$.

Whether the resin is thermally cured and has the surface smoothed by the heat treatment can be determined by actually forming that sort of uneven portion and subjecting the uneven portion to exposure, development and heat treatments. Whether the surface of the thermally cured resin layer has been smooth, or whether the degree of smoothness has been improved can be made sure by visually inspecting the surface, evaluating the surface roughness, evaluating the reflectiveness in the specific direction, checking the glare avoiding effect or other various methods. In many cases, a pretreatment wherein the resin is prebaked to have the solvent emitted therefrom is carried out before the exposure treatment.

The heat treatment may be carried out in any known fashion. The investigation has revealed that it is preferable to use a positive photosensitive resin as the photosensitive resin, to set the temperature for the heat treatment at 150 to 260° C. and to set the time period for the treatment at 1 min or longer in order to obtain a required cross-sectional shape. For example, a method for carrying out heating for 60 min in a clean oven with a temperature from 150 to 260° C. kept therein is applicable.

It is preferable that the entire insolubilized resin layer is rapidly heated to be easily softened at the initial stage in the heat treatment. For example, it is preferable that it takes 30 sec or shorter for the surface temperature of the insolubilized resin layer to reach a temperature of 150° C. from room temperature. From this viewpoint, it is preferable to utilize a heating method having a great heat capacity, such as a heating method using thermal contact conductance. After that, it may be possible to heat the insolubilized resin layer by using another heating method, such as a convection heating method. Specifically, a method for carrying out heating with different steps, wherein a hot plate is used to carry out heating at a temperature from 150 to 200° C. for 1 to 5 min, and then heating is carried out at a clean oven at a temperature from 200 to 260° C. for 60 min for baking and setting, or a single-substrate processing clean oven is applicable.

The transflective reflection layer 13, which is made of a metal film, is provided on the uneven layer 12, which corresponds to the thermally cured resin layer 31c formed on the second transparent substrate 2 as stated earlier.

As shown in FIG. 1, the photosensitive resin may be coated entirely on one surface of the second transparent substrate 2, followed by exposing and developing almost the entire surface of the resin layer, and then heating the developed resin layer to provide the thermally cured resin layer 31c having the required unevennesses almost entirely on the one surface of the transparent substrate 2. Alternatively, the photosensitive resin may be coated on one surface of the second transparent substrate 2 only inside the seals 17, followed by exposing, developing and heating the resin layer to provide the thermally cured resin layer 31c having the required unevennesses on the one surface of the transparent substrate 2 only inside the seals.

In some cases, the latter method is disadvantageous in terms of forming various kinds of layers on the resin layer since there is created a step between the portion with the photosensitive resin coated and the portion without the photosensitive resin. In the former method, although the transflective reflection layer 13 is formed only on the portion corresponding to the liquid crystal display screen, this layer does not contribute the formation of such a step since this layer is thin.

Explanation will be made, referring to the former method. The leveling layer 11, which is provided for surface flattening, is formed to cover the transflective reflection layer 13 and the uneven layer 12 without the transflective reflection layer 13. The transparent electrodes 4 are formed on the leveling layer 11.

Although explanation has been made primarily about the producing method according to the present invention, the investigation with respect to the present invention has revealed that the point is to provide the light reflective structure with the following features irrespective of whatever method is adopted, and that the features can realize a light reflective structure and a reflective liquid crystal display/transflective liquid crystal display, which can minimize an adverse effect created by glare, is bright and offers superior display performance.

Specifically, the light reflective structure, which comprises a light reflection layer containing reflection regions, is characterized in that the reflection regions include a plurality of concave stripes and/or convex stripes having an asymmetric cross-sectional shape with respect to a particular direction, that each of the concave stripes and/or convex stripes has a width ranging from 20 to 60 μm, and that each of the concave stripes and/or convex stripes has a smooth surface.

The reflection regions 51 shown in FIG. 5 are a typical example of the reflection regions just stated above. Convex stripes 53 have a width ranging from 20 to 60 μm, which are shown as a typical example of the concave stripes and/or convex stripes just stated above. The convex stripes have smooth surfaces 52, which are shown as a typical example of the smooth surface of the concave stripes and/or convex stripes just stated above. A portion having a height 54 is shown to have an asymmetric cross-sectional shape with respect to the y-axis direction as the particular direction.

Figure 19:
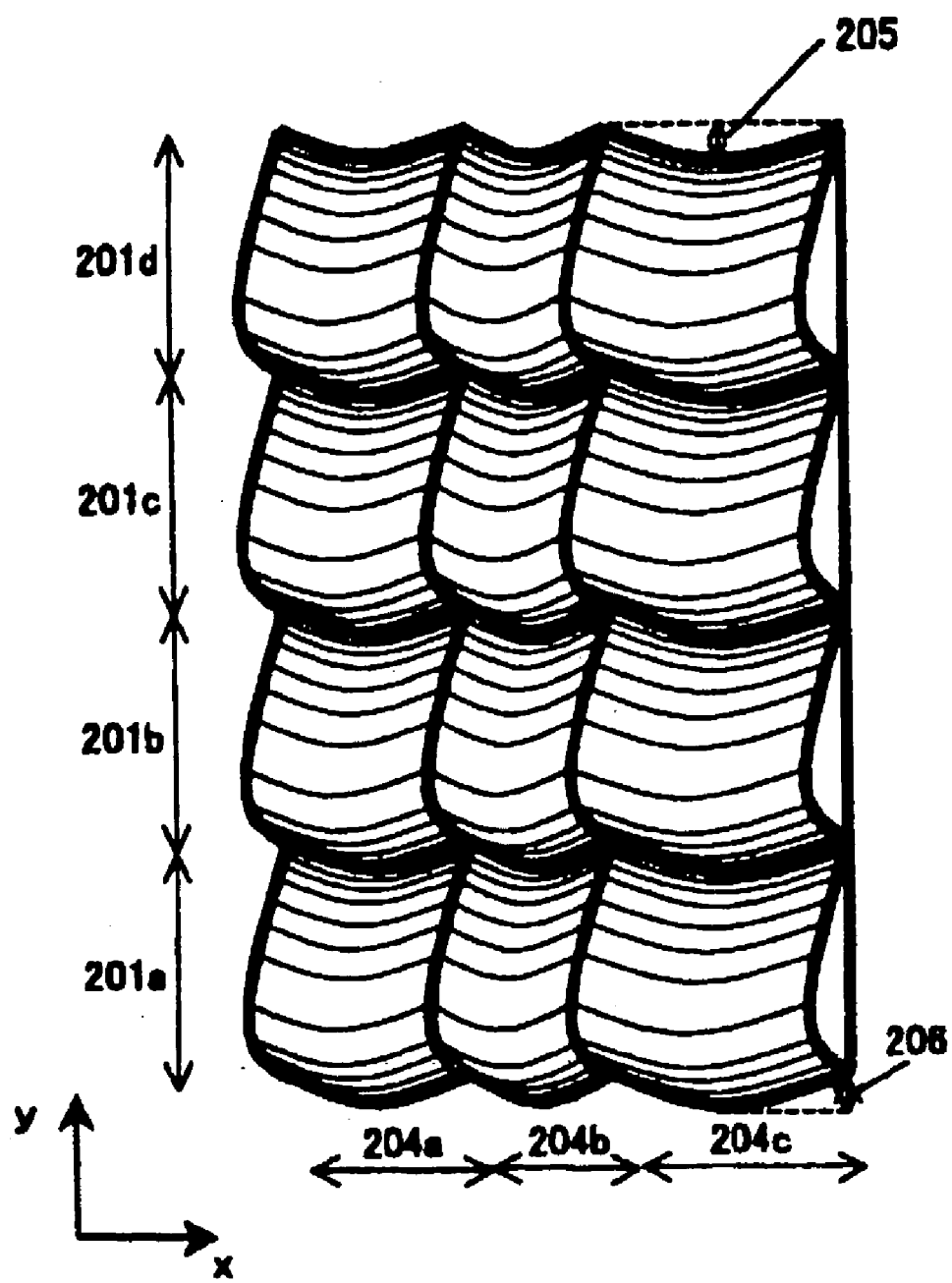
FIG. 19 is a schematic perspective view showing reflection regions of a reflection layer obtained by using the pattern shown in FIG. 7.
Figure 20:
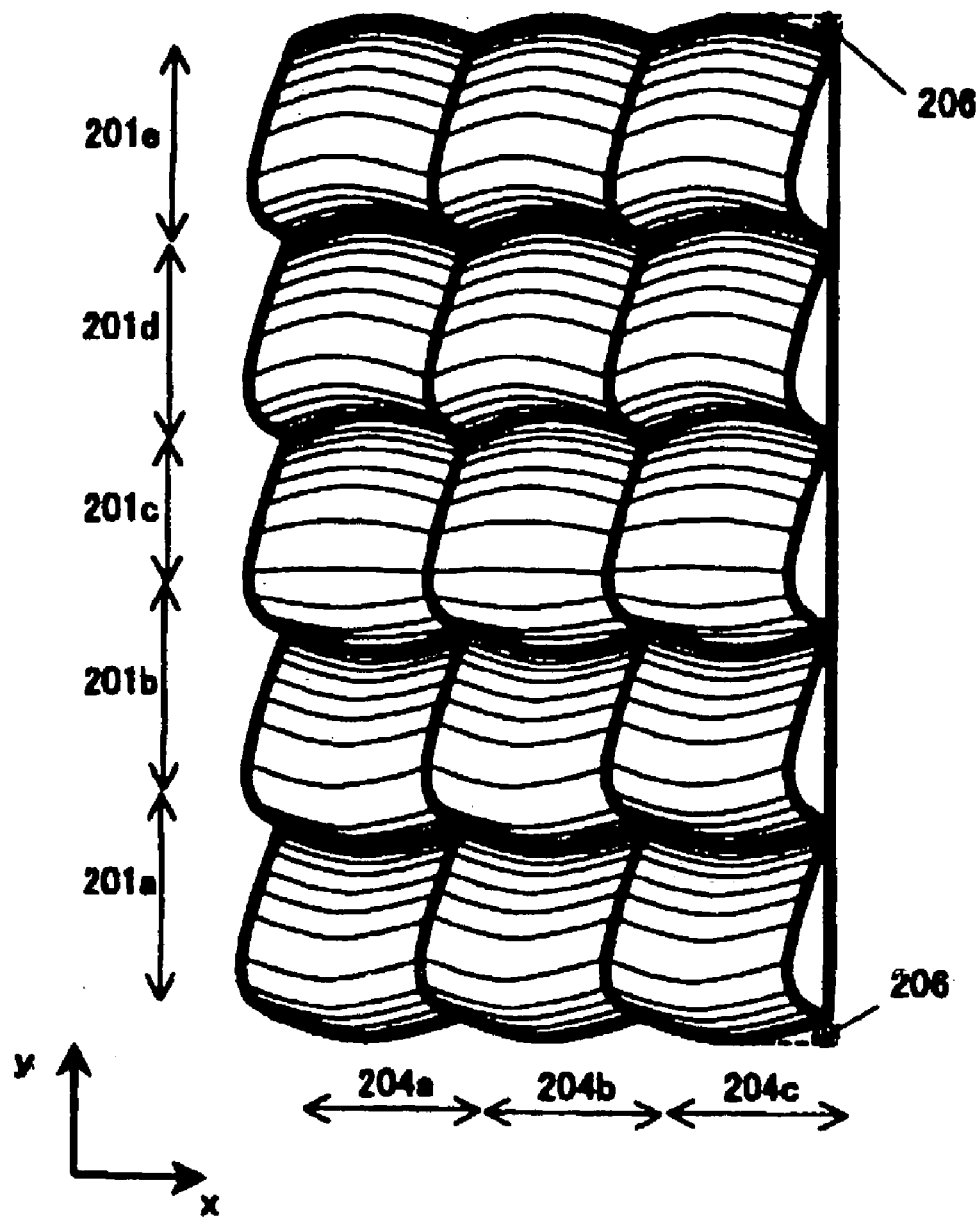
FIG. 20 is a schematic perspective view showing reflection regions of a reflection layer obtained by using the pattern shown in FIG. 8.

FIG. 19 shows another typical example of the reflection regions and the concave stripes and/or convex stripes, which are created by using the pattern shown in FIG. 7. FIG. 20 shows another typical example of the reflection regions and the concave stripes and/or convex stripes, which are created by using the pattern shown in FIG. 8.

It is preferable that the height of the concave stripes and/or the depth of the convex stripes ranges from 1 to 5 μm. For example, the height 54 shown in FIG. 5 is a typical example of the depth of the concave stripes and/or the height of the convex stripes.

It is preferable that the light reflective structure comprises wavy forms wherein the particular direction is the y-axis direction when the xy plane is a surface parallel with the outer surface of a display screen, and the concave stripes and/or convex stripes range together with regular or irregular amplitudes 205, 206 and with regular or irregular cycles 204 with respect to the x-axis direction. FIG. 20 shows a typical example wherein the convex stripes have wavy forms ranging together with a regular amplitude 206 and with a regular cycle 204 in the x-axis direction so as to correspond to the cycle 104 of the photomask pattern shown in FIG. 8. The cycle and amplitude as stated just above can contribute to provide the scattering directivity.

It is preferable that a cycle in the x-axis direction ranges from 10 to 100 μm. The cycles in that range can be realized by defining the cycles in the x-axis direction of the photomask pattern as stated above.

It is preferable that the ratio of an amplitude to a cycle in the x-axis direction ranges from 0.05 to 1. Specifically, a desired result can be realized by defining the ratio of a amplitude to a cycle in the x-axis direction of the photomask pattern as stated above, for instance.

In order to increase the effect of contributing to the scattering directivity with respect to internally reflected light, it is preferable that the reflection regions contain two or more kinds of combinations of a cycle in the x-axis direction and an amplitude wherein the ratio of the cycle to the amplitude in one of the combinations is different from the ratio of the cycle to the amplitude in another combination. Specifically, it is possible to realize that sort of reflection regions by using the photomask pattern shown in FIG. 7 as stated earlier, for instance.

In some cases, it is preferable that the wavy forms of the plural stripes have the phases of the cycles in the x-direction out of synchronization in the y-axis direction. Specifically, it is possible to realize that sort of reflection regions by using the photomask pattern shown in FIG. 9 or 11 as stated earlier, for instance. For example, it is seen from comparison of the cycles 101a and 101b shown in FIG. 11 in terms of the phase in the xy-axis direction that the respective cycles are out of synchronization in the y-axis direction.

Figure 23:
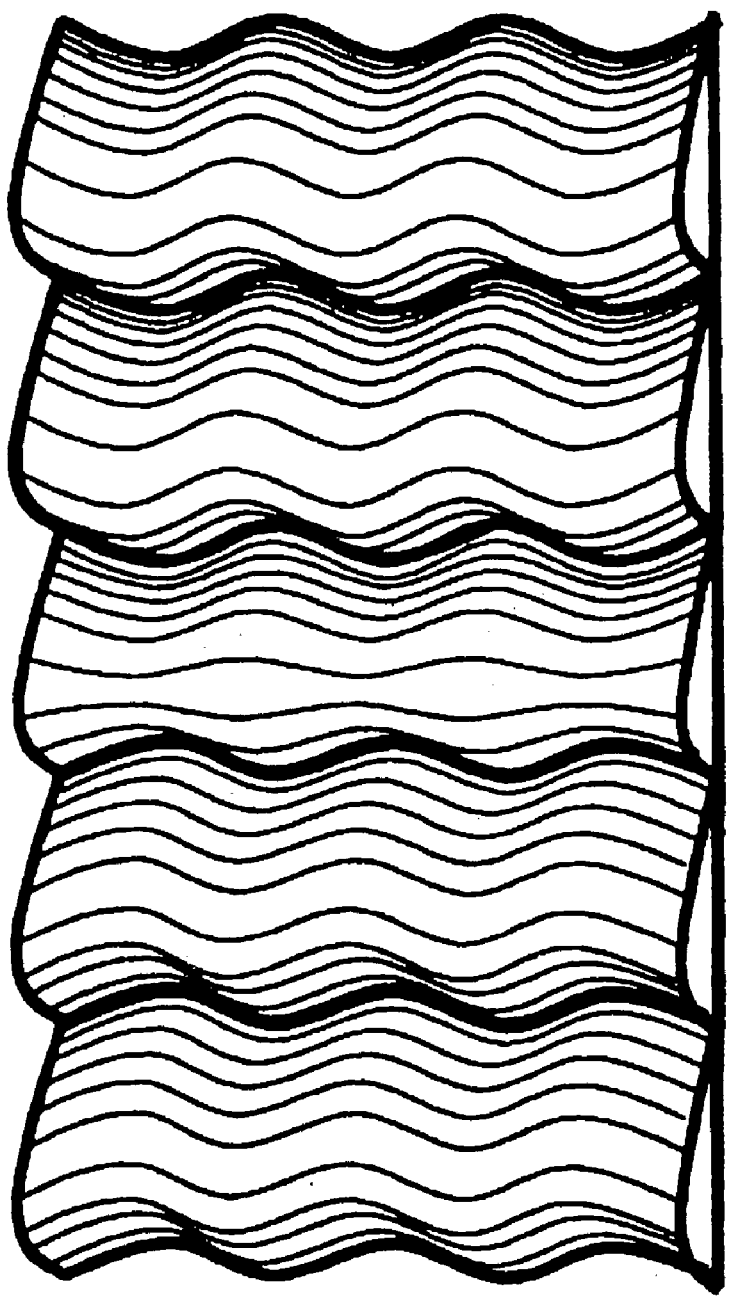
FIG. 23 is a schematic perspective view showing reflection regions of the reflection layer obtained by using the pattern shown in FIG. 9.
Figure 23:
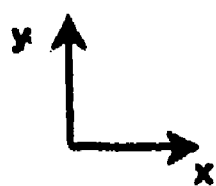

A pattern, wherein the cycle in the x-axis direction is constant and the phase of the cycle in the x-axis direction with respect to the y-axis direction is out of synchronization by half the cycle, is useful since an uneven form can be formed by a combination of regular forms. A specific example is the reflection regions shown in FIG. 23, which are obtained by using the photomask shown in FIG. 9.

Figure 21:
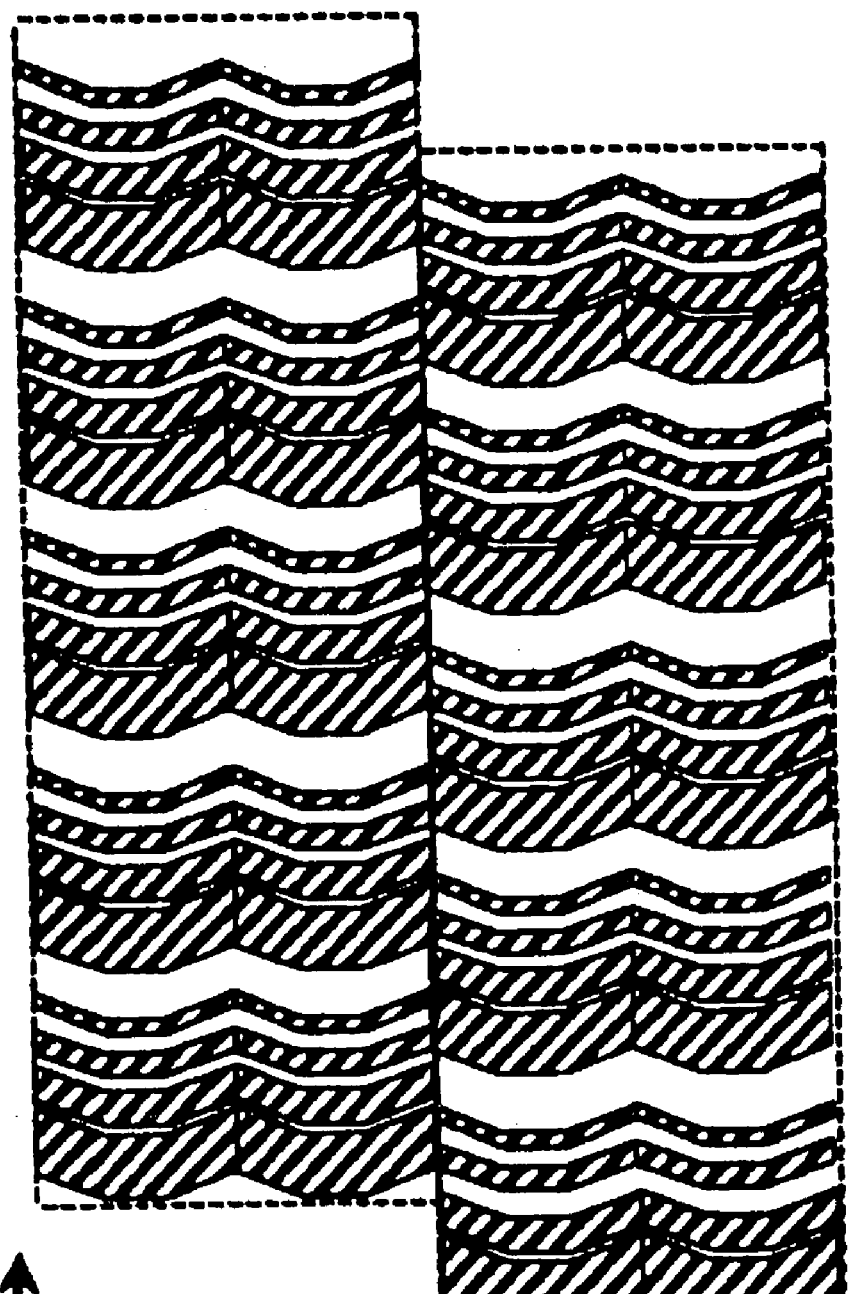
FIG. 21 is a plan view showing a photomask pattern alignment, wherein the phases of sub-regions in a y-axis direction out of synchrorelation in an x-axis direction.
Figure 22:
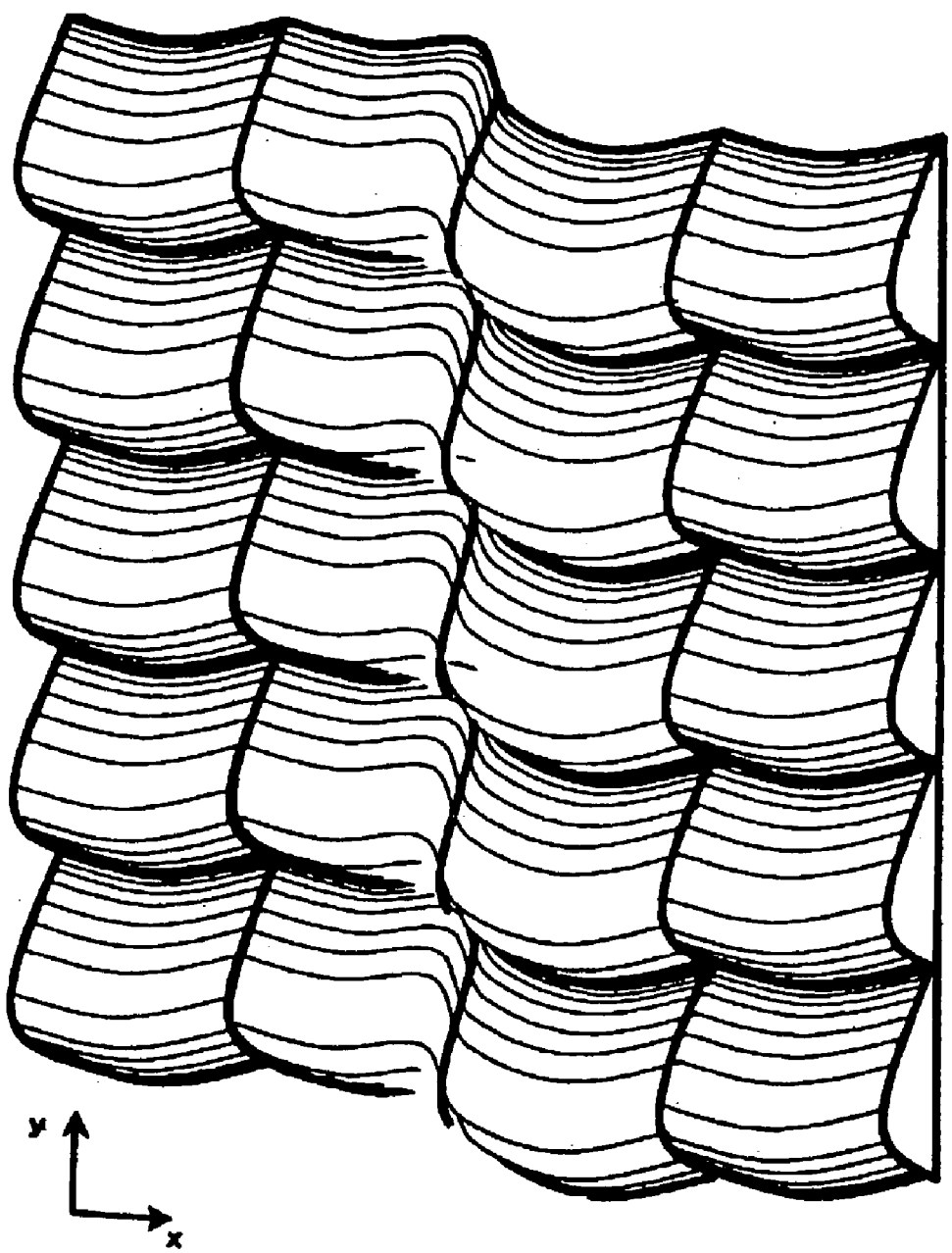
FIG. 22 is a schematic perspective view showing reflection regions of a reflection layer obtained by using the pattern shown in FIG. 21.

In some cases, it is preferable that when the reflection regions are divided into a plurality of sub-regions in the x-axis direction, the phases of the sub-regions in the y-axis direction are out of synchronization in the x-axis direction, in contrast to a case wherein the phases in the x-axis direction are out of synchronization in the y-axis direction. A specific example is the reflection regions shown in FIG. 22, which are obtained by using the photomask shown in FIG. 21. In FIG. 21, only two pattern sections corresponding to two sub-regions are shown for easy understanding of how sub-regions are out of synchronization.

When each of the concave stripes and/or convex stripes having an asymmetric sectional shape in a particular direction according to the present invention is considered as being divided into a slant surface facing the particular direction and a slant surface facing the opposite direction, the point is that the slant surface facing the particular direction has a greater area.

Specifically, it has been revealed that when the particular direction is the positive direction of the y-axis, the occupation rate of slant surfaces of the concave stripes and/or convex stripes, which have a normal vector component in the positive direction of the y-axis, is preferably not lower than 55% and not higher than 90%. It becomes possible to objectively grasp the meaning of the asymmetry of the phrase "asymmetric sectional shape in a particular direction" stated earlier, the reflectiveness in a specific direction and the glare avoiding effect by taking this approach.

For example, the occupation rate of the slant surfaces stated above may be calculated by considering each of the slant surfaces of the concave stripes and/or convex stripes as a polygon as a collection of triangles, and finding the ratio of the total areas of the triangles having a normal vector component in the positive direction of the y-axis to the total area of all triangles forming the polygons.

Figure 24:
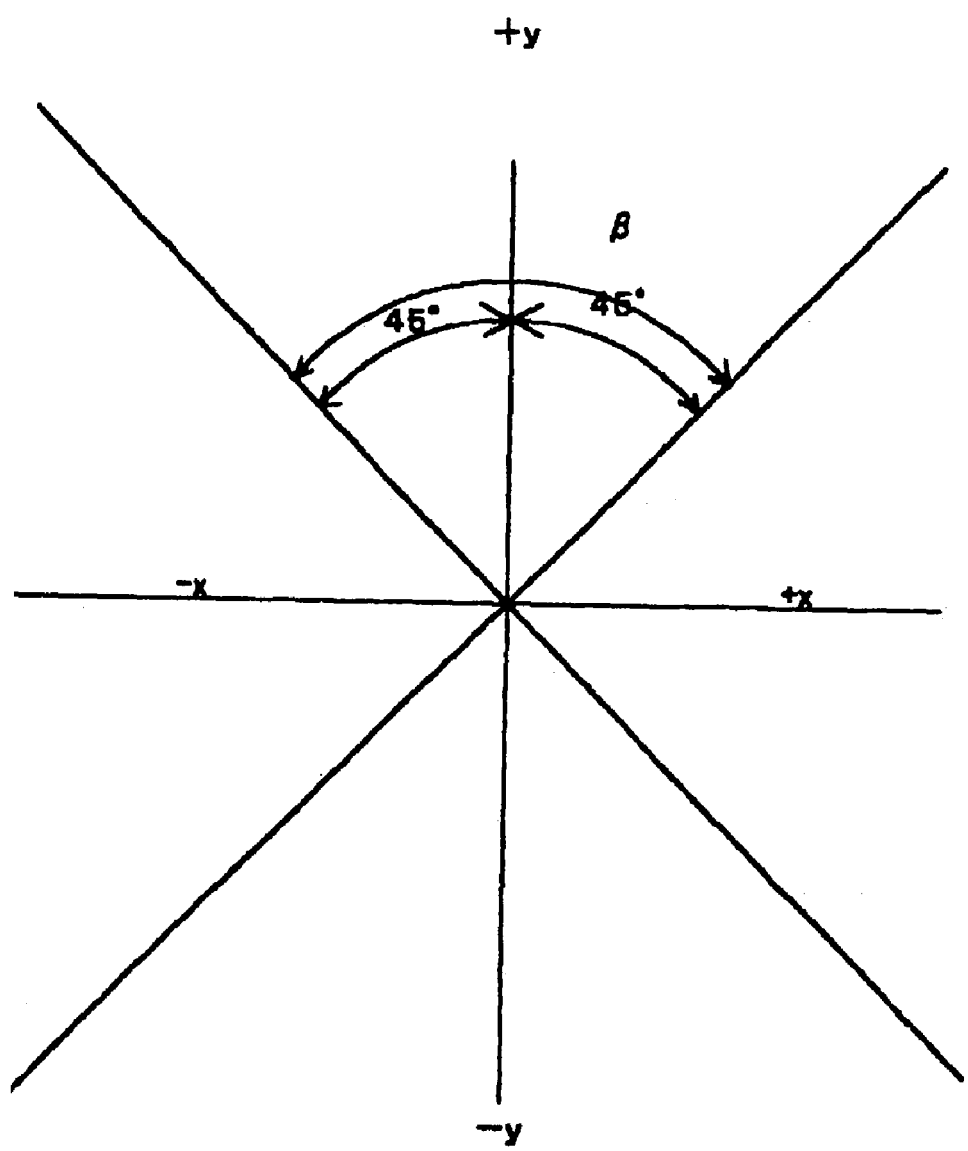
FIG. 24 is a schematic view showing a range of plus or minus 45° in the positive direction of a y-axis on a xy plane.

The consideration stated above has been mainly made about the slant surfaces in terms of the light reflectiveness in a specific direction wherein light is reflected in a specific direction. In order to provide reflection light with a scattering directivity it is preferable that when the angle between the normal direction of the xy plane and the normal direction of a slant surface is defined as a slant angle, the rate of the presence of slant angles in a range of plus or minus 45° in the positive direction of the y-axis in a slant angle distribution on the xy plane has at least one extreme value in a range of slant angles from 2 to 10°, in particular the extreme value exists in the positive direction of the y-axis. It becomes possible to objectively grasp the high visibility and the scattering directivity with respect to the internally reflected light stated earlier by taking this approach. The range of plus or minus 45° in the positive direction of the y-axis on the xy plane means the range of an angle β shown in FIG. 24. The angle α in FIG. 13 represents a slant angle.

It is possible to grasp the extreme value by considering each of the slant surfaces of the concave stripes and/or convex stripes as a polygon as a collection of triangles as in the consideration just stated above, finding slant angles with the "normal direction of a slant angle" being treated as the normal direction of the individual triangles, and finding the distribution of the slant angles in the range of plus or minus 45° in the positive direction of the y-axis on the xy plane. The reason why it is preferable that the extreme value exists in the positive direction of the y-axis is that it is easy to obtain the scattering directivity in the y-axis direction with respect to reflection light.

The light reflective structure thus constructed has been mainly described about a case wherein the entire concave stripes and/or convex stripes having an asymmetric sectional shape in a particular direction are reflection regions. However, the present invention is not limited to such a case. The present invention also covers a case wherein some of the concave stripes and/or convex stripes having an asymmetric sectional shape in a particular direction are reflection regions. This case includes a case wherein there are concave stripes and/or convex stripes having no reflection regions, and a case wherein each of the concave stripes and/or convex stripes is partly a reflection region. In this latter case, it is possible to obtain sufficient brightness even with a backlight turned off or to fully utilize backlight through light transmission portions with the backlight turned on by totally reflecting incident light from outside with a total reflection mirror without a slit, not a half mirror or a mirror including a combination of a total reflection mirror and a slit in the reflection regions, and providing regions transmitting light (light transmission regions) for portions of the concave stripes and/or convex stripes that are not used as reflection regions.

Although explanation of the present invention is made mostly on the assumption that consideration is made with respect to some or all of the concave stripes and/or convex stripes, the explanation just above is also applicable with respect to some of the concave stripes and/or convex stripes.

When the light reflective structure thus constructed includes a plurality of concave stripes and/or convex stripes having an asymmetric cross-sectional shape, e.g., a plurality of convex stripes having an asymmetric cross-sectional shape, it is necessary to make further improvements in order to solve problems that the slant surfaces having a shorter slant length of the paired lengths X and Y of the respective pairs of slant surfaces shown in FIG. 3b (shorter length Y in FIG. 3b) are not utilized to reflect light as seen from the explanation of FIG. 13, and that the usability of reflection light on base portions (indicated by reference numeral 139 in FIG. 13) of the slant surfaces having a longer slant length (X indicated in FIG. 3b) is smaller than that of reflection light on upper portions (indicated by reference numeral 140 in FIG. 13) since the light reflected by the base portions has a longer light path than the light reflected by the upper portions in the liquid crystal display. This is also applicable to the case of a plurality of concave stripes having an asymmetric cross-sectional shape. The bottom portions of the concave stripes of the concave stripes correspond to the base portions of the convex stripes. In the present invention, the phrase "base portions" means the entire portions of the light reflection layer except for the upper portions of the convex stripes. To what extent of the slant surfaces the base portions cover or to what extent of the slant surfaces the bottom portions of the concave strips cover may be arbitrarily determined.

Figure 25:
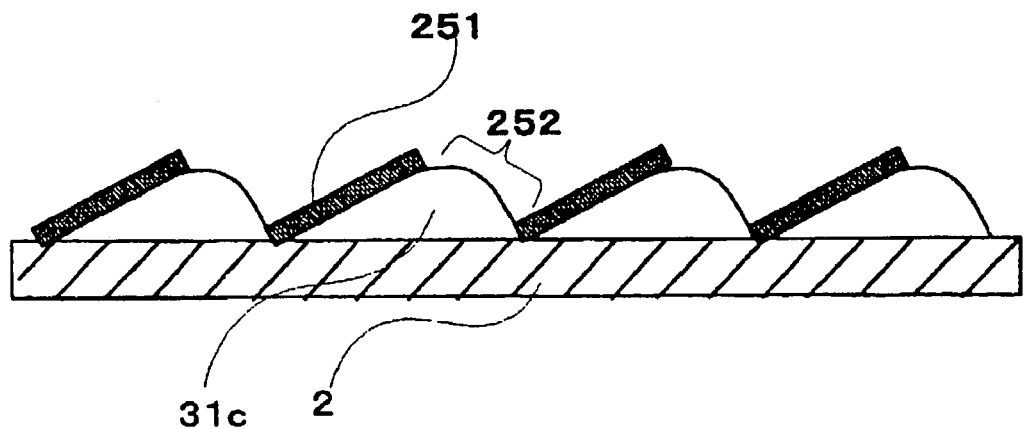
FIG. 25 is a schematic cross-sectional view showing how the shorter slant surfaces of concave stripes and/or convex stripes are provided with light transmission regions.

In order to solve the problems in the light reflective structure, it is preferable that the shorter slant surfaces of the concave stripes and/or convex stripes are provided with light transmission regions, being not provided with reflection regions, with respect to some or all of the concave stripes and/or convex stripes. This embodiment is schematically shown in FIG. 25.

By this embodiment, the light reflective structure can be further bright and be superior in display performance in the case of using backlight since the backlight can be utilized through the light transmission regions 252.

Figure 26:
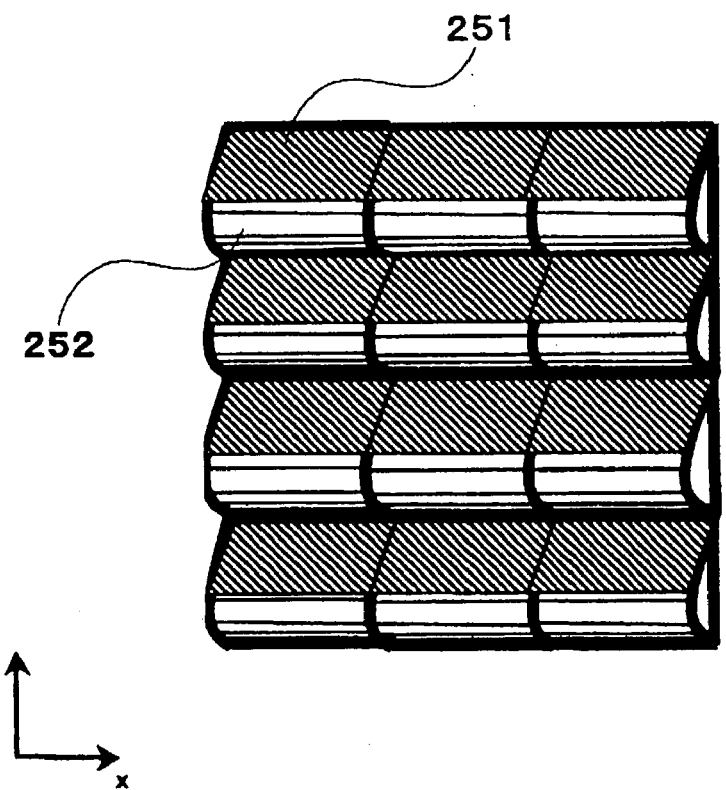
FIG. 26 is a schematic perspective view showing how the shorter slant surfaces of concave stripes and/or convex stripes are provided with light transmission regions.
Figure 27:
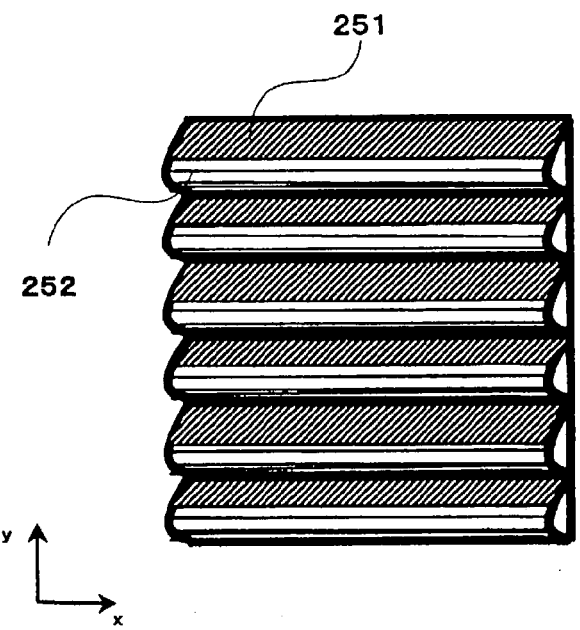
FIG. 27 is another schematic perspective view showing how the shorter slant surfaces of concave stripes and/or convex stripes are provided with light transmission regions.

Although the light transmission regions 252 may comprise mirrors having a combination of a half mirror or a total reflection mirror and a slit in this embodiment, it is more preferable that the light transmission regions comprise total reflection mirrors without a slit. This is because the reflection regions can make total reflection in the case of not using backlight, and because backlight can be utilized through the reflection regions 252 in the case of using the backlight. Reflection layers having such a structure are schematically shown in FIGS. 26 and 27.

Figure 28:
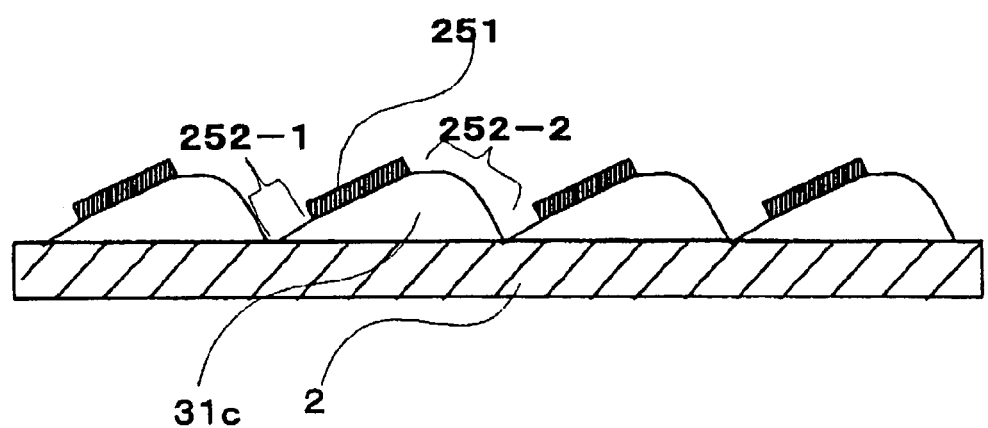
FIG. 28 is a schematic cross-sectional view showing how the base portions of convex stripes are provided with light transmission regions.
Figure 29:
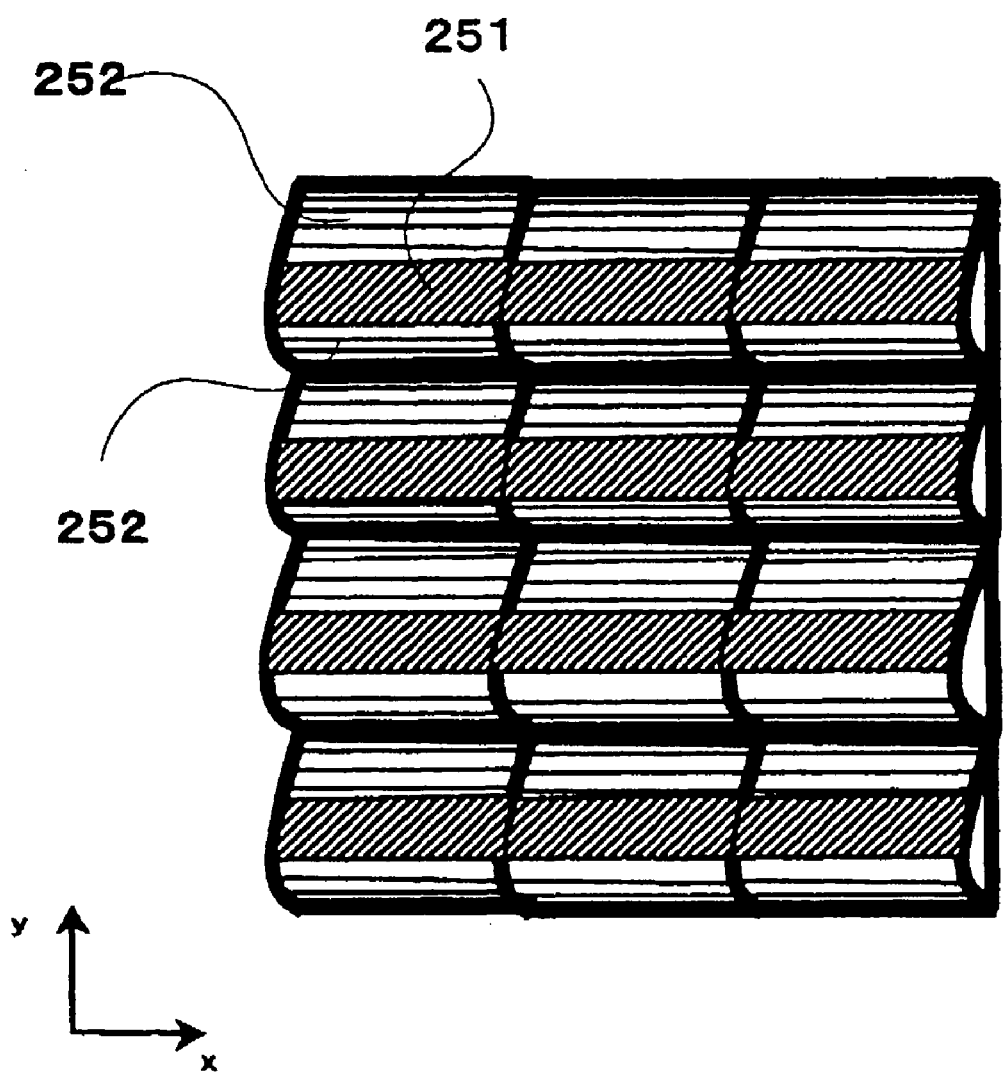
FIG. 29 is a schematic perspective view showing how the base portions of convex stripes are provided with light transmission regions.
Figure 30:
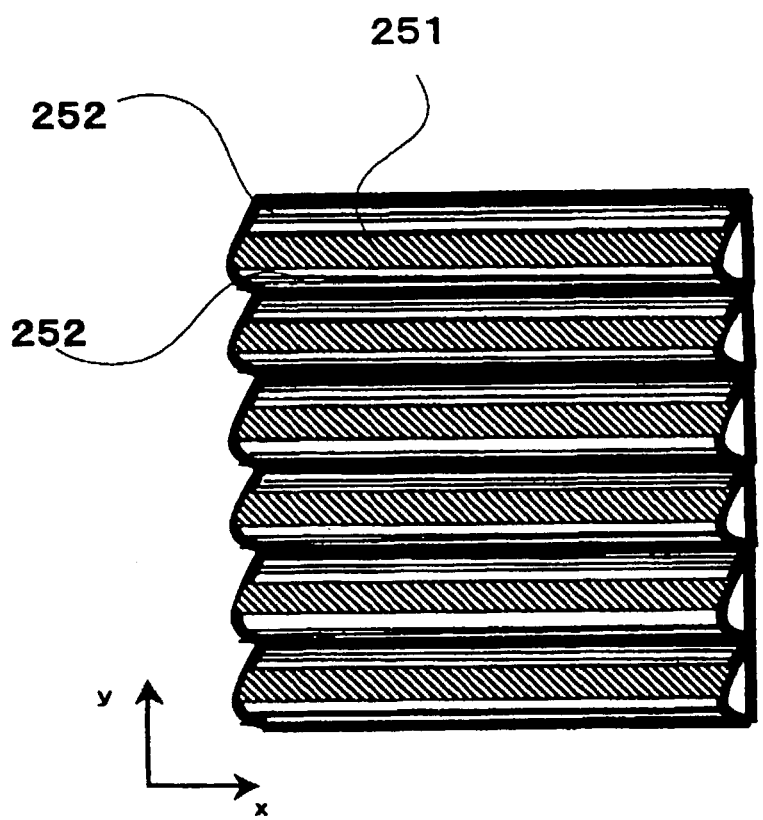
FIG. 30 is another schematic perspective view showing how the base portions of convex stripes are provided with light transmission regions.

It is also acceptable that some or all of the concave stripes and/or convex stripes have the bottom portions of the concave stripes and/or the base portions of the convex stripes provided with light transmission regions, not provided with reflection regions. This embodiment is schematically shown in FIG. 28. In this figure, a portion designated by reference numeral 252-1 is one of the light transmission regions provided on the base portions of the convex stripes. By this arrangement, the portions of the light reflection layer, which have a long light path in the liquid display, can be changed into light transmission regions 252-1, allowing backlight to be utilized through the light transmission regions 252-1. In this embodiment as well, it is preferable that the light transmission regions comprise total reflection mirrors without a slit. The reflection layer thus constructed is schematically shown as a perspective view in each of FIGS. 29 and 30.

Figure 31:
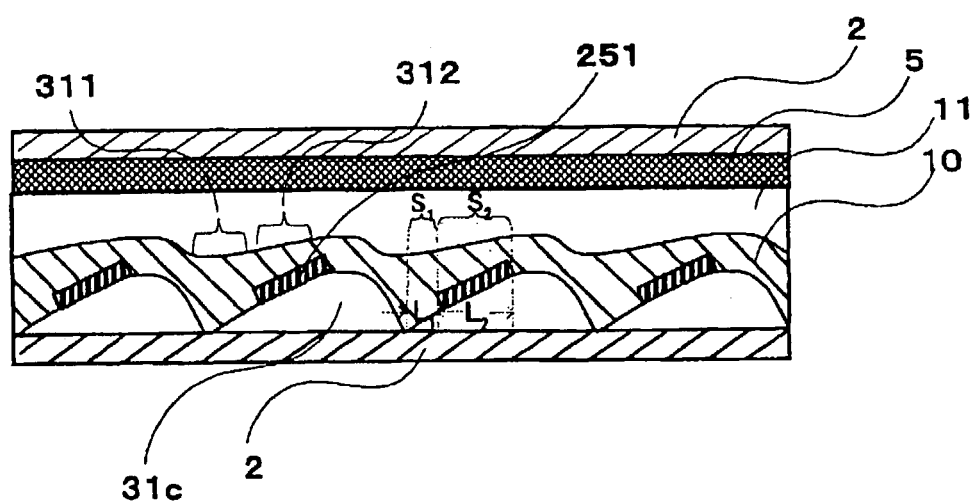
FIG. 31 is a schematic cross-sectional view showing how a CF is formed so as to have thick and thin portions.

It is preferable that portions 311 of the CF on the light transmission regions provided on the base portions or the bottom portions are formed in a greater film thickness than portions 312 of the CF on the reflection regions as schematically shown in FIG. 31. Since the backlight that passes through the light transmission regions passes the CF only one time while the light reflected by the reflection regions passes the CF two times, it is effective to form the CF so as to include thicker and thinner portions in order to balance the color purity and the brightness of light between the light transmission regions and the reflection regions. In this case, the magnitude of the film thickness may be objectively determined by comparing a value found by dividing the cross-sectional area of the portion of the CF in a region S1 by the length $L_1$ of the region $S_1$, and a value found by dividing the cross-sectional area of the portion of the CF in a region $S_2$ by the length $L_2$ of the region $S_2$, as shown in FIG. 31. Although the cross-sectional structure shown in FIG. 31 is different from the cross-sectional structure shown in FIG. 1 in that the CF is provided directly on the convex stripes, or in another point, for clarification, the CF may be provided as shown in FIG. 1.

Figure 32:
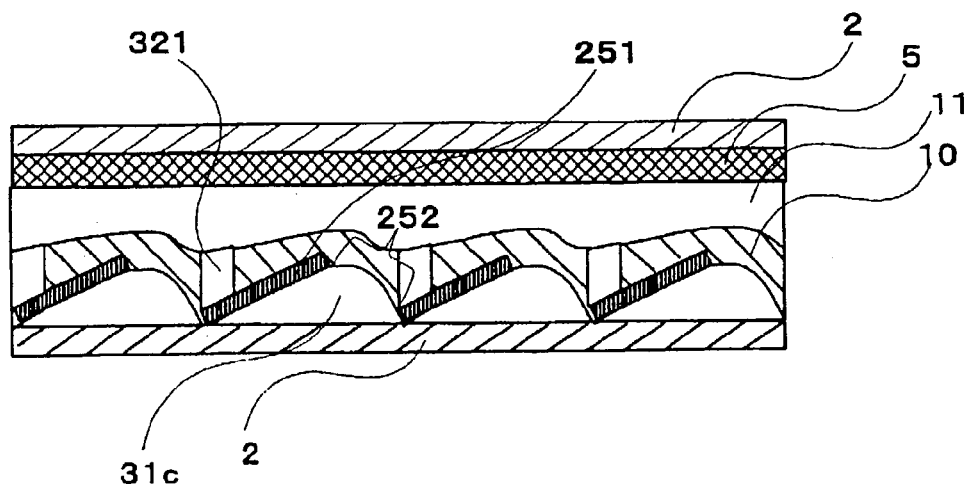
FIG. 32 is a schematic cross-sectional view showing how there are provided reflection regions without a CF layer thereon.

On the other hand, in order to form the light reflective structure so as to be bright and be superior in display performance, it is also effective that some or all of the concave stripes and/or convex stripes have the bottom portions of the concave stripes and/or the base portions of the convex stripes provided with reflection regions without a CF layer provided thereon. In this case, the base portions or the bottom portions are not utilized to pass backlight but are utilized as reflection regions. The reason why the CF layer is eliminated is that the light path of the light passing through these portions is long. Although color purity is slightly sacrificed in these portions, it is possible to make a significant improvement in brightness. This embodiment is schematically shown in FIG. 32. In the shown embodiment, there are a combination of structures having portions 321 without the CF layer and structures having a shorter slant surface provided with a light transmission region 252.

Figure 33:
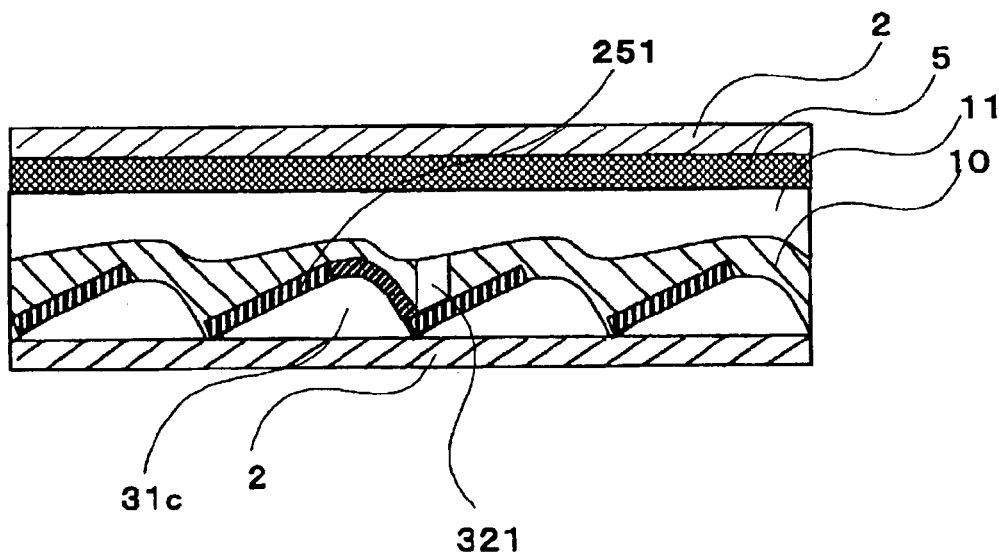
FIG. 33 is another schematic cross-sectional view showing how there are provided reflection regions without a CF layer thereon.

It is supposed that the portions without the CF layer 321 extend to an adjacent light transmission region 252 because of alignment accuracy. Such a situation is not generally preferable since backlight does not pass the CF. In order to avoid such a situation, it is preferable to adopt an arrangement wherein the reflection regions 251 are formed so as to extend on a shorter slant surface to prevent the portions 321 without the CF layer from being adjacent to the light transmission regions 252 as schematically shown in FIG. 33.

Such an arrangement may be provided in some of the concave stripes and/or convex stripes. For example, same convex stripes may have the top provided an additional reflection region without the CF layer provided thereon. It is relatively easy to provide the top of the convex stripes with such an additional reflection region. In some cases, this arrangement can be effective to fabricate the light reflective structure so as to be bright and be superior in display performance.

Figure 34:
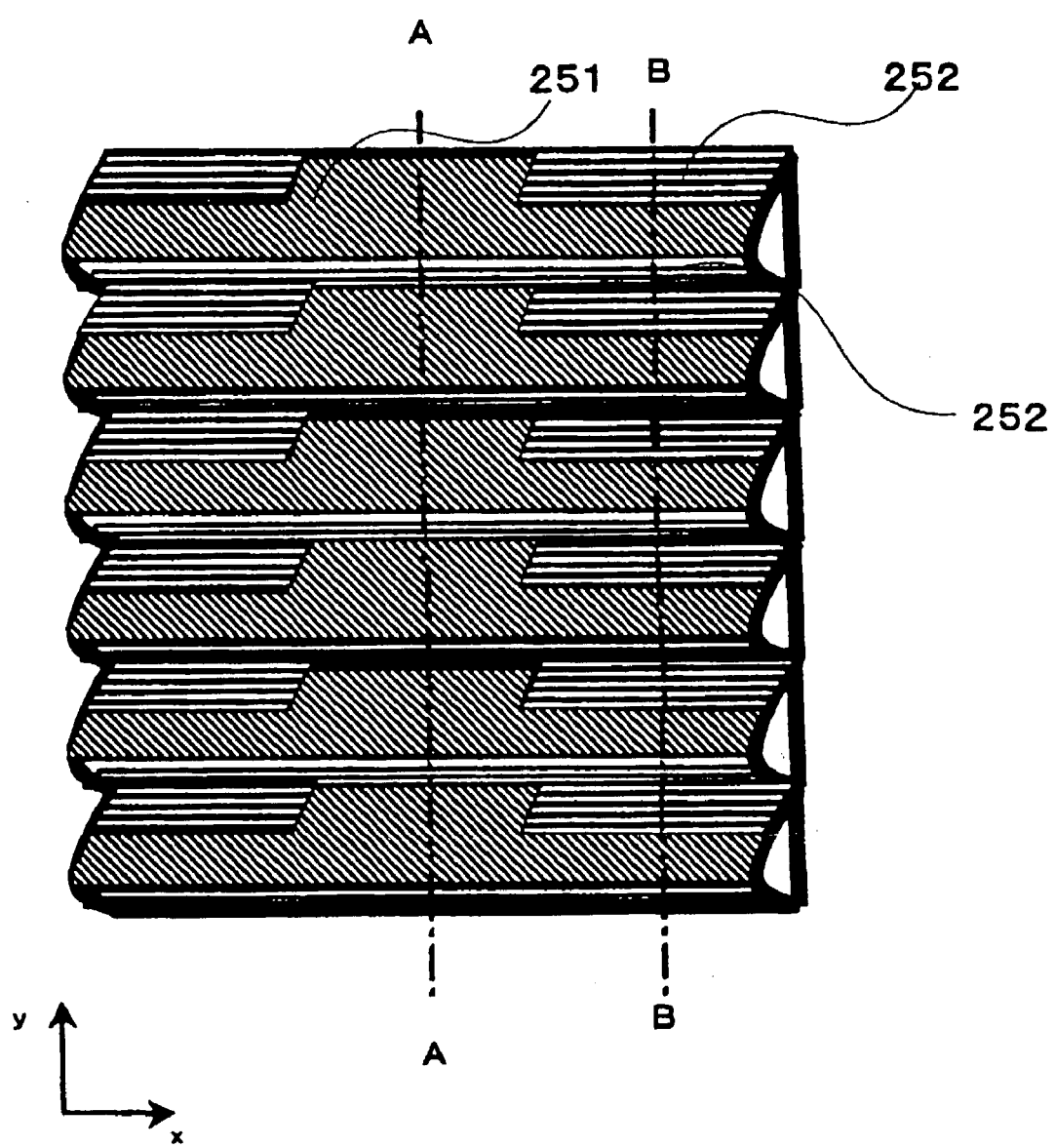
FIG. 34 is a schematic perspective view showing the structure of a reflection layer.
Figure 35:
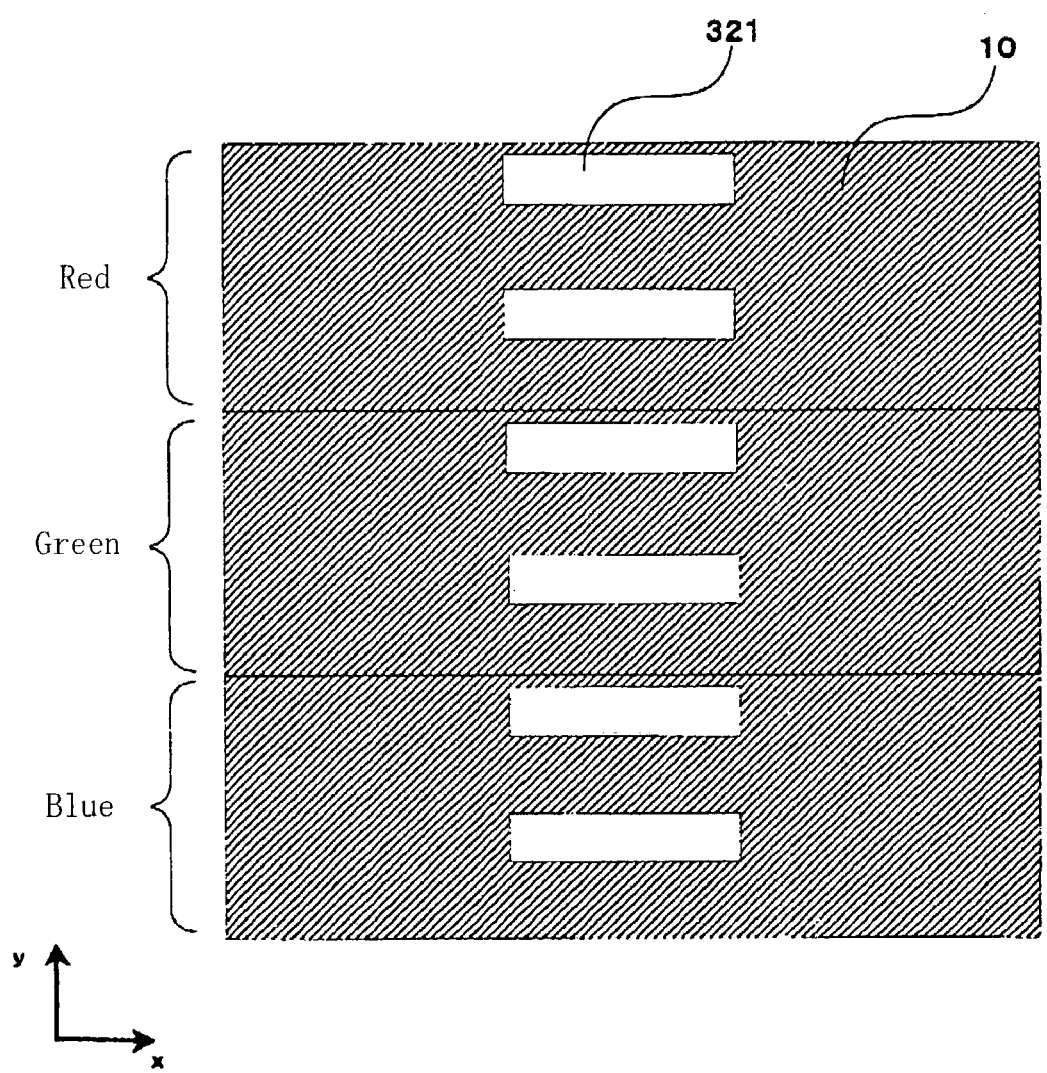
FIG. 35 is a schematic plan view showing portions with a CF layer and portions without a CF layer.

FIGS. 34 and 35 are perspective schematic views showing a relationship between a reflection layer and a CF in such an arrangement. FIG. 34 shows the arrangement of the reflection layer, and FIG. 35 shows portions with the CF layer and portions without the CF layer. In FIG. 34, the shaded portions represent the reflection regions 251, and the horizontally shaded portions represent the light transmission regions 252. In FIG. 35, the shaded portions represent the portions with the CF layer 10, and the unshaded portion represent the portions without the CF layer 321., The CF shown in FIG. 35 includes three kinds of color filters for red, green and blue as indicated on the left in this figure. In the six convex stripes shown in FIG. 34, the respective pairs of six convex stripes correspond to the red, green and blue color sections in the order from the top. In this embodiment, the cross-sectional view taken along the lines A—A is shown in FIG. 25 as a schematic view, and the cross-sectional view taken along the lines B—B is shown in FIG. 28 as a schematic view.

Figure 36:
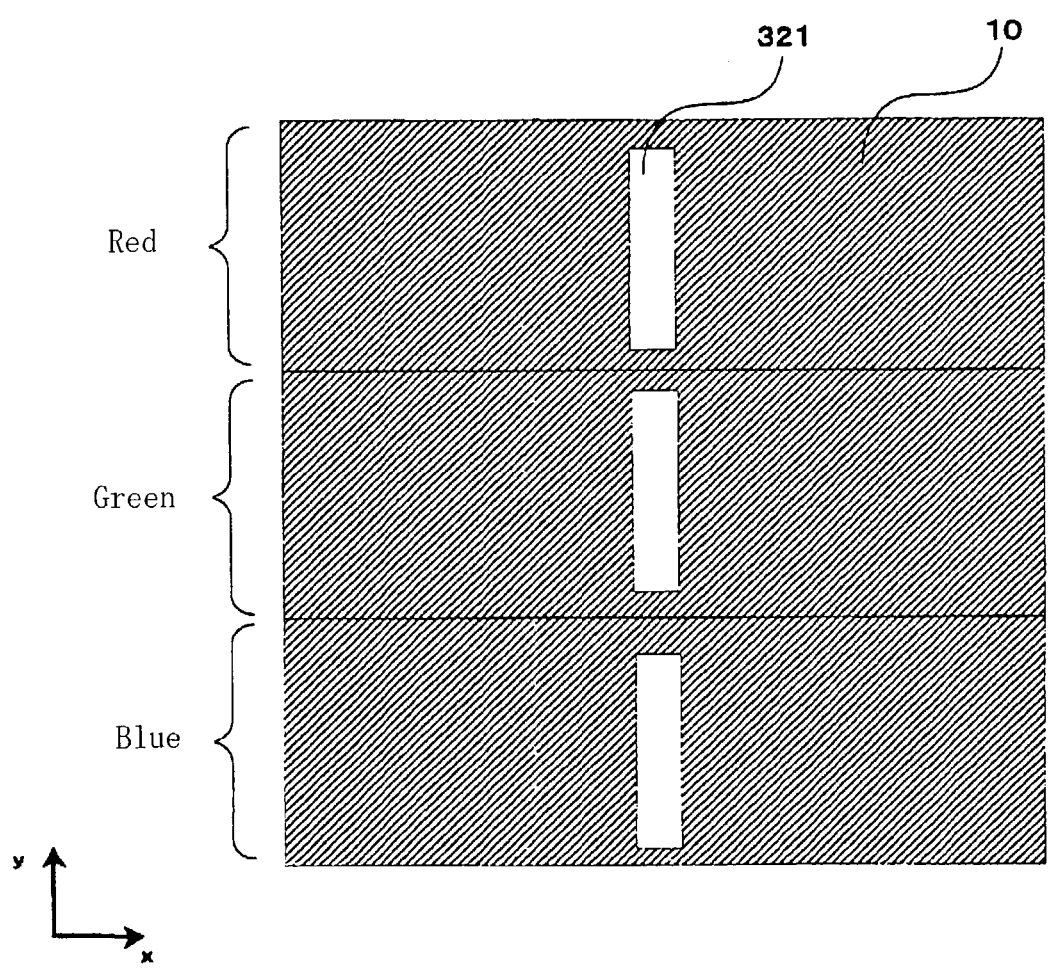
FIG. 36 is another schematic plan view showing portions with a CF layer and portions without a CF layer.
Figure 44:
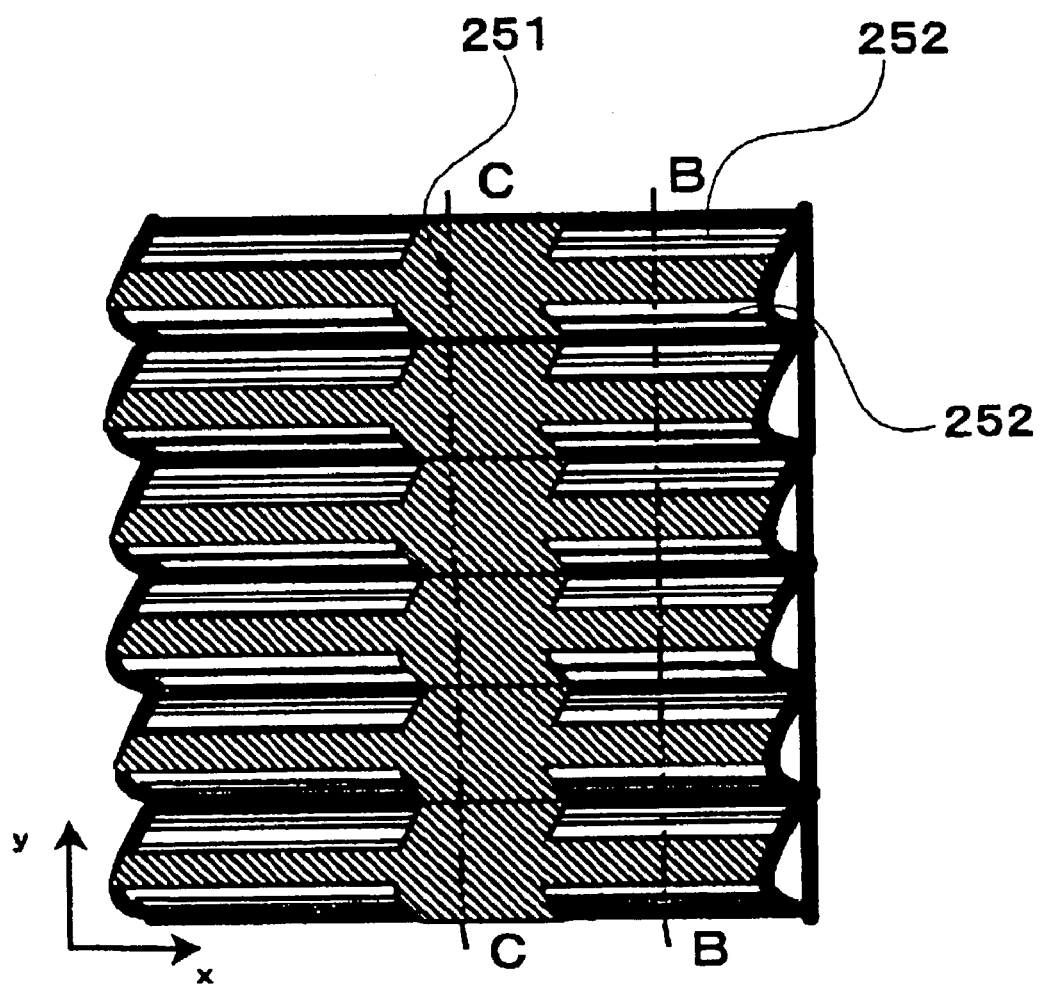
FIG. 44 is another schematic perspective view showing the structure of a reflection layer.

In some cases, it is preferable to adopt an arrangement wherein in place of the arrangement shown in FIG. 34, each of the reflection regions is formed so as to partly extend onto a shorter slant surface as shown in FIG. 44, and an arrangement wherein in place of the arrangement shown in FIG. 35, the portions without the CF layer 321 are formed in an elongated shape as shown in FIG. 36.

Figure 45:
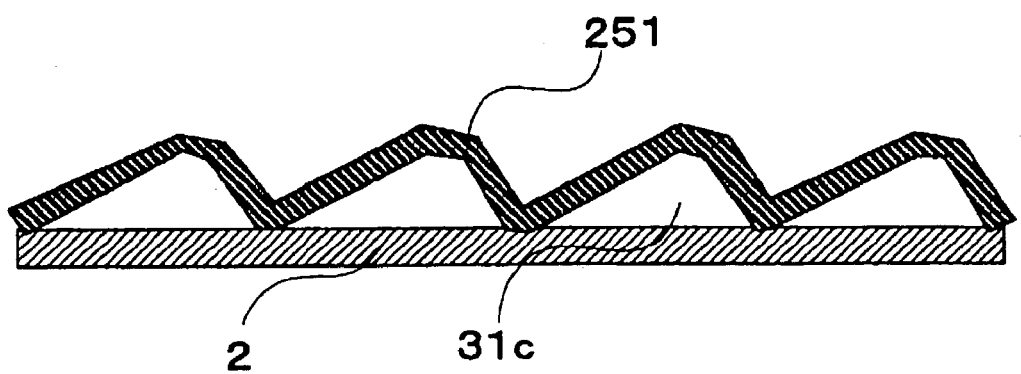
FIG. 45 is a cross-sectional view taken along line C—C of FIG. 44.

In these cases, although the reflection regions without the CF layer are provided on the tops of the convex stripes in addition to the bottom portions of the concave stripes and/or the base portions of the convex stripes, it is possible to facilitate alignment of the portions without the CF layer 321. This is because it becomes easy to avoid the problem that backlight is prevented from passing through the CF since the portions 321 without the CF layer extend to an adjacent light transmission region 252 because of poor alignment accuracy in the embodiment stated at the latest. A cross-sectional view taken along the line B—B in this embodiment is similar to the schematic view of FIG. 28 as in the embodiment stated at the latest. A cross-sectional view taken along the line C—C in this embodiment is schematically shown in FIG. 45.

In most cases, it is preferable that the reflection regions comprise total reflection mirrors without a slit when the light transmission regions coexist in the case of providing the portions without the CF layer as stated above.

Figure 40:
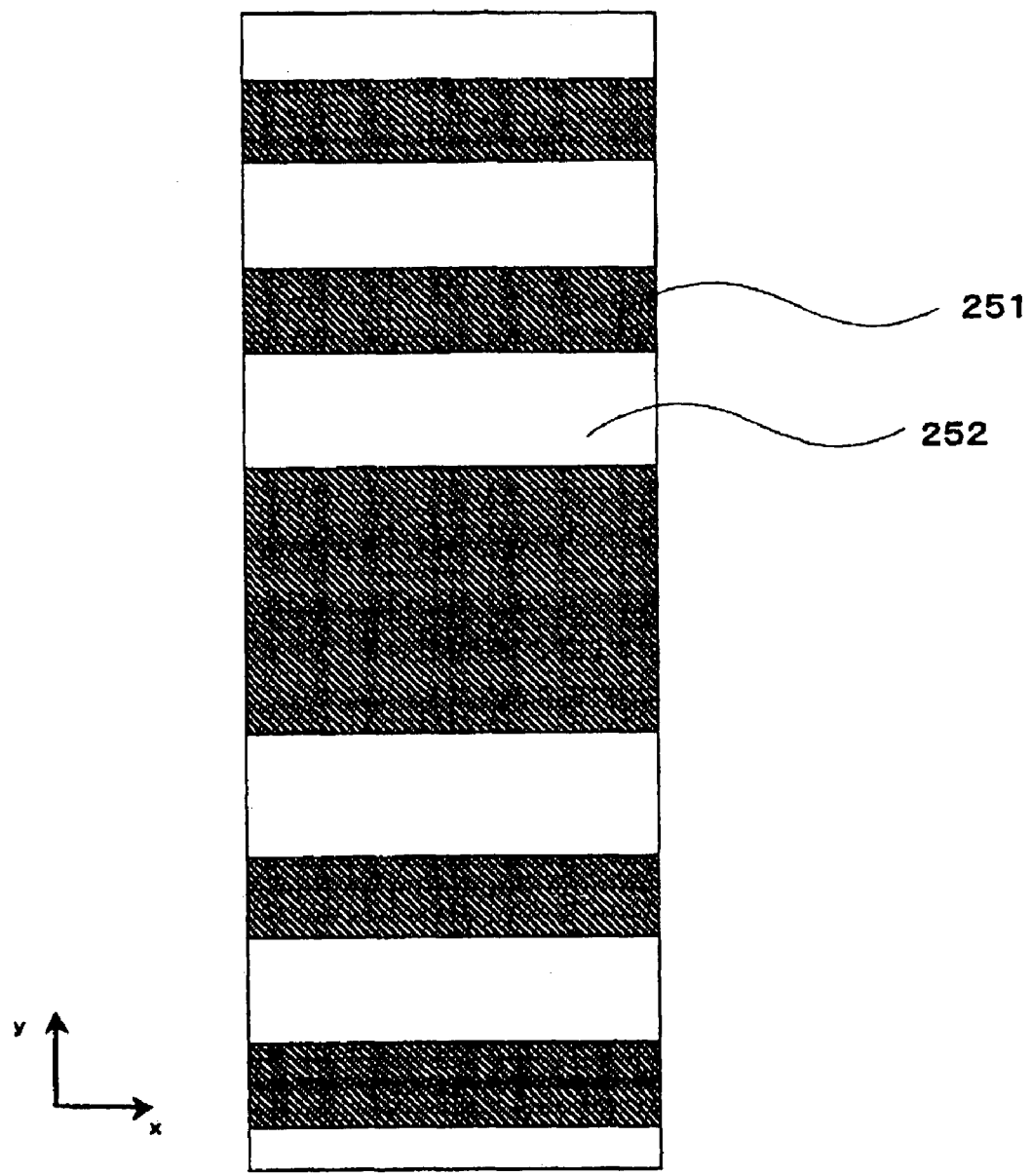
FIG. 40 is a schematic view showing a light reflective structure, which is seen from a direction perpendicular to the outer surface of a display.
Figure 41:
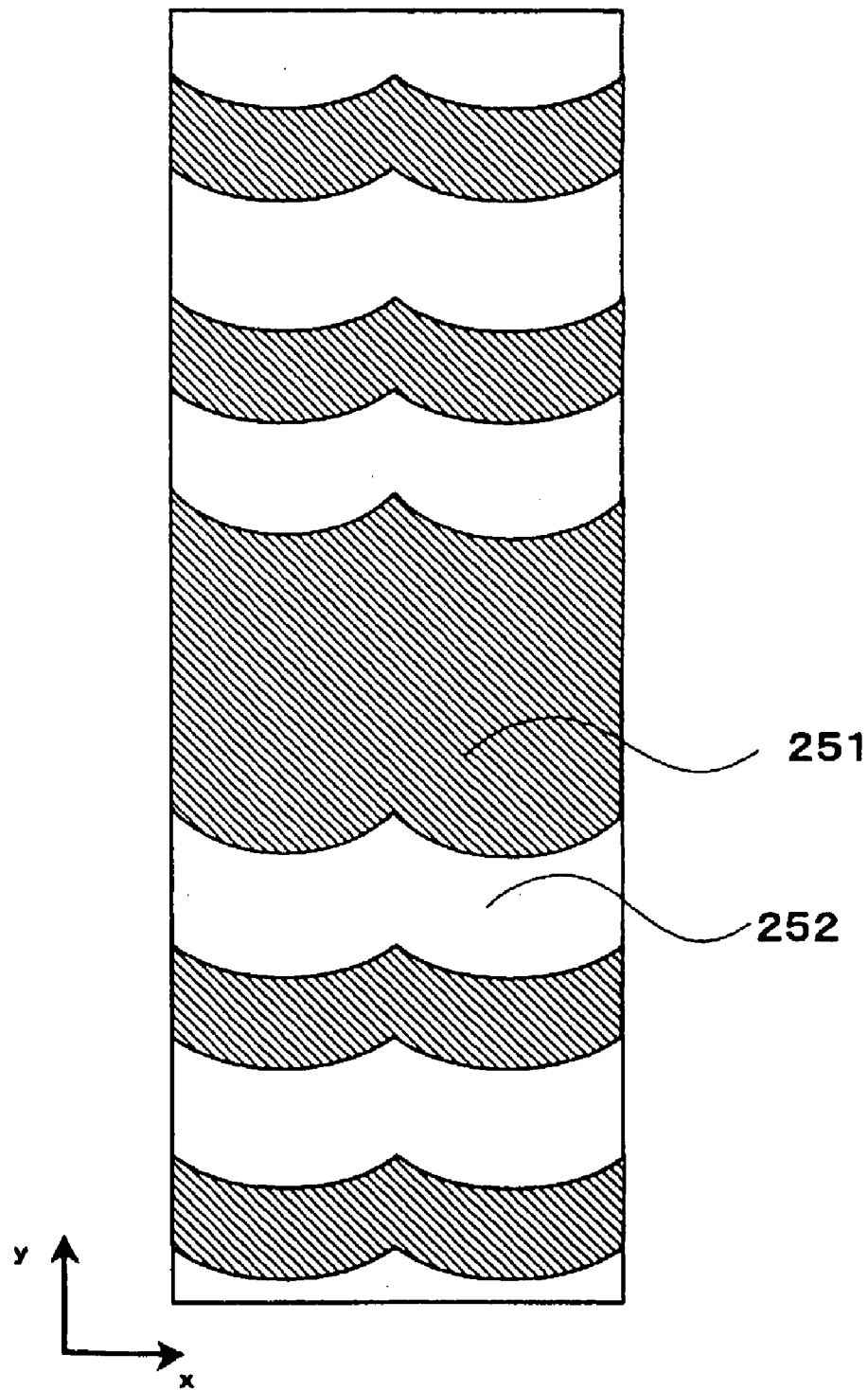
FIG. 41 is another schematic view showing a light reflective structure, which is seen from a direction perpendicular to the outer surface of a display.
Figure 42:
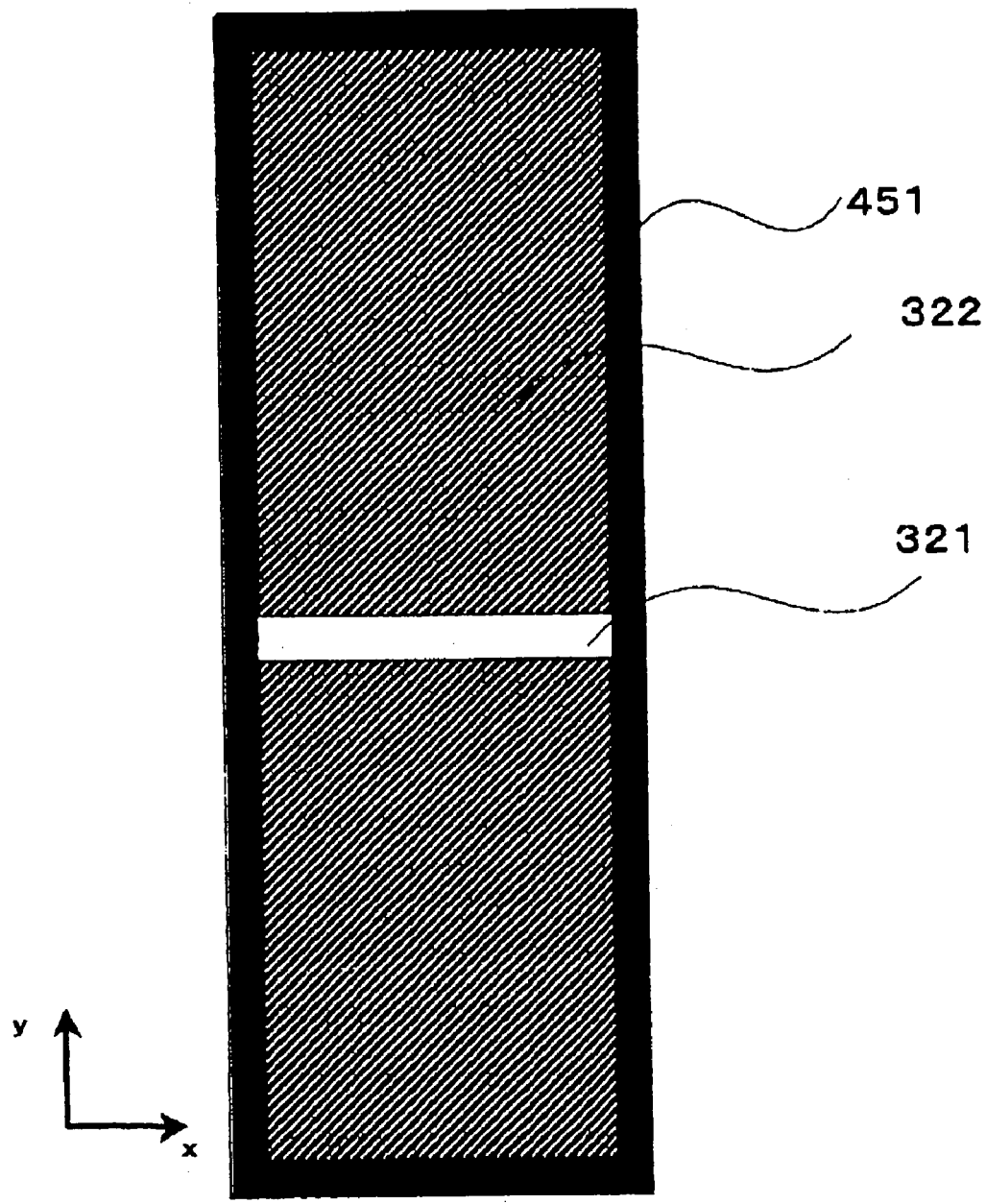
FIG. 42 is a schematic view showing the patterns of a BM and a CF.
Figure 43:
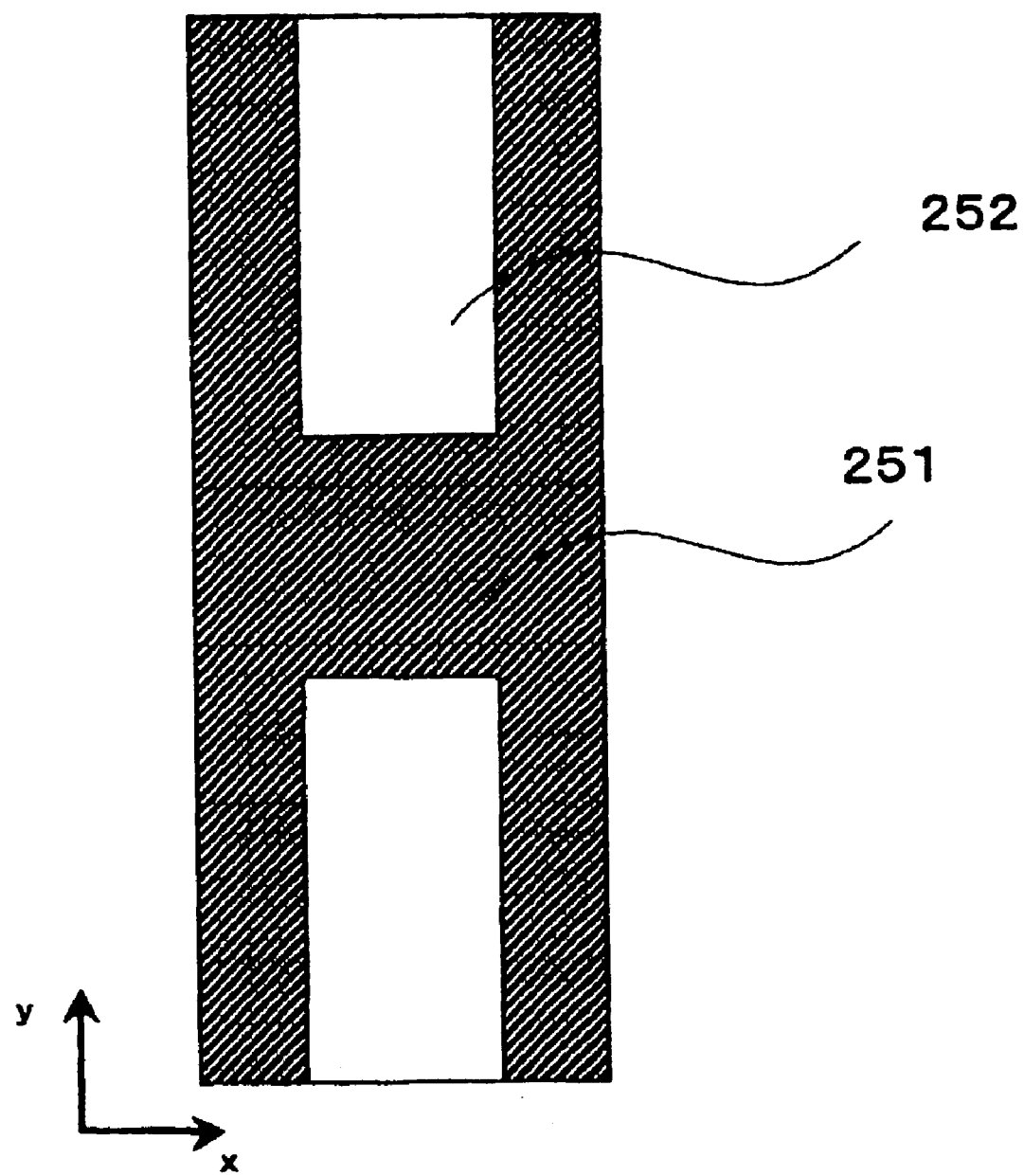
FIG. 43 is another schematic view showing a light reflective structure, which is seen from a direction perpendicular to the outer surface of a display.

FIGS. 40 to 43 are schematic views of the light reflective structures fabricated as stated earlier, which are seen from a direction perpendicular to the outer surface 138 of the display screen. FIGS. 40, 41 and 43 show different distribution patterns for the reflection regions 251 and the light transmission regions 252, and FIG. 42 shows a distribution pattern for the portions with the CF layer 322 and the portions without the CF layer 321. Reference numeral 451 designates a blackmask (BM). The light reflective structure may be fabricated by using a combination of the pattern shown in FIG. 40 or 41 and the pattern shown in FIG. 42, or a combination of the pattern shown in FIG. 43 and the pattern shown in FIG. 42. The portions without the CF may be provided at positions that are supposed to be the most effective, as shown in FIG. 42. In order to make a balance between the case of using backlight and the case of not using backlight, the light transmission regions may exist on the tops of the convex stripes.

In order to provide the light transmission regions or the portions without the CF, a known photolithographic technique may be utilized. In order to form the CF so as to include thicker and thinner portions, a method for forming the CF in such a shape by a single coating step, using the difference between the tops and the bottoms of the concave and/or convex stripes, a method for forming the CF in such a shape by plural coating steps or another method may be utilized.

Each of the light reflective structures can realize a transflective or reflective display, which has a higher display contrast ratio and provide better image than ever. In particular, when any one of the light reflective structures is utilized for a liquid crystal element, it is possible to realize both low power consumption and eye-friendly image. From this viewpoint, when any one of the light reflective structures is utilized in a cellular phone, the display screen of the cellular phone can be made drastically brighter, providing good image quality that has never been obtained before.

However, the light reflective structure according to the present invention is not limited only to such application. The light reflective structure may be applied to known displays including other liquid crystal modes, such as TFT, as long as the application is not contradictory to the spirit of the present invention.

When the light reflective structure according to the present invention is utilized as an element of a transflective or reflective liquid crystal display, it is preferable that the light reflective structure has the same pattern in each of the pixels forming the liquid crystal display screen. This is because this arrangement can avoid variations among the respective pixels in terms of the reflectiveness in a specific direction and the scattering directivity for reflection light.

When the light reflective structure is utilized as an element of a transflective or reflective liquid crystal display, it is more preferable that the light reflective structure includes a transmissive diffusion layer. This is because this arrangement can minimize the generation of an unfavorable phenomenon, such as moiré caused by the cyclic unevennesses, improve the scattering property of light and provide good image quality.

EXAMPLE

Now, examples of the present invention will be described in detail.

Example 1

A transflective liquid crystal display, which had a display screen having a size of 3.78 cm×5.04 cm and including 120×160×RGB pixels, was fabricated as stated below. The transflective liquid crystal display has basically the same structure as the typical example shown in FIG. 1. This example will be described, referring to FIGS. 1, 2, and 14 to 17.

Referring to FIG. 1, a transparent glass substrate 2 having a thickness of 0.5 mm was used, and a liquid crystal layer 5 comprised a super twisted nematic (STN) liquid crystal having a twist angle of 240°, which had an anisotropy reference index $\Delta n$ of 0.13 and a cell gap of 5 µm. $\Delta n \cdot d$ was 0.65 µm. A retardation film 6 was set to have $\Delta n \cdot d = 0.138$ µm, and a retardation film 7 was set to have $\Delta n \cdot d = 0.385$ µm. A transflective reflection layer 13 and an uneven layer 12 were provided as shown in FIG. 1.

Figure 14:
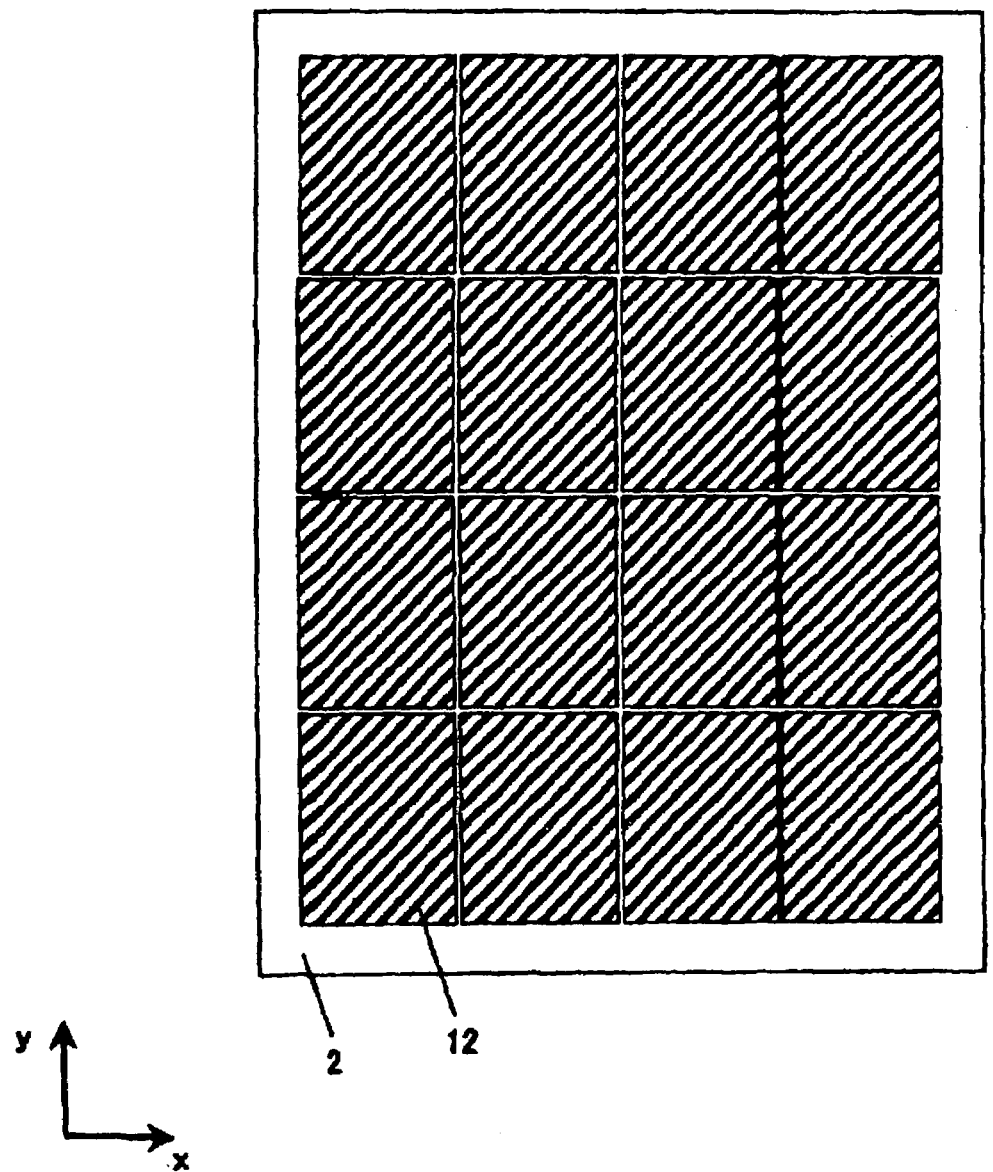
FIG. 14 is a schematic view showing a plane layout, which is used when many liquid crystal elements are simultaneously fabricated from a large-scale substrate.

FIG. 14 is a schematic view showing a plane layout, which is used when many liquid crystal elements are simultaneously fabricated from a large-scale substrate having a size of 350 mm×480 mm. The minimum unit in the liquid crystal display screen was set at 305 µm×95 µm, and the line spacing in the display screen was set at is 10 µm. In other words, the alignment cycle in the x-axis direction was set at a pitch of 105 µm, and the alignment cycle in the y-axis direction was set at a pitch of 315 µm.

The uneven layer 12 was formed as stated below. A positive photosensitive resin PC411B manufactured by JSR Corporation was coated on the transparent substrate 2 in a thickness of 5 µm, and then the coated resin layer was prebaked at 80° C. for 10 min. Next, as shown in FIG. 2, a photomask 32 was put above the positive photosensitive resin layer 31a, and the resin layer was exposed by a proximity type of full-field mask aligner LE4000A manufactured by Hitachi Electronics Engineering Co., Ltd. using a high-pressure mercury lamp, under the conditions that the wavelength was 365 nm, the exposure value was 100 mJ/cm$^2$, the proximity gap was 150 µm, and the collimation angle of the mask aligner was 2.0°. The exposure was carried out once. The exposure may be carried out plural times.

Figure 15:
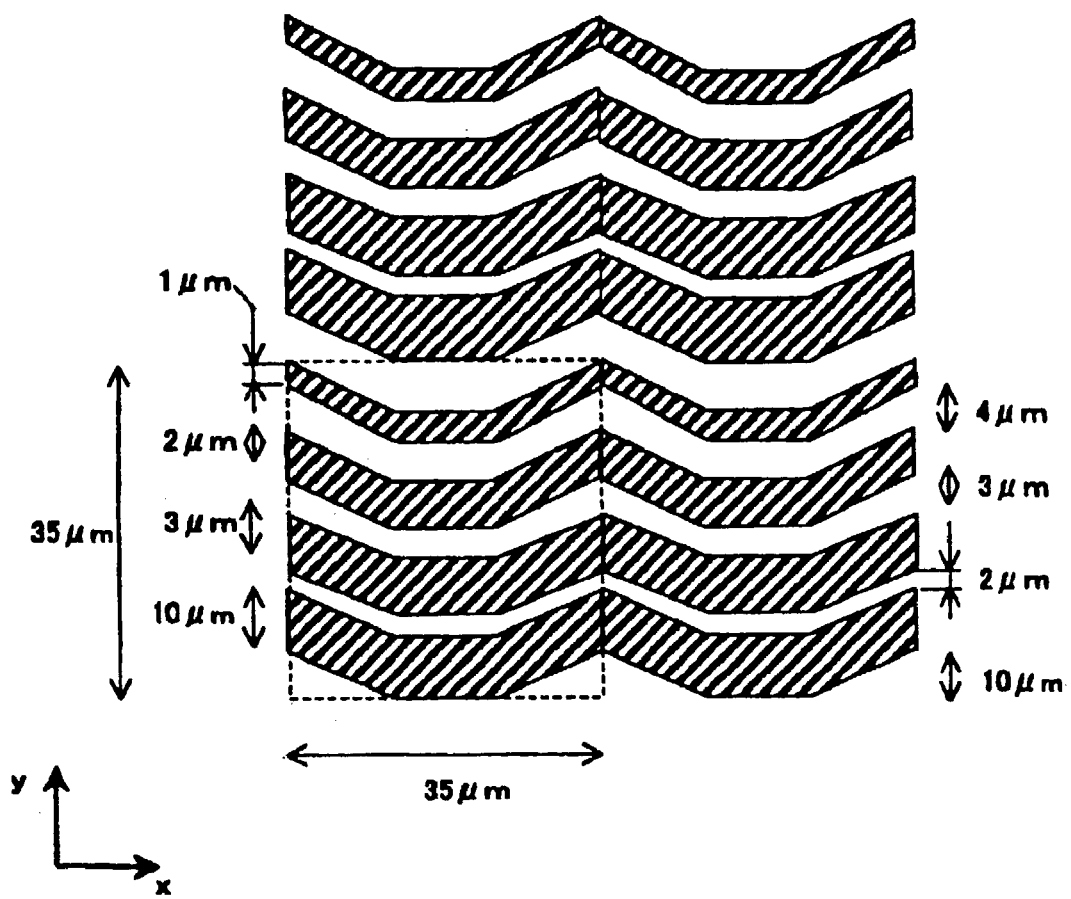
FIG. 15 is a plan view showing the dimensions of a pattern section of the photomask used in Example 1.
Figure 16:
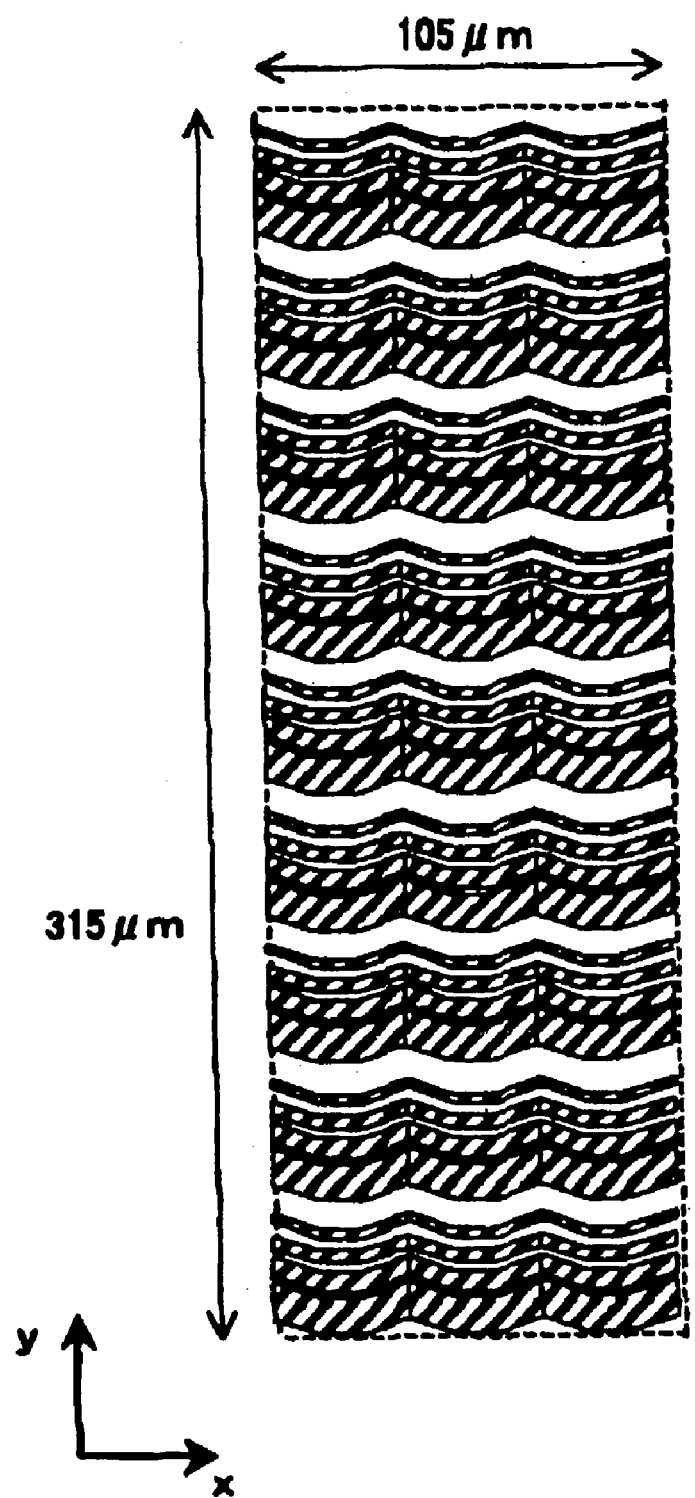
FIG. 16 is a plan view showing a portion of the pattern alignment of the photomask used in Example 1.

In the photomask 32, a pattern, which had sizes shown in FIG. 15, and which included pattern sections having a cycle of 35 µm in the y-axis direction and shaped in wavy forms having a cycle of 35 µm in the x-axis direction, was provided as shown in FIG. 16.

After the photolithographic step stated above, the resin layer was developed by a solution of 0.5 wt % of tetramethylammonium hydroxy (TMAH) for 60 min at a liquid temperature of 23° C., and the developed resin layer was heated in a single-substrate processing clean oven with the inside controlled at a temperature of 240° C. Under these conditions, the melting step of the positive photosensitive resin started within a period of about 2 min since the insertion into the clean oven, and then the setting of the resin mainly progressed.

Figure 17:
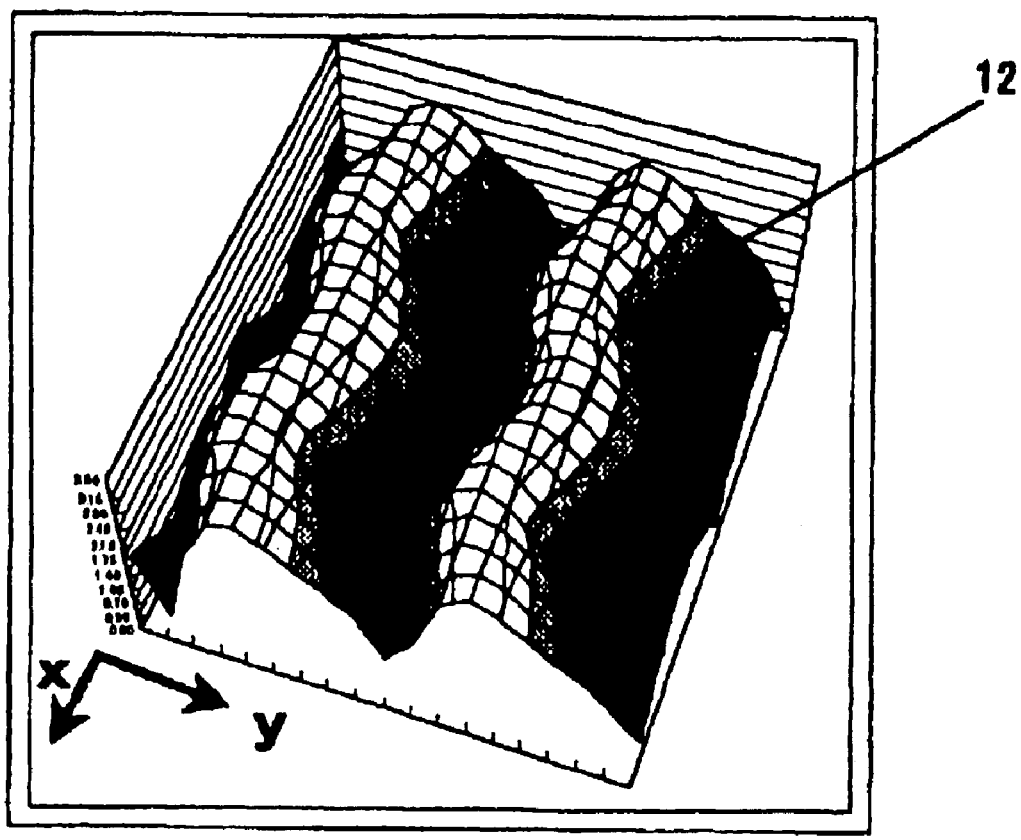
FIG. 17 is a perspective view of an uneven layer formed on a substrate.

Thus, unevennesses were formed so as to have smooth slant surfaces and an asymmetric cross-sectional shape in a particular direction as shown in FIG. 17 as a view showing actual measurements by use of a laser microscope. The uneven layer 12 was formed on the glass substrate so as to have these unevennesses collectively provided in a great number. The width of each of the unevennesses almost corresponded to the width of each of the pattern sections of the photomask. In this fabrication, the transparent substrate 2 needs to include a peripheral frame having a width of about 10 mm therearound as shown in FIG. 14.

Although the height of the convex stripes and the depth of the concave stripes can be generally increased by raising the exposure value, the height of the convex stripes and the depth of the concave stripes may be also increased by, e.g., lowering the prebaking temperature of the positive photosensitive resin, shortening the time period for prebaking, raising the developer temperature or extending the time period for development. When a treatment, which is contrary to these treatments, is performed, the height of the convex stripes and the depth of the concave stripes are be decreased. From this viewpoint, it is necessary to keep, e.g., the exposure value, the prebaking temperature, the time period for prebaking, the developer temperature and the time period for development constant in order to form the convex stripes and the concave stripes in a constant shape.

Figure 18:
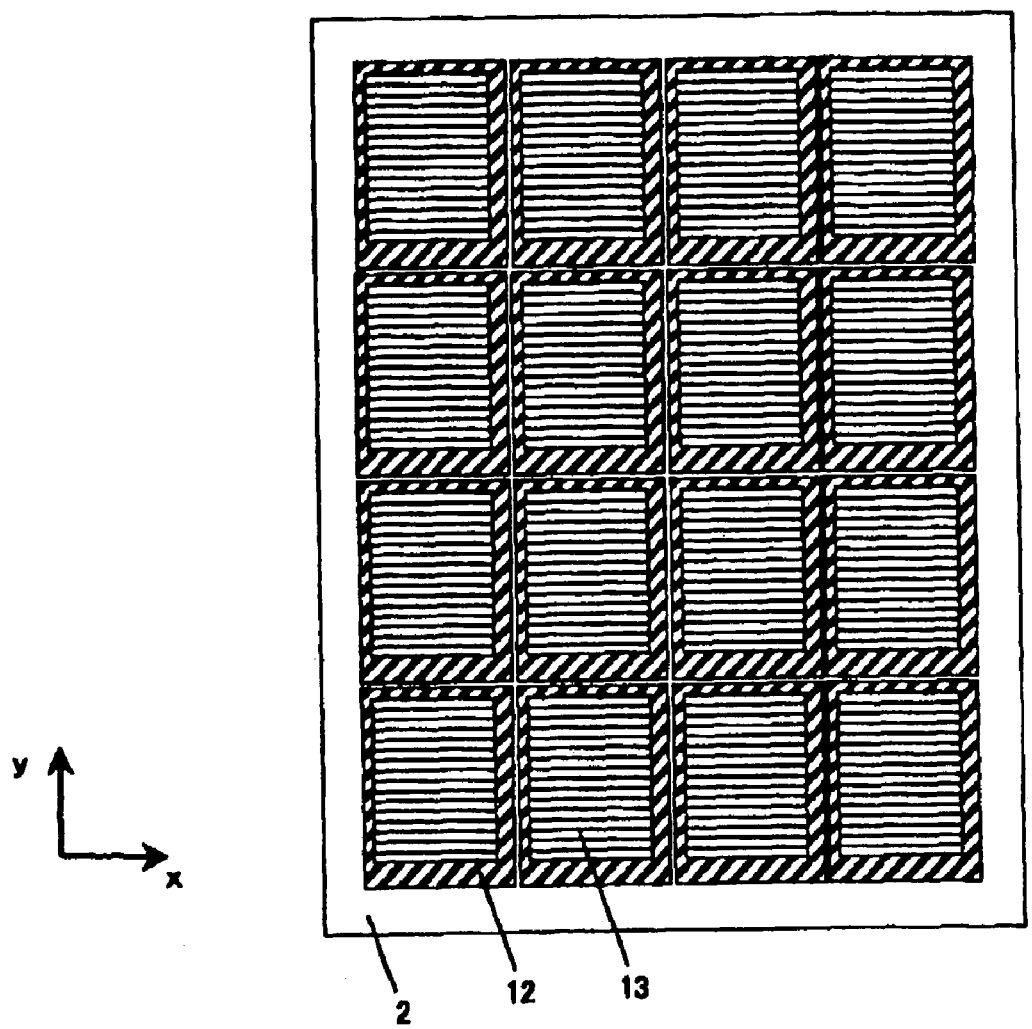
FIG. 18 is a schematic view showing how a reflection layer is formed on the uneven layer shown in FIG. 17.

Next, as shown in FIG. 18, the uneven layer 12, which was formed on the entire surface of the substrate, had a portion corresponding to a liquid crystal display screen formed with an aluminum film by a vapor deposition method for formation of a transflective reflection layer 13. Thus, the light reflective structure according to this Example was completed. The transflective reflection layer 13 may have a layered structure, such as $SiO_2$ or $SiO_2/TiO_2/SiO_2$, provided thereon so as to control a reflected color or reflection intensity.

Next, the light reflective structure thus fabricated was used to assemble a transflective liquid crystal display, and the transflective liquid crystal display was evaluated in terms of display performance. The STN liquid crystal was driven having 4 lines simultaneously selected by a Multi Line Addressing method (MLA method), where plural lines were simultaneously selected. The MLA method has been described in, e.g., JP-A-6-27907, JP-A-8-63131, JP-A-8-234164 and JP-A-8-43571. A RGB micro color filter was provided so as to be capable of reproducing 64K colors.

The evaluation revealed that the liquid crystal display thus assembled served as a transflective and reflective display capable of using both backlight and external light and had a display contrast ratio of 40 and a viewing angle range of not narrower than plus and minus 30°. It was also showed that the power consumption was not higher than 2 mW, and the display brightness was 50 cd/m². Visual inspection revealed that the display was able to provide bright image without avoiding an adverse effect caused by glare.

It was revealed that the light reflective structure was fabricated so as to be easily provided with required accuracy of unevennesses by a proximity type of full-field mask aligner according to this method, and that the light reflective structure was easily fabricated and had good image quality.

Example 2

Figure 37:
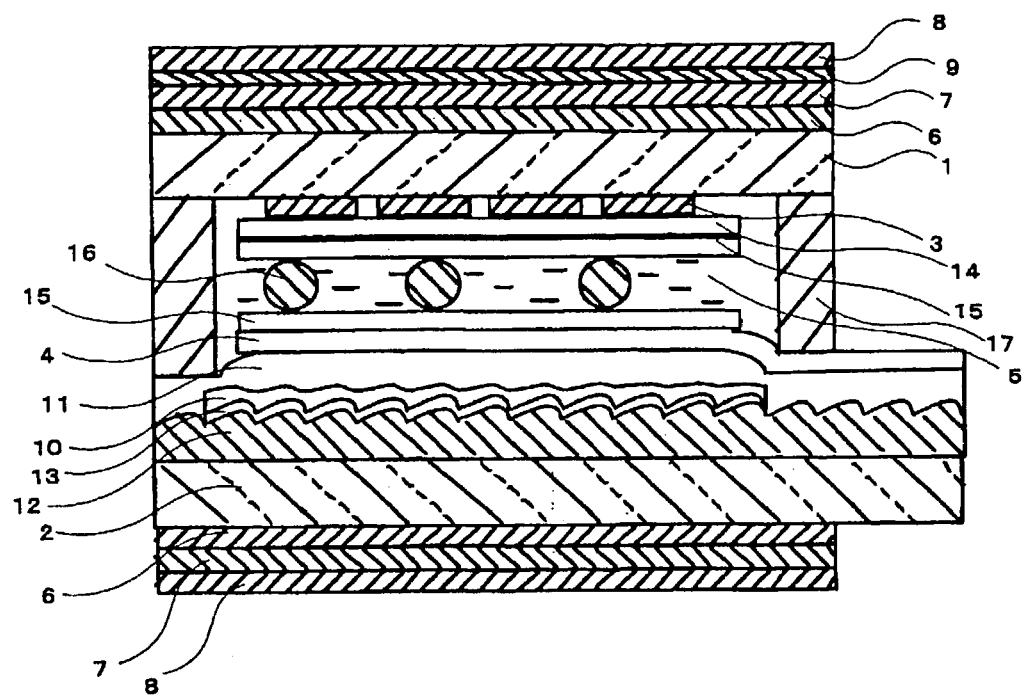
FIG. 37 is a schematic cross-sectional view showing the structure of the transflective liquid crystal display according to Example 2.
Figure 38:
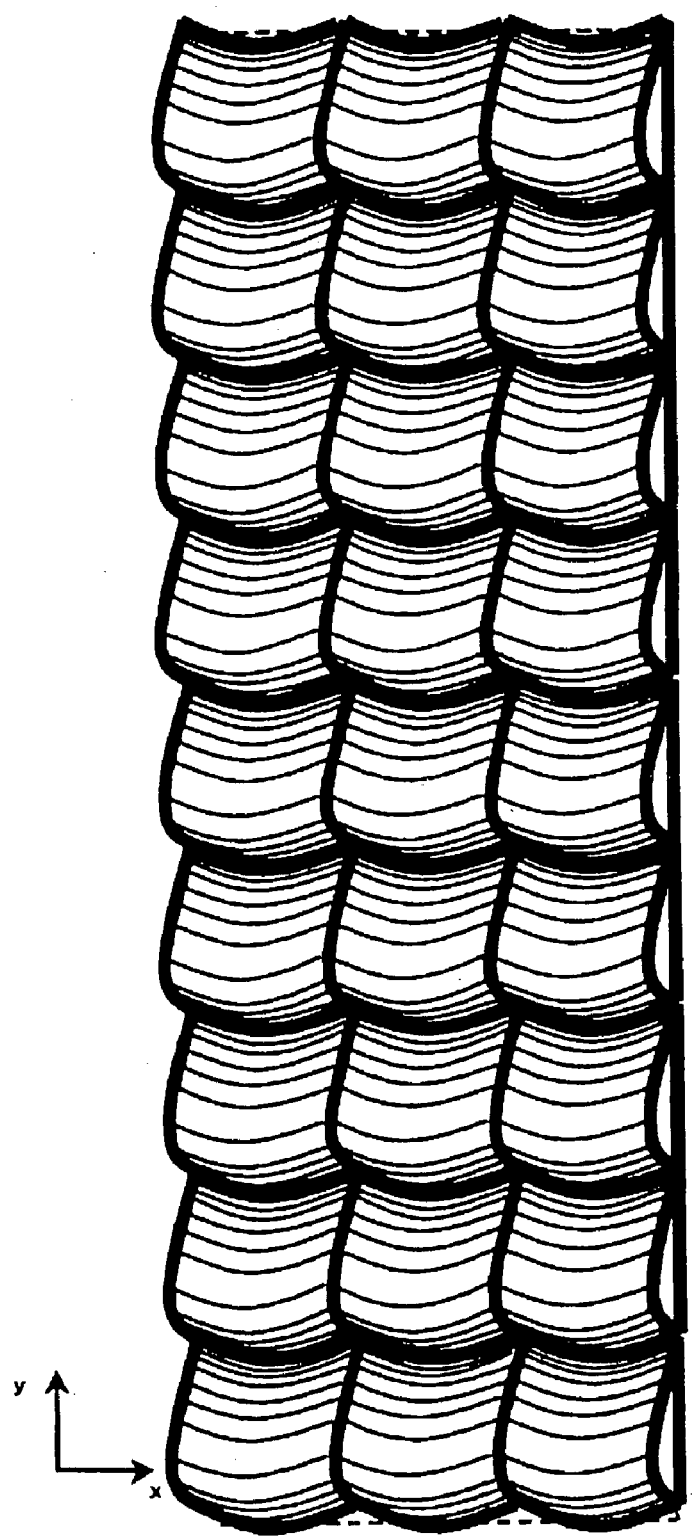
FIG. 38 is a schematic perspective view showing the uneven layer according to Example 2.
Figure 39:
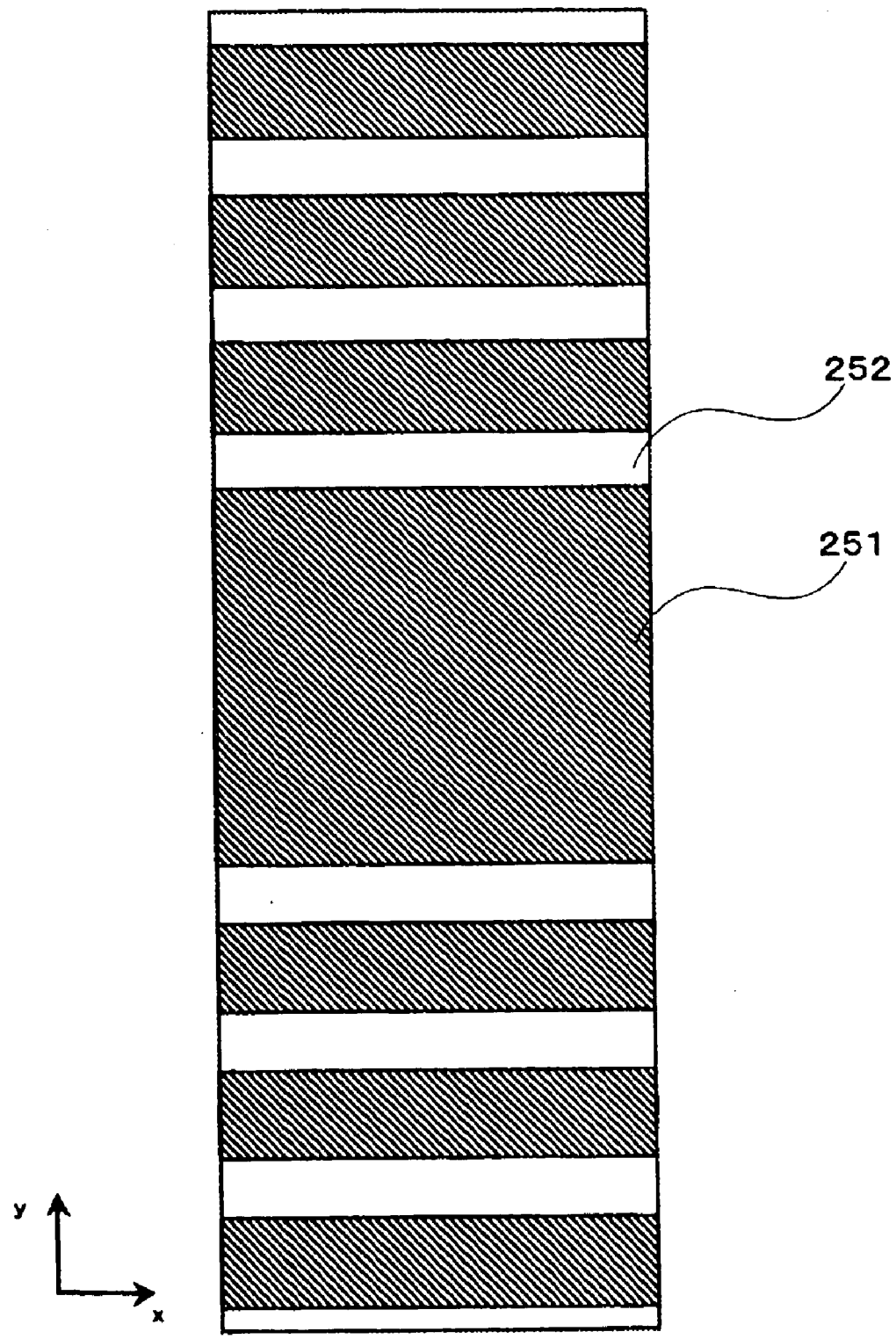
FIG. 39 is a schematic view showing the pattern of a reflection layer.

A liquid crystal display was fabricated so as to have substantially the same structure as the display shown in FIG. 1 except that the CF 10 was formed on an uneven layer 12 and the reflection layer 13, that the insulation layer 14 was formed on a substrate opposite to the uneven layer and that one of the leveling layers 11 was eliminated (see FIG. 37). In the display, the reflection layer 13 was deposited as a film by an aluminum vapor deposition, and the reflection layer was formed so as to have the pattern shown in FIG. 39 on the uneven layer shown in FIG. 38 in respective pixels corresponding to a liquid crystal display screen by a photolithographic process and an etching process.

With respect to the BM (black mask) and the CF, the pattern shown in FIG. 42 was used. The CF had the same pattern and the same thickness with respect to red, green and blue.

In the pattering process of the BM, a color material made of a negative photosensitive resin, V2501BK, manufactured by Nippon Steel Chemical Co., Lid. was used as the BM material in a photolithographic process, and the BM was formed so as to have a film thickness of 1 μm at the maximum after baking.

In the pattering process of the CF, color materials RER0404 (red), REG0404 (green) and REB0404 (blue) manufactured by Mitsubishi Chemical Corporation were used as the respective CF materials in a photolithographic process, and the CF was formed so as to have a film thickness of 2.5 μm at the maximum after baking.

Figure 46:
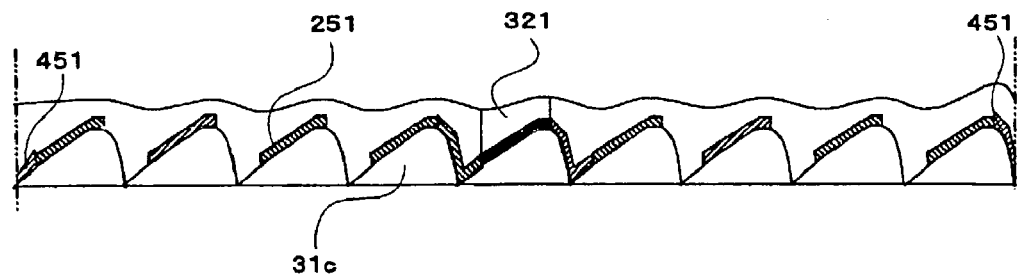
FIG. 46 is a schematic cross-sectional view showing how the CF according to Example 2 was formed so as to have thick and thin portions.
Figure 47:
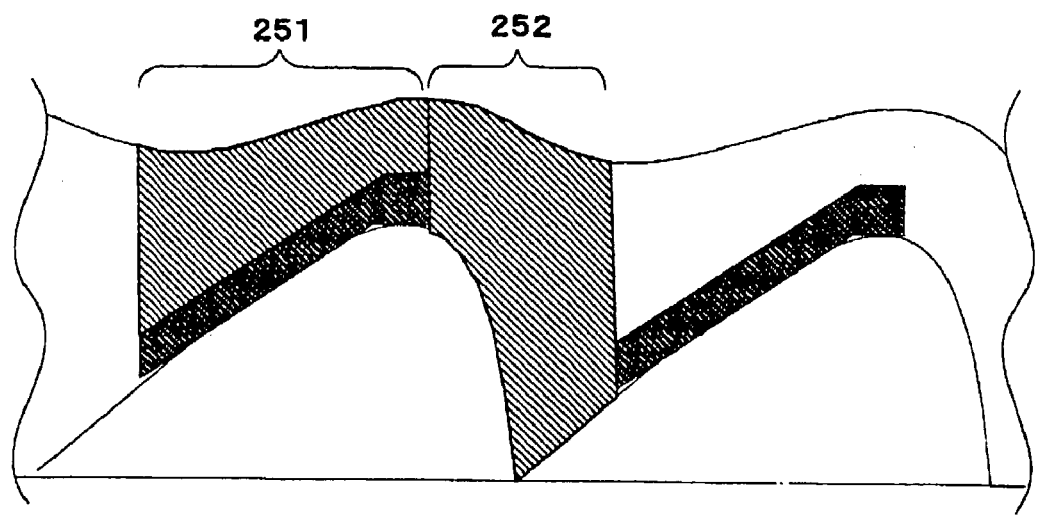
FIG. 47 is a schematic cross-sectional view showing in detail how the CF shown in FIG. 46 was formed so as to have thin and thick portions.

Under these conditions, the display was fabricated so as to have a cross-sectional structure as shown in FIGS. 46 and 47, wherein each of the convex stripes had the shorter slant surface and the base portion formed with a transmission portion without a total reflection film, and wherein the CF had a thickness of 2.5 μm at the maximum and an average thickness of 2.0 μm in a two dimensional simple cross-section in the transmission regions 252 and had a thickness of 0.8 μm at the minimum and an average thickness of 1.3 μm in a two dimensional simple cross-section in the reflection regions 251 because of a combination of the presence of unevennesses and a single coating step of the CF material.

In FIG. 46, the BM 451 shown in FIG. 42 is also shown in a cross-section. Although a reflection region without the CF layer thereon is shown to be at a central portion in FIG. 46, the reflection regions before and after the reflection region without the CF layer extended so as to prevent the reflection region without the CF layer from being adjacent to the transmission regions, in place of providing the shorter slant surface and the base portion of the convex stripes with a transparent portion without a total reflection film as stated above. This is because backlight was prevented to pass through the portions without the CF layer.

A transflective liquid crystal display was assembled in the same way as the display according to Example 1 except for the conditions stated above. According to the measurement using a luminance calorimeter BM-7 manufactured by TOP-CON Corporation, it was showed that the display had a color area of 50 with respect to the CIE 1931 standard colorimetric system regulated by CIE (Commission Internationale de l'Eclairage). On the other hand, when the viscosity and the leveling degree of the color materials were changed to provide the CF in the transmission regions 252 with an average thickness of 1.6 μm in a two dimensional simple cross-section and the CF in the reflection regions 251 with an average thickness of 1.3 μm in a two dimensional simple cross-section, it was showed that the modified display had a color area of 37. The comparison of both results revealed that both reflective image and transmissive image were able to exhibit better color image performance by making the film thickness of the color filter on the transmission regions thicker than that of the color filter on the reflection regions.

The color area means the area of a color triangle, which is defined by three measured values in the chromaticity coordinates $(x_R, y_R)$, $(x_G, y_G)$ and $(x_B, y_B)$ indicating the respective colors of GRB (full image of red, green and blue) in the CIE xy chromaticity diagram based on the CIE 1931 standard colorimetric system. The values of x and y are found by $x=X/(X+Y+Z)$ and $y=Y/(X+Y+Z)$ Example 3

Visual evaluation was made of a transflective liquid display, which was assembled under the same conditions as Example 1 except for the pattern, the alignment cycle of the pattern in the x-axis direction and the alignment cycle of the pattern in the y-axis direction of a photomask 32.

Explanation will be made, referring to FIGS. 48 to 51. In these figures, the unit of length is μm.

The alignment cycle in the x-axis direction was 79 μm, and the alignment cycle in the y-axis direction was 237 μm.

The pattern of the photomask 32 was fabricated as stated below. A basic pattern shown in FIG. 48 was repeated in the x-axis and y-axis directions to form the pattern. As indicated by a cutoff line 491 in FIG. 49, a section spreading from an original point for cutoff to a size equal to a pixel size was cut out from the pattern thus prepared. When cutting off the section from the pattern, area adjustment was made to a region where transmission portions or light shielding portions connected together to occupy a large area. For example, when transmission portions connected together to occupy a large area, a light shielding portion was provided in the connected transmission portions to decrease the area occupied by the connected transmission portions.

In the case of a photomask, which is fabricated by arraying a plurality of pixel regions made of sections lo cut off so as to include a plurality of block units, when a photomask surface is defined as an xy plane, one of the block units in the x-axis direction has mask pattern units successively provided in the x-axis direction so that the mask pattern units have the transmission portions and the light shielding portions provided with arcuate boundaries extending therebetween in the x-axis direction.

The phrase "the transmission portions and the light shielding portions provided with arcuate boundaries extending therebetween" means not only a case wherein the arcuate boundaries are formed smooth as shown in FIG. 6 but also a case wherein the transmission portions and the light shielding portions are formed in a rectangular shape and have arcuate boundaries extending therebetween as shown in this Example. It is preferable that two block units adjoining in the y-axis direction have the arcuate boundaries shifted in the x-axis direction by a certain distance. This is because the pixel regions have optical properties of being random to some extent to prevent variations in production from affecting directly to reflection properties.

As a modification, the photomask may be fabricated by arraying a plurality of pixel regions, which are made of sections cut off so as to include a plurality of mask pattern units irrespective of block units. Although each of the block units stated earlier contains three mask pattern units provided in the x-axis direction in the case of Example 3, a pixel region may be cut off, for instance, in two mask pattern units as indicated by a cutoff line 492 in FIG. 49, instead of cutting off in block units as indicated by a cutoff line 491 in FIG. 49. In the modification, when a photomask surface is defined as an xy plane, it is preferable that mask pattern units having the transmission portions and the light shielding portions provided with arcuate boundaries extending therebetween in the x-axis direction are successively provided in the x-axis direction and the y-axis direction in a pixel region, and that adjacent mask pattern units in the photomask have the light shielding portions and the transmission portions provided with different ratios of an amplitude to a cycle in the x-axis direction.

Additionally, a pixel region may be cut off at an arbitrary location in a mask pattern unit, instead of being cut off in mask pattern units as indicated by the cutoff line 492. For example, a pixel may be cut off so as to have a length in the x-axis direction, which is equal to 1.5 times the length of one mask pattern in the x-axis direction. Each of the pixels indicted by the cutoff lines 491 and 492 is designed so that the length in the y-axis direction is 3 times the length in the x-axis direction, and that three pixels of R, G and B can be provided side by side in the x-axis direction so as to have a square shape as a whole.

Figure 50:
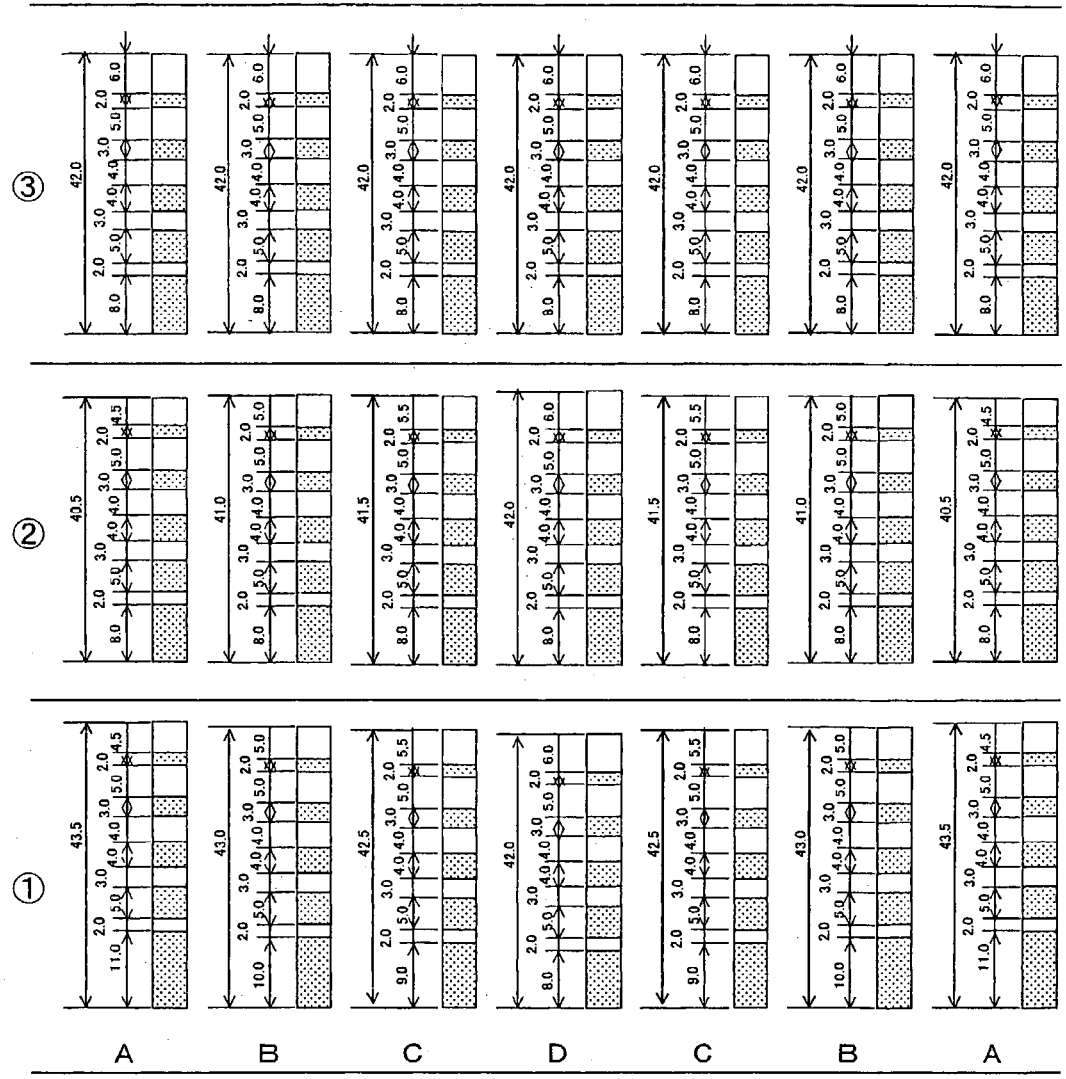
FIG. 50 is a plan view showing the pattern sections of the basic pattern in the photomask in Example 3.
Figure 51:
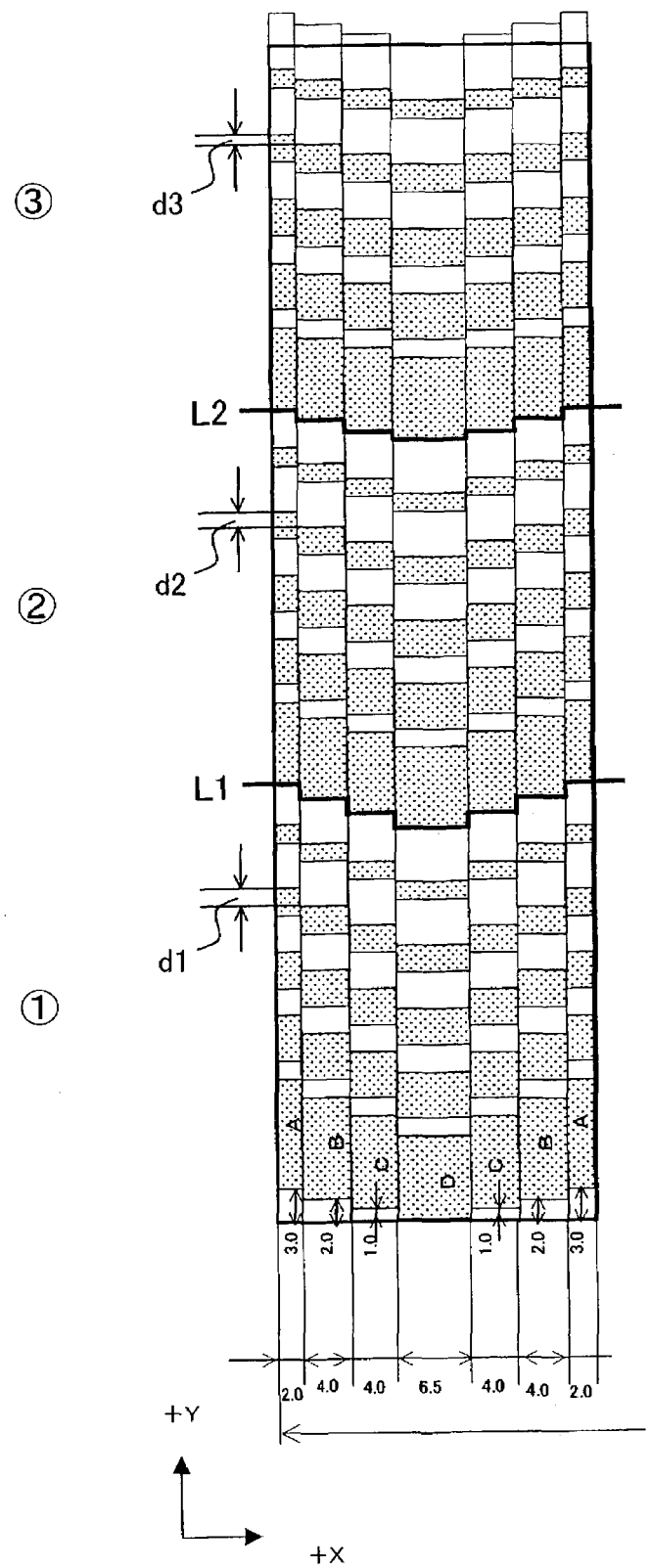
FIG. 51 is a schematic view explaining an arrangement of the photomask pattern.

When cutting off in block units, the basic pattern may be prepared as stated below. First, first pattern sections A, B, C, D, C, B and A indicated by ① in FIG. 50 are arrayed so as to be shifted by distances of 3.0 μm, 2.0 μm and 1.0 μm in the y-axis direction as indicated in the lower right portion of FIG. 48. Specifically, the pattern sections are arrayed as shown in ① of FIG. 51. In this arrangement, the shift pitch d1 between adjacent ones in the pattern sections A, B, C, D, C, B and A is 2 μm.

Next, second pattern sections A, B, C, D, C, B and A shown in ② of FIG. 50 and having slightly different dimensions from the first pattern sections A, B, C, D, C, B and A shown in ① of FIG. 50 are arrayed on the top of the first pattern sections so that the upper and lower ends of corresponding pattern sections contact each other. Specifically, the second pattern sections shown in ② of FIG. 50 are arrayed as indicated by ② in FIG. 51. In ② of FIG. 51, a thick line L1 designates the boundary where the first pattern sections and the second pattern sections contact each other. The thick line L1 may be also considered as showing one example of the arcuate boundaries formed by adjacent rectangular transmission portions and light shielding portions. In this arrangement, the shift pitch d2 between adjacent ones in the second pattern sections A, B, C, D, C, B and A is 1.5 μm as shown in ② of FIG. 51 when the dimensions are as shown in FIG. 50.

Then, third pattern sections A, B, C, D, C, B and A shown in ③ of FIG. 50 and having the same dimensions as the second pattern sections A, B, C, D, C, B and A shown in ② of FIG. 50 are arrayed on the top of the second pattern sections so that the upper and lower, i.e., third and second pattern sections contact each other. In ③ of FIG. 51, a thick line L2 designates the boundary where the second pattern sections and the third pattern sections contact each other. In this arrangement, the shift pitch d3 between adjacent ones in the third pattern sections A, B, C, D, C, B and A is 1.0 μm as indicated by ③ in FIG. 51 when the dimensions are shown in FIG. 50. In the arrangement shown in FIG. 48, an array indicated by G1 is fabricated in this manner. The pattern sections indicated by ①, ② and ③ in FIG. 48 correspond to the pattern sections indicated by ①, ② and ③ in FIGS. 50 and 51.

Figure 48:
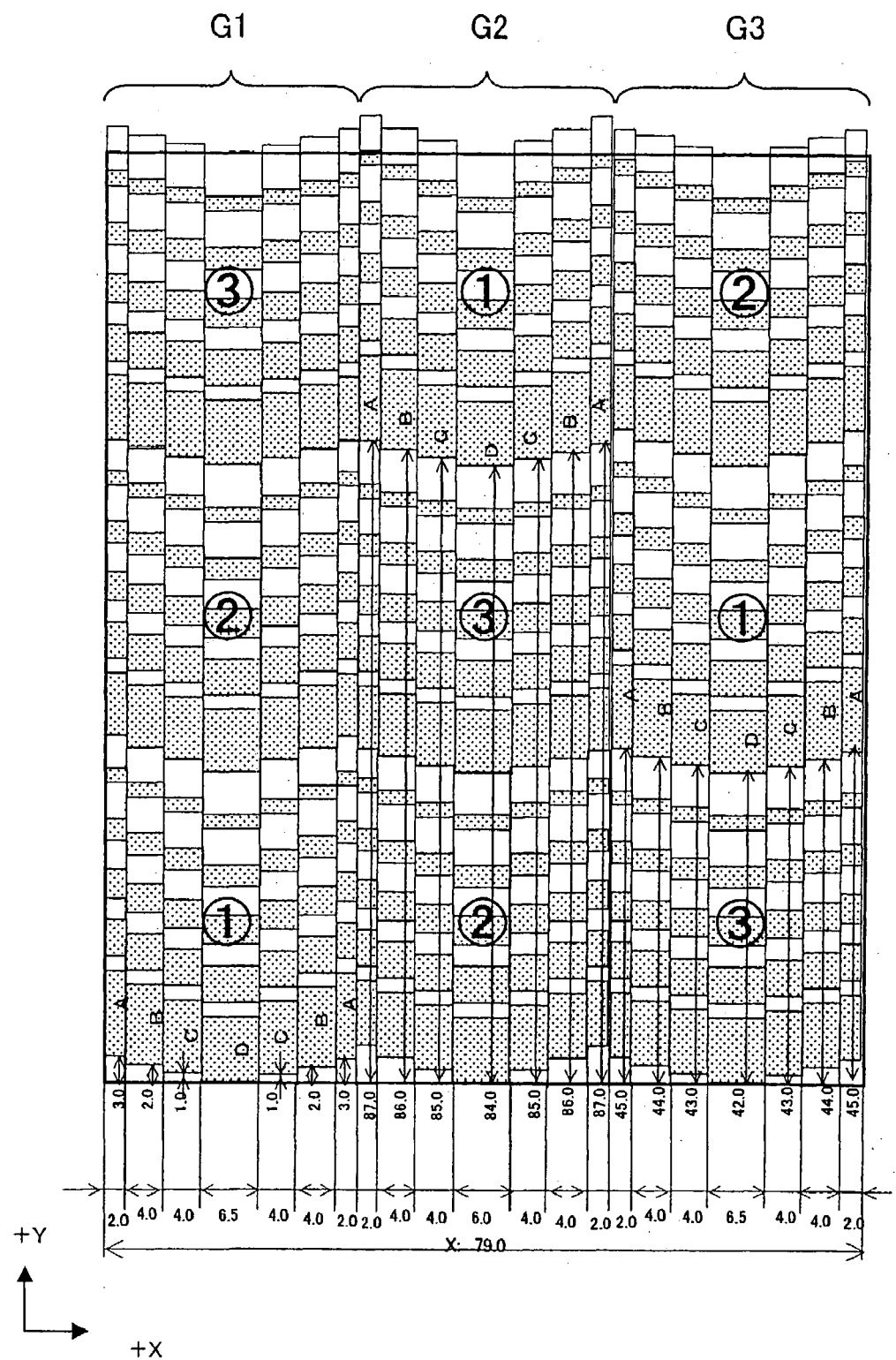
FIG. 48 is a plan view of a basic pattern in the photomask in Example 3.
Figure 49:
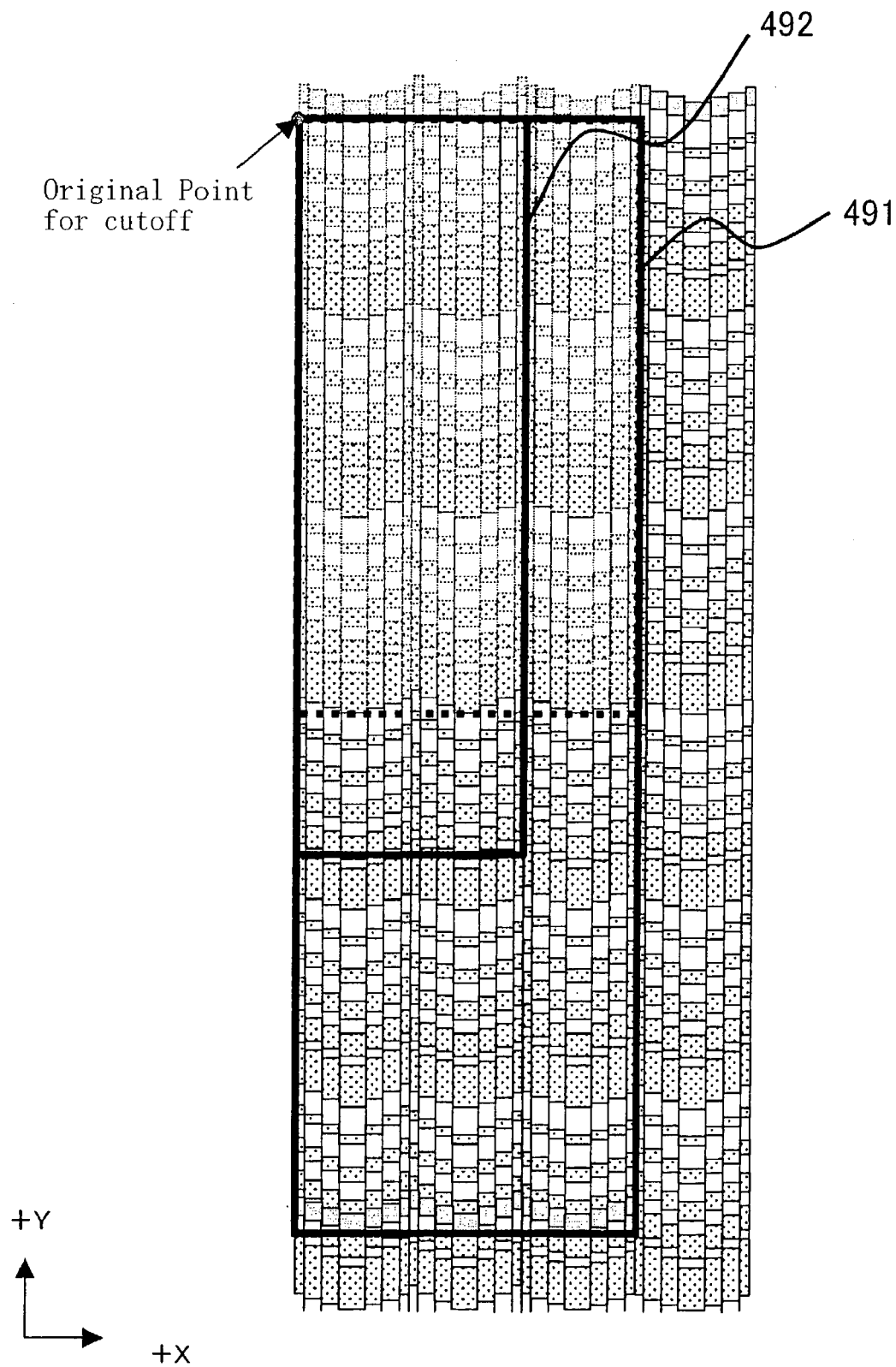
FIG. 49 is a plan view explaining how to cut out a photomask pattern in Example 3.

Next, the array G1 thus prepared as shown in FIG. 48 is shifted toward the positive direction of the y-axis (toward an upper direction of the drawing sheet of FIG. 48) by a distance of 84 μm, and the shifted array is provided as an array G2 so as to adjoin the array G1 side by side. Additionally, the array G1 as shown in FIG. 48 is shifted toward the positive direction of the y-axis (toward an upper direction of the drawing sheet of FIG. 48) by a distance of 42 μm, and the shifted array is provided as an array G3 so as to adjoin the array G2 side by side.

In this manner, the pattern shown in FIG. 48 is formed by three kinds of mask pattern sections ①, ② and ③ having different shift pitches. In this specification, the respective different mask pattern sections ①, ② and ③ in the basic pattern are called mask pattern units. The minimum unit wherein different mask pattern sections are arrayed in the x-axis direction is called a block unit. In this Example, the respective arrays of the three different mask pattern units ①, ② and ③, the three different mask pattern units ②, ③ and ①, and the three different mask pattern units ③, ① and ②, which extend in the x-axis direction, can be called block units. In this Example, two block units, which adjoin each other in the y-axis direction, have the arcuate boundaries shifted by the distance of the array G1.

Although the pattern sections A, B, C, D, C, B and A have the same length in the x-axis direction in FIG. 50, the lengths of the pattern sections may be set at appropriate values in practice as shown in FIG. 48. In the latter case, the length of the mask pattern units and the block units, or a multiple of the length in the x-axis direction does not conform to the length of a pixel in some occasions. In those occasions, the lengths in the x-axis direction of the pattern sections A, B, C, D, C, B and A may be appropriately modified. FIG. 48 shows a case wherein the length of the pattern section D at a middle mask pattern unit in this figure is set at 6.0 μm, and the lengths of the pattern sections D at right and left mask pattern sections in this figure are set at 6.5 μm.

The reason why the different mask pattern units were provided in the x-axis direction and the y-axis direction is that respective pixels have optical properties of being random to some extent to prevent variations in production from affecting directly to reflection properties. The number of the kinds of the mask patterns provided in the x-axis direction and the y-axis direction are not limited to three, and the number may be two, four or more.

This Example may be also considered as showing an example of the photomask, which includes rectangular transmission elements and rectangular light shielding elements, wherein when the photomask surface is defined as an xy plane, comb-like gray scale regions, which have the widths of the transmission elements and the widths of the light shielding elements in the y-axis direction stepwise and monotonously changed, are successively provided in the x-axis direction, and wherein the light shielding portions as collections of the rectangular light shielding elements and the transmission portions as collections of the transmission elements have a constant cycle in the x-axis direction. The phrase "the light shielding portions as collections of the rectangular light shielding elements and the transmission portions as collections of the transmission elements have a constant cycle in the x-axis direction" also means to cover a case wherein there are slight different cycles for conformity to the length of a pixel in the x-axis direction as stated earlier.

Explaining more specifically about this Example, the comb-like gray scale regions comprise mask pattern units, which are successively provided by one cycle in the x-axis direction with certain shifts in the y-axis direction, and wherein the transmission portions and the light shielding portions in the x-axis direction have arcuate boundaries extending therebetween by combining a couple of mask pattern units shifted with a positive distance in the y-axis direction and a couple of mask pattern units shifted with a negative distance in the y-axis direction. The mask pattern units are successively provided in the x-axis direction so as to have the transmission portions and the light shielding portions in the x-axis direction provided with arcuate boundaries extending therebetween in wavy fashion. In this Example, the shift distances in the y-axis direction are d1, d2 and d3 in FIG. 51. The ratio of the amplitude of the cycle in the x-axis direction in the photomask pattern, i.e., the ratio of the amplitude to the cycle in the x-axis direction in the light shielding portions and the transmission portions is repeatedly changed with certain regularity in the x-axis direction by repeating the shifts of d1, d2 and d3 in the x-axis direction. This arrangement can provide the pixel regions with optical properties of being random to some extent to prevent variations in production from affecting directly to reflection properties.

This Example may be considered as showing a photomask, wherein block units that are the same as one block unit including mask pattern units in the x-axis direction stated earlier are successively provided in the y-axis direction so as to be shifted with certain distances in the x-axis direction. The Example may be considered as showing a photomask, wherein respective block units comprises mask patterns units arraying in the x-axis direction, the respective block units are successively provided in the y-axis direction so as to be shifted with certain distances in the x-axis direction, the mask pattern for one pixel is selected from a combination of ones among the mask pattern units, and mask patterns, which are the same as the selected mask pattern, are successively provided in the x-axis direction and the y-axis direction, in the photomask pattern defined in any one of the thirtieth to thirty-sixth aspects.

Although the certain distances may be arbitrarily set according to practice, it is preferable that the certain distances are the same as or half the cycle of the light shielding portion and the transmission portion in the x-axis direction in the mask pattern units. This Example shows a case wherein the certain distances are the same as the cycle of the light shielding portion and the transmission portion in the x-axis direction. The cycle referred to the phrase "the same as or half the cycle of the light shielding portion and the transmission portion in the x-axis direction "also means to cover a case wherein there are slight different cycles for conformity to the length of a pixel in the x-axis direction as in the phrase "the light shielding portions as collections of the rectangular light shielding elements and the transmission portions as collections of the transmission elements have a constant cycle in the x-axis direction".

The visual evaluation of the transflective liquid display fabricated by using the photomask stated earlier revealed that the display was able to provide bright image, avoiding the adverse effect due to glare, as in Example 1. It was revealed that differences in reflection properties among samples were able to be minimized.

As stated earlier, the present invention provides a light reflective structure, and a reflective display and a transflective display, in particular a reflective liquid crystal display and a transflective liquid crystal display, which can minimize an adverse effect caused by glare and offer bright image and good image performance. The light reflective structure, the reflective display and the transflective display according to the present invention can be produced easily and in a high yield.

The entire disclosures of Japanese Patent Application No. 2002-143634 filed on May 17, 2002, and Japanese Patent Application No. 2002-376735 filed on Dec. 26, 2002 including specifications, claims, drawings and summaries are incorporated herein by reference in their entireties.

What is claimed is:

1. A method for producing a light reflective structure, comprising:
    forming a photosensitive resin layer with use of a thermosetting photosensitive resin;
    providing a photomask, which has at least one kind of pattern, the pattern having line-shaped light shielding portions and line-shaped transmission portions so that at least one of the width of the light shielding portions and the width of the transmission portions monotonically changes;
    exposing the photosensitive resin layer through the photomask by a proximity method;
    developing the exposed photosensitive resin layer to form an insolubilized resin layer; and
    subjecting the insolubilized resin layer to a heat treatment to have surface smoothness improved and to accelerate setting of the resin layer.

2. The method according to claim 1, wherein the proximity method has a collimation angle from 1 to 4°.

3. The method according to claim 1, wherein the thermosetting photosensitive resin comprises a positive photosensitive resin, and the heat treatment is carried out at 150 to 260° C. for not shorter than 1 min.

4. The method according to claim 1, wherein the heat treatment includes thermal contact conduction.

5. The method according to claim 1, wherein the width of the light shielding portions and the width of the transmission portions of the photomask are set at a value from 1 to 15 μm, and the pattern has a cycle of 20 to 60 μm.

6. The method according to claim 1, wherein the photosensitive resin is made of a material capable of undergoing an intermediate reaction according to exposure intensity.

7. A method for producing a light reflective structure, comprising:
    irradiating light to a thermosetting photosensitive resin layer by an area graduation method, the photosensitive resin layer capable of undergoing an intermediate reaction according to exposure intensity;

developing the photosensitive resin layer to form an insolubilized resin layer;

subjecting the developed photosensitive resin layer to a heat treatment to create thermal sagging so as to have surface smoothness improved and to accelerate setting of the resin; and providing an uneven form on a surface of the cured resin so as to correspond to cycles of area graduation, and providing a reflective material on the surface of the cured resin.

* * * * *